(12) United States Patent
Kanda

(10) Patent No.: US 6,345,143 B2
(45) Date of Patent: *Feb. 5, 2002

(54) EDITING SYSTEM AND EDITING METHOD

(75) Inventor: Takeshi Kanda, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/068,296

(22) Filed: May 6, 1998

Related U.S. Application Data

(63) Continuation of application No. PCT/JP97/04829, filed on Dec. 25, 1997.

(30) Foreign Application Priority Data

Dec. 29, 1997 (JP) .............................................. 8-346024

(51) Int. Cl.[7] .......................... H04N 5/765; H04N 5/907
(52) U.S. Cl. ............................................. 386/52; 386/46
(58) Field of Search .............................. 386/52, 95, 46, 386/94, 113, 1, 4, 109, 27, 33, 92, 55, 64; 360/13, 15, 60; H04N 5/765, 5/907

(56) References Cited

U.S. PATENT DOCUMENTS 5,134,499 A * 7/1992 Sata et al. .................... 386/125
5,432,769 A * 7/1995 Honjo .......................... 369/60

* cited by examiner

Primary Examiner—Robert Chevalier
(74) Attorney, Agent, or Firm—Frommer Lawrence & Haug LLP; William S. Frommer; Dennis M. Smid

(57) ABSTRACT

An editing system according to the present invention can reproduce video data recorded in one recording/reproducing device to another of those by controlling the recording operation and the reproducing operation of the first and the second recording/reproducing device which are provided on a recording/reproducing device by control of a computer, so that only if instruction information is entered through the user interface unit of the computer for example, source video data recorded in a second recording medium brought from the outside can be easily dubbed to a first recording medium as editing material, furthermore, the video data of the final video program generated as the result of edition can be easily dubbed from a first recording medium to for example, a second recording medium used in broadcasting. Thus, dubbing of editing material and dubbing of the final video program can be performed efficiently.

22 Claims, 28 Drawing Sheets

| DATA CONTENTS | NUMBER OF BYTES |
|---|---|
| POINTER TO DATA LINKED BEFORE | 4 |
| POINTER TO DATA LINKED AFTER | 4 |
| HORIZONTAL SIZE OF DISPLAY FOR 1 PAGE | 2 |
| VERTICAL SIZE OF DISPLAY FOR 1 PAGE | 2 |
| DISPLAY POSITION ON SCREEN | 2 |
| HEAD POSITION OF DISPLAY | 2 |
| TOTAL NUMBER OF LINKS | 2 |

FIG. 8

| DATA CONTENTS | NUMBER OF BYTES |
|---|---|
| POINTER TO DATA LINKED BEFORE | 4 |
| POINTER TO DATA LINKED AFTER | 4 |
| PROPERTY | 1 |
| CLIPPED-IMAGE-DATA HANDLE | 4 |
| CLIP TYPE | 2 |
| TIME-CODE DATA | 4 |
| INDEX NUMBER OF CLIPPED IMAGE DATA | 4 |

FIG. 9

| DATA CONTENTS | NUMBER OF BYTES |
|---|---|
| POINTER TO DATA LINKED BEFORE | 4 |
| POINTER TO DATA LINKED AFTER | 4 |
| PROPERTY | 1 |
| EVENT NO. | 2 |
| TITLE | 16 |
| SUBTITLE | 20 |
| IN-POINT CLIPPED-IMAGE-DATA HANDLE | 4 |
| CLIP TYPE OF IN POINT | 2 |
| IN-POINT TIME-CODE DATA | 4 |
| INDEX NO. OF IN-POINT CLIPPED IMAGE DATA | 4 |
| OUT-POINT CLIPPED-IMAGE-DATA HANDLE | 4 |
| CLIP TYPE OF OUT POINT | 2 |
| OUT-POINT TIME-CODE DATA | 4 |
| INDEX NO. OF OUT-POINT CLIPPED IMAGE DATA | 4 |
| SLOW TYPE | 2 |
| SYMBOL TYPE | 2 |
| TIME-CODE DATA OF SYMBOL | 4 |

FIG. 10

| MARKING | IN | IN | OUT | IN | OUT | IN | IN | IN | OUT | IN | OUT | IN | IN | IN | IN |
|---|---|---|---|---|---|---|---|---|---|---|---|---|---|---|---|
| INDEX No. | 1 | 2 | 3 | 4 | 5 | 6 | 7 | 8 | 9 | 10 | 11 | 12 | 13 | 14 | 15 |
| CLIP No. | 1 | | | | | 6 | 7 | | | | | 12 | 13 | 14 | |
| EVENT No. | | 1 | 1 | 2 | 2 | | | 3 | 3 | 4 | 4 | | | | |

| FRAME DATA (TIME CODE) | SPEED DATA N |
|---|---|
| 00:00:00:01 (IN POINT) | 64 |
| 00:00:00:02 | 64 |
| 00:00:00:03 | 64 |
| 00:00:00:04 | 64 |
| 00:00:00:05 | 60 |
| 00:00:00:06 | 52 |
| 00:00:00:07 | 40 |
| 00:00:00:08 | 32 |
| 00:00:00:09 | 32 |
| 00:00:00:10 | 32 |
| 00:00:00:11 | 32 |
| 00:00:00:12 | 24 |
| 00:00:00:13 | 16 |
| 00:00:00:14 | 6 |
| 00:00:00:15 | 0 |
| 00:00:00:16 | 0 |
| 00:00:00:17 | 0 |
| 00:00:00:18 | 0 |
| ⋮ | ⋮ |
| 00:00:05:11 (OUT POINT) | 64 |

FIG. 17

EDITING SYSTEM AND EDITING METHOD

This is a continuation of copending International Application PCT/JP97/04829 having an international filing date of Dec. 25, 1997.

FIELD OF THE ART

The present invention relates to an editing system for editing source video data imaged by a video camera or the like, and more particularly, is suitably applicable to an editing system for editing material to be promptly reported like sports and news broadcasting.

BACKGROUND ART

Heretofore, as this type of editing system, a system using a video tape recorder (hereinafter, it is referred as VTR for short) as recording means for recording edit material has been provided. In this editing system, live images such as sports and news, are sequentially recorded by the VTR, and the recorded images are read out as edit material to edit programs.

In the case of handling the live images such as sports and news, an editing system is required that can rapidly edit to provide exciting images having presence to audience. In the conventional editing system, however, since the VTR is used as a recording medium, a time for head-search, fast-forwarding, or rewinding of the VTR are needed, the VTR must be controlled till immediately before on the air. It causes a problem that editing operation cannot be performed speedy. A considerable time is required only for dubbing video data in which for example, recorded video data is temporary recorded to a video tape for material as editing material, or the final video program finally completed as the result of edition is recorded to a video tape for broadcasting, moreover, each equipment such as a VTR must be operated for dubbing, thereby, it causes a problem that the operation becomes complicated.

Furthermore, in the conventional editing system, when in editing, various devices are needed in addition to VTR: a plurality of monitors to confirm record images and edit images, etc. It causes a problem that system structure becomes larger. Additionally, since various devices must be operated, there is a problem that operation becomes complicated.

As described above, the conventional editing system is not considered to efficiently perform editing work in restricted environments at the scene, and handle materials wanting a real-time characteristic, such as sports broadcasting and a news report; it has been insufficient in usability.

DISCLOSURE OF INVENTION

Considering the above points, the present invention provides an editing system capable of easily recording video data being material and the final video program generated as the result of edition, etc., on a predetermined recording medium, and having further improved usability.

To solve the above problems, in the present invention, an editing system for editing source video data is equipped with a recording/reproducing device which has the first recording/reproducing means for recording video data on a random-access recording medium and for reproducing the video data recorded on the first recording medium at the same time, the second recording/reproducing means for recording video data on the predetermined second recording medium and for reproducing the video data recorded on the second recording medium at the same time, selecting means for supplying the video data reproduced by one of said first and second recording/reproducing means to another recording/reproducing means, and the first control means for controlling the recording and reproducing operation of said first and second recording/reproducing means and controlling the selecting operation of said selecting means, and a computer which has user interface means for entering instruction information to record said video data reproduced by one of said first and second recording/reproducing means by another recording/reproducing means, and the second control means for making said recording/reproducing means perform reproducing and recording operation corresponding to the instruction information by notifying said first control means of said recording/reproducing device, control information corresponding to said instruction information entered via said user interface means.

In this manner, video data recorded in one recording/reproducing means can be recorded to another recording/reproducing means by controlling the recording operation and the reproducing operation of the first and the second recording/reproducing means which are provided on a recording/reproducing device by control of a computer, so that only if instruction information is entered through the user interface means of the computer, for example, source video data recorded in a second recording medium brought from the outside can be easily dubbed to a first recording medium as editing material, furthermore, the video data of the final video program generated as the result of edition can be easily dubbed from a first recording medium to, for example, a second recording medium used in broadcasting. Thus, dubbing of editing material and dubbing of the final video program can be performed efficiently. Thereby, dubbing processing of video data can be performed efficiently comparing with the conventional case, so that an editing system having further improved usability can be realized.

BRIEF DESCRIPTION OF DRAWINGS

FIG. 8 is a table illustrating first management record data.

FIG. 9 is a table illustrating second management record data for clip data.

FIG. 10 is a table illustrating the second management record data for event data and program data.

FIG. 11 is a table for explaining an index number, a clip number and an event number.

FIG. 12 is a schematic diagram showing an example of each displaying area.

FIG. 17 is a table for explaining a storing format of speed data.

Figure 1:
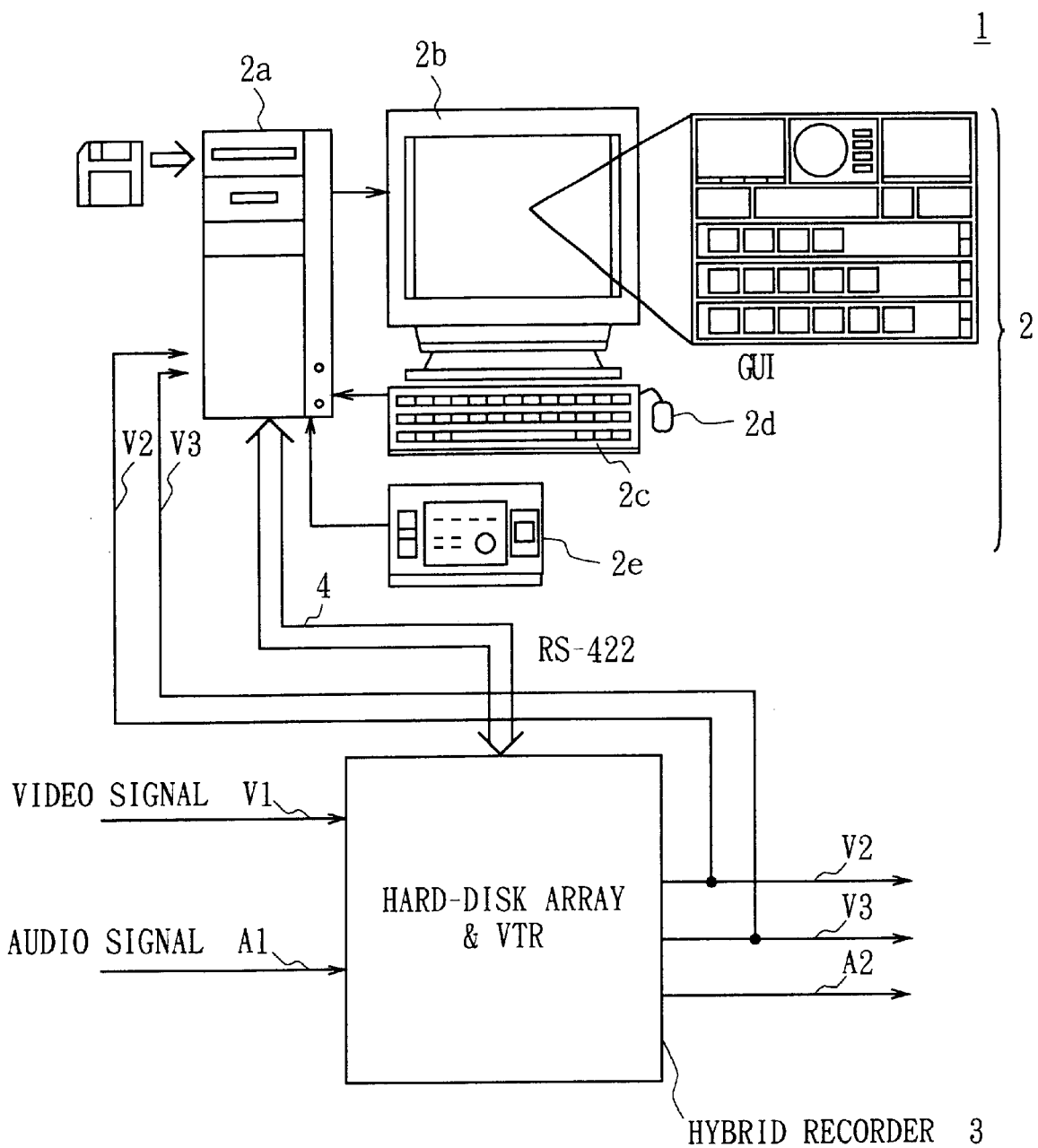
FIG. 1 is a block diagram showing the general constitution of an editing system according to the embodiment of the present invention.

BEST MODE FOR CARRYING OUT THE INVENTION (1) General Constitution of Editing System Referring to FIG. 1, the caption number 1 generally shows an editing system according to the present invention. The editing system 1 includes an editing computer 2 and a hybrid recorder 3 for recording/reproducing source video data. The computer 2 is composed of the following devices: a main body 2a having a CPU, various processing circuits, a floppy-disk drive, and a hard-disk drive; a monitor 2b connected to the main body 2a; a keyboard 2c; a mouse 2d; and a dedicated controller 2e. In this computer 2, an application program for editing video data has been previously installed in the hard-disk drive so that the computer 2 works as an editing system by operating the application program under the operating system.

The application program includes a graphical user interface (GUI) for generating control commands used in editing work. When the application program is worked, a graphic for GUI is displayed on the monitor 2b.

On the other hand, the hybrid recorder 3 is composed of a hard-disk array in which plural hard disks are connected in array, and a VTR capable of reproducing or recording desired video data and audio data. In this embodiment, the VTR is provided with both VTRs having an analog mode and a digital mode, therefore, the VTR can reproduce a video tape recorded in the analog mode also can reproduce a video tape recorded in the digital mode, furthermore, the VTR can record desired video data and audio data in either methods of the analog method or the digital method.

In this connection, in the hybrid recorder 3, also the video data and the audio data reproduced by the VTR can be dubbed to the hard-disk array, or the video data and the audio data reproduced by the hard-disk array can be dubbed to a video tape in the VTR. Furthermore, in the hybrid recorder 3, also video signal V1 and audio signal A1 supplied from the outside can be recorded to the hard-disk array or the VTR. In this case, since the hard disk-array can perform recording and reproducing at the same time, if the hard-disk array is selected as recording/reproducing means, video data and audio data can be recorded in real time as well as reproducing thus recorded video data and audio data in real time.

Note that, among the video signal V3 and the audio signal A2 reproduced in real time from the hard-disk array of this hybrid recorder 3, the video signal V3 is supplied to the main body 2a of the computer 2. Furthermore, when recording source video signal V1 inputted from the outside, the hybrid recorder 3 outputs the video signal V1 almost as it is, and video signal V2 thus outputted (which is similar to the video signal V1 as a signal) is also supplied to the main body 2a of the computer 2.

In this connection, the video signal V1 inputted from the outside is a composite video signal by shooting by a video camera or the like, and used as editing material.

The video data reproduced by the VTR in the hybrid recorder 3 is video data obtained by reproducing for example, the video tape recorded at the scene, by the VTR, and also used as editing material.

Note that, if this editing system 1 is used in sports broadcasting or the like, the source video signal V1 is inputted to this editing system 1 mainly from the outside, and video signal V2 which is identical with the video signal V1 is displayed on the monitor 2b of the computer 2 while recording the source video signal V1 to the hybrid recorder 3, and if needed, video signal V3 is reproduced from the hybrid recorder 3 to perform editing work.

The computer 2 and the hybrid recorder 3 are connected to each other by a communication cable 4 based on an RS-422 interface communication format, and a control command and its response command can be transmitted therethrough. The RS-422 interface communication format, the control command, and its response command can be simultaneously transmitted/received.

Here, the operation of this editing system 1 will be described briefly. For example, when the video signal V1 supplied from the outside is used as editing material, in using this source video signal V1 as editing material, the editing system 1 records the source video signal V1 to the hard-disk array in the hybrid recorder 3 in real time and outputs the source video signal V1 almost as it is as the video signal V2 to supply to the computer 2. The computer 2 receiving the video signal V2 displays a reduced picture corresponding to the video signal V2 on the monitor 2b to show the operator the contents of the editing material.

The operator who operates the computer 2 operates a pointing device such as the mouse 2d connected to the computer 2 while monitoring the video signal V2 displayed on the monitor 2b being display means and specifies editing points such as an in point (edition starting point) and an out point (edition stopping point) as well as producing a control command for edition using a GUI displayed on the monitor 2b. This control command is transmitted to the hybrid recorder 3 as an RS-422-based control command. Thereby, the reproducing operation of the hybrid recorder 3 is controlled, and the reproduced video signal V3 is displayed on the monitor 2b of the computer 2. Thus, in this editing system 1, editing work can be efficiently performed by reproducing the editing material while recording the editing material.

On the other hand, when a video tape brought from the outside is used as editing material, in using source video data recorded in this video tape as editing material, first the video tape is set in the VTR in the hybrid recorder 3, the video tape is reproduced, and the reproduced source video data is recorded to the hard-disk array in the hybrid recorder 3.

Thereafter, the operator reproduces dubbed source video data from the hard-disk array, generates a desired editing command while monitoring the monitor 2b of the computer 2, and performs editing work in the similar manner to the above-mentioned edition in which the video signal V1 is material.

As in the above, in the editing system 1, since the pointing device such as the mouse 2d is operated while motoring the monitor 2b, editing work can be easily performed. Furthermore, since the hybrid recorder 3 capable of simultaneously performing a recording operation and a reproducing operation is used, editing work can be performed in real time; thus, materials such as sports broadcasting and news report etc. can be edited without lacking a real-time characteristic.

(2) Inner Constitution of Computer

Figure 2:
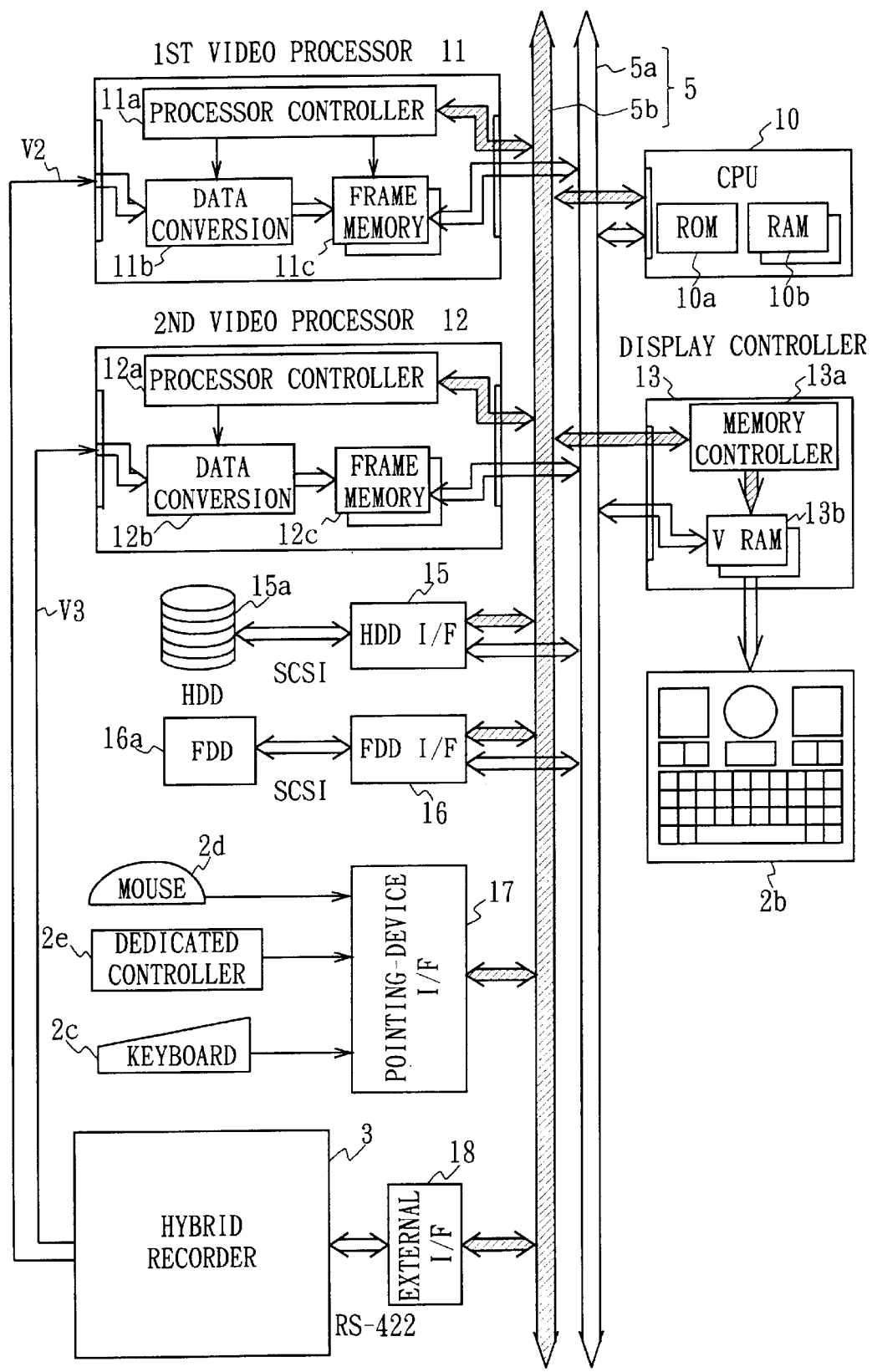
FIG. 2 is a block diagram showing the inner constitution of a computer forming an editing system.

In this chapter the inner constitution of computer 2 is described concretely. As shown in FIG. 2, the computer 2 has the following blocks: a system bus 5 for transmitting command data and video data; a CPU 10 for controlling whole computer; a first and a second video processors 11 and 12 for conducting image processing on input video signal; a display controller 13 for managing video data displayed on the monitor 2b and a GUI graphic display; an HDD interface 15 for controlling a local hard-disk drive (local HDD) 15a; an FDD interface 16 for controlling a floppy-disk drive (FDD) 16a; a pointing device interface 17 for generating control command based on a command supplied from the pointing device like the mouse (cursor controlling device) 2d, dedicated controller 2e and keyboard 2c; and an external interface 18 including a software driver for data communication with the hybrid recorder 3 according to the RS-422 communication format.

The system bus 5 is a bus for the communication of video data, command data, and address data within the computer 2, and which is composed of a video data bus 5a for transmitting video data and a command data bus 5b for transmitting command data or the like.

The video data bus 5a is connected to the CPU 10, first and second video processors 11 and 12, display controller 13, HDD interface 15, FDD interface 16 respectively. The first and the second video processors 11 and 12, display controller 13, HDD interface 15, and FDD interface 16 transmit video data via the video data bus 5a.

The command data bus 5b is connected to the CPU 10, first and second video processors 11 and 12, display controller 13, HDD interface 15, FDD interface 16, pointing-device interface 17, and external interface 18 respectively (that is, all blocks in the computer 2 is connected thereto). Command data and address data are transmitted via the command data bus 5b.

The CPU 10 is a block to control whole computer 2. The CPU 10 provides a ROM 10a in which an operating system for the computer 2 has been stored, and a RAM 10b in which the up-loading application program or the like will be stored.

When starting the computer 2, the CPU 10 executes a software program according to the operating system stored in the ROM 10a.

If executing an application program under the started operating system, the CPU 10 first reads an application program recorded on a hard disk in the hard-disk drive 15a and uploads into the RAM 10b before executing the above application program.

The first video processor 11 is a block for receiving the first video signal V2 supplied to the computer 2, conducting data-conversion on it, and temporarily buffering the converted video data. The first video processor 11 is composed of the following blocks: a processor controller 11a for controlling whole video processor 11; a data converting unit 11b for converting received analog composite video signal V2 into digital component video data; and a frame memory 11c for temporarily storing several frames of video data supplied from the data converting unit 11b.

The processor controller 11a supplies a control signal to the data converting unit 11b to control the operation of the data converting unit 11b as well as extract time code from the composite video signal V2 to the data converting unit 11b. Moreover, the processor controller 11a supplies a control signal to the frame memory 11c to control read/write timing and read/write address of the frame memory 11c. As to the read timing, the processor controller 11a so controls read timing of the frame memory 11c that the time code sent to the display controller 13 corresponds to the video data (frame data).

The data converting unit 11b converts the analog composite video signal V2 to a component video signal based on the control signal from the processor controller 11a, and converts the analog component video signal into digital video data. Note that, its time code is extracted when the analog component video signal is converted into digital video data. Thus digital-converted video data is supplied to the frame memory 11c, and extracted time code is supplied to the processor controller 11a.

The time code is coded into two lines, 14H and 16H, or 12H and 14H and inserted to the vertical blanking period of the composite video signal V2, which is called vertical interval time code (VITC). Therefore, in the case of extracting time code from the composite video signal V2, the time code can be easily extracted only by decoding the digital-converted time code in the vertical synchronizing period when an analog signal is converted into digital data. In this connection, this time code is added in the hybrid recorder 3 when the video signal V2 is outputted.

The frame memory 11c temporary stores video data supplied from the data converting unit 11b. The read/write timing of the frame memory 11c is controlled by the processor controller 11a as described above. This frame memory 11c is composed of two frame memories with 4-Mbyte. Video data to be stored in the frame memory 11c is 1520×960-pixel and such video data can be stored for two frames.

The 1520×960-pixel video data stored in the frame memory 11c is read out according to the control of the processor controller 11a. This video data is not 1520×960-pixel being all of the pixels of that, but its data quantity has thinned out to 380×240-pixel. Here, "thinning out of data quantity" means simply reducing in quarter the sampling rate when video data is read out from the frame memory 11c to reduce the data quantity of video data to be read out. Thus read out 380×240-pixel video data is supplied to the display controller 13 via the video data bus 5a.

The second video processor 12 is completely the same as the first video processor in structure. That is, the video processor 12 provides the following units: a processor controller 12a for controlling whole video processor 12; a data converting unit 12b for converting received analog composite video signal V3 into digital component video data; and a frame memory 12c for temporary storing video data for several frames supplied from the data converting unit 12b. The first video processor 11 and the second video processor 12 are different in that: to the first video processor 11 the composite video signal V2 is supplied, while to the second video processor 12 the composite video signal V3 is supplied.

Here, since the composite video signal V2 is video signal which a time code is superimposed on the vertical synchronizing period of the source video signal recorded to the hard-disk array in the hybrid recorder 3, it is the temporary same video signal as the source video signal recorded in real time. That is, the video data stored in the frame memory 11c is the same video data as that the source video signal to be recorded is digitized.

On the contrary, the composite video signal V3 is the source video signal reproduced from the hard-disk array of the hybrid recorder 3 by a command from the computer 2. Therefore, this composite video signal V3 is asynchronous video signal with the source video signal to be recorded to the hard-disk array and having no temporal relation to each other.

This respect is described in detail hereinafter. If the operator specifies the reproduction of source video data, the computer 2 outputs a reproducing command of the source video data to the hybrid recorder 3. The hybrid recorder 3 reproduces the source video data specified by the operator responding to the reproducing command from the computer 2. Furthermore, the hybrid recorder 3 memorizes a time code corresponding to the source video data in a frame unit, and reproducing the time code of the reproduced source video data on the basis of the correspondence relation.

Then the hybrid recorder 3 superimposes the reproduced time code on the vertical synchronizing period of the reproduced source video data, converts thus obtained source video data into analog composite video signal V3 so as to transmit it to the computer 2, and transmits it to the computer 2. As in the above, since the composite video signal V3 is the source video signal reproduced by the command by the operator, it is temporary asynchronous signal with the source video signal to be recorded in the hybrid recorder 3.

The composite video signal V3 supplied to the second video processor 12 is conducted the specified signal processing via the data converting unit 12b and frame memory 12c similarly to the composite video signal V2 supplied to the first video processor 11, thereafter, transmitted to the display controller 13 as a 380×240-pixel digital video data.

The display controller 13 is a control block for controlling data to be displayed on the monitor 2b. The display controller 13 has a memory controller 13a and a video random access memory (VRAM) 13b. The memory controller 13a controls the read/write timing of the VRAM 13b according to the inner synchronization of the computer 2. In the VRAM 13b, video data from the frame memory 11c of the first video processor 11, video data from the frame memory 12c of the second video processor 12, and image data from the CPU 10 will be stored based on a timing control signal from the memory controller 13a, respectively. The image data stored in the VRAM 13b is read out from the VRAM 13b based on the timing control signal from the memory controller 13b according to the inner synchronization of the computer, and it is used as GUI display. The image data sent from the CPU 10 to the VRAM 13b is image data of a window, cursor, scroll bar, etc. The graphic display for GUI can be obtained by displaying these plural kinds of image data on the monitor 2b.

The hard-disk interface 15 is an interface block for communicating with the local hard-disk drive (HDD) 15a provided in the computer 2. Communication between the hard-disk interface 15 and the hard-disk drive 15a is performed according to the small computer system interface (SCSI) transmission format.

In the hard-disk drive 15a, an application program which is started by the computer 2 has been installed. when the application program is executed, it is read out from the hard-disk drive 15a and uploaded into the RAM 10b of the CPU 10. when this application program is closed, a work data file formed by editing operation stored in the RAM 10b is downloaded into a hard disk via the hard-disk drive 15a.

The floppy-disk interface 16 is an interface block for communicating with the floppy-disk drive (FDD) 16a provided in the computer 2. The communication between the floppy-disk interface 16 and the floppy-disk drive 16a is performed according to the SCSI transmission format. Note that, an edit decision list (EDL) which shows the result of edition by editing operation, or the like, is stored to a floppy disk via the floppy-disk drive 16a.

The pointing-device interface 17 is an interface block for receiving information from the mouse 2d, dedicated controller 2e and keyboard 2c connected to the computer 2. The pointing-device interface 17 receives, e.g., detecting information of a two-dimensional rotary encoder provided in the mouse 2d, and click information of a left and a right buttons provided on the mouse 2d, and decodes these received information and supplies the decoded data to the CPU 10. Also the pointing-device interface 17 receives information from the dedicated controller 2e and the keyboard 2c, decodes and supplies to the CPU 10.

The external interface 18 is a block for communicating with the hybrid recorder 3 externally connected to the computer 2. The external interface 18 has an RS-422 driver for transforming command data generated in the CPU 10 into the communication protocol of the RS-422, and outputs a control command such as reproducing command to the hybrid recorder 3 via the RS-422 driver.

(3) Graphic Display for GUI (3-1) Picture Mode

In the editing system 1, two types of modes are prepared as graphic displays for GUI: one is a picture mode in which a program is edited by rearranging an event while monitoring the screen of the in point and out point of the registered event; the other is a time-line mode in which the length of program can be adjusted while monitoring the temporal length of the registered event. It can be easily switched between these two modes by clicking a mode button, which will be described later. Thereby, the operator can select either of GUI better for use according to the purpose of edition, and thus the usability in editing work can be improved.

Figure 3:
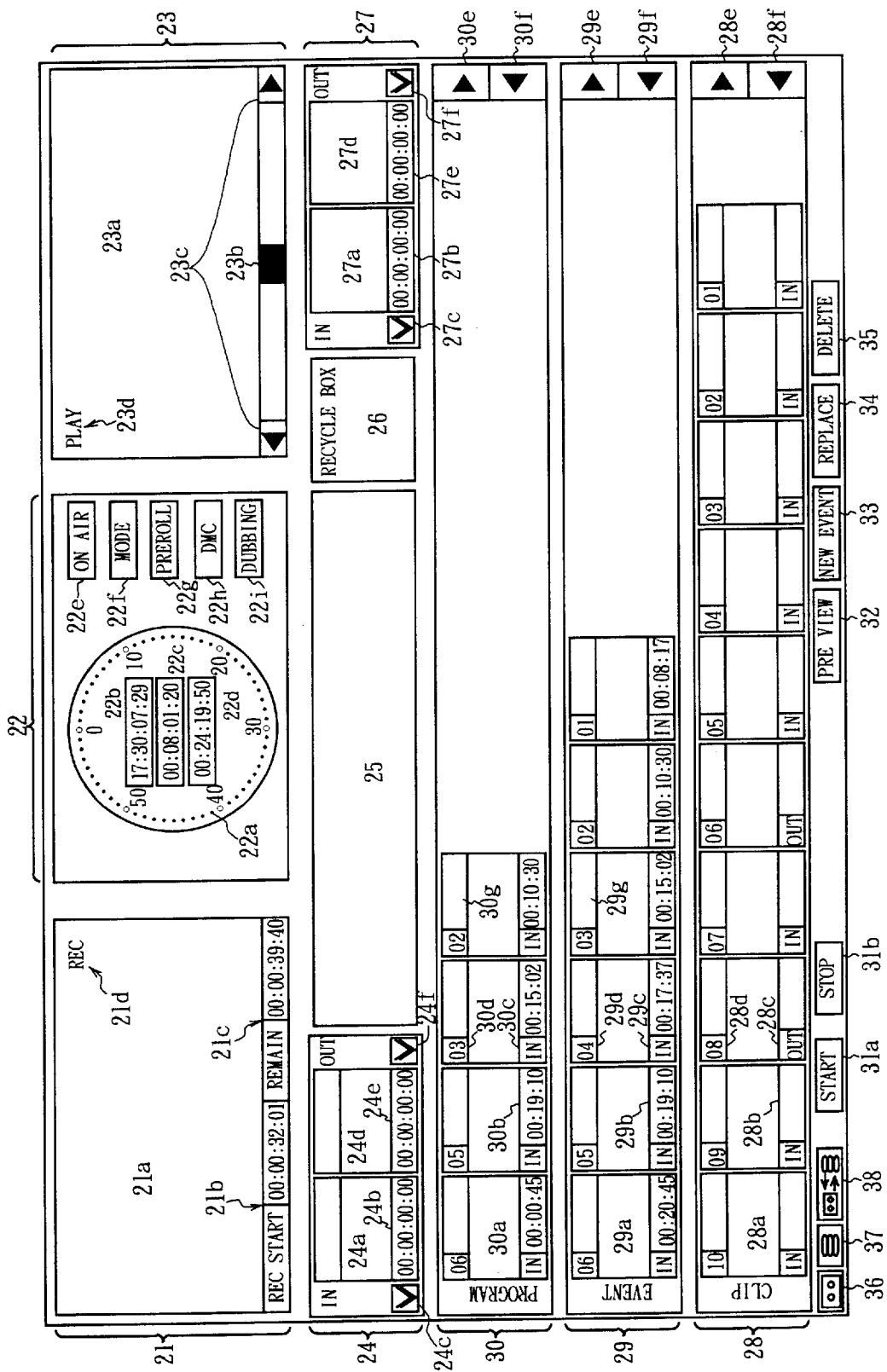
FIG. 3 is a schematic diagram showing a graphical user interface (GUI) in a picture mode.

In this chapter, the picture mode will be described first. In the case of the picture mode, a graphic display shown in FIG. 3 is displayed on the monitor 2b. As shown in FIG. 3, the graphic display in the picture mode is divided into the following ten areas: a recording video displaying area 21; timing displaying area 22; reproducing video displaying area 23; recording video marking area 24; reproducing speed setting area 25; recycle-box area 26; reproducing video marking area 27; clip displaying area 28; event displaying area 29; and program displaying area 30.

The recording video displaying area 21 has a recording video screen 21a, a recording-start-point displaying area 21b, a residual-time-of-memory-capacity displaying area 21c, and an on-recording displaying area 21d.

The video signal displayed on the recording video screen 21a is a signal obtained from the composite video signal V2 sent from the hybrid recorder 3, and its image size has changed to 380×240 pixels by thinned out when supplied from the frame memory 11c to the VRAM 13b.

In the recording-start-point displaying area 21b, the time code showing when the recording of the video signal displayed on the recording video screen 21a was started by the hybrid recorder 3, will be displayed.

In the residual-time-of-memory-capacity displaying area 21c, the residual time of memory capacity of the hybrid recorder 3 will be displayed. Because the total memory capacity of the hybrid recorder 3 can be seen previously, the residual time displayed here can be easily obtained by subtracting, the value obtained by subtracting a time at the beginning of recording from the present time, from the recordable time of the hybrid recorder 3.

In the on-recording displaying area 21d, the letters "REC" will be displayed. This shows that the video signal displayed on the recording video screen 21a is being recorded.

The timing displaying area 22 has the following areas: a one-minute-clock displaying area 22a; time displaying area 22b; input-video-signal's time-code displaying area 22c; reproducing video signal's time-code displaying area 22d; on-air displaying area 22e; mode button 22f; preroll button 22g; and reproducing speed setting button 22h, namely a dynamic motion controller (DMC) button 22h.

The one-minute-clock displaying area 22a is an area used to count one minute (or three minutes by setting the menu) in a second unit and visually displaying it. As going on the counting, the color of the displaying part provided along the circumference of this one-minute-clock displaying area 22a is sequentially changed for every seconds; then the operator can easily and visually grasp passing of the time. Saying that when is counted one minute using the one-minute-clock displaying area 22a, it is when one minute is counted from the specifying of in point, and then an out point is specified on the input video side or the reproducing video side, when in the case of previewing the produced program, one minute is counted from the beginning of previewing, etc.

In the time displaying area 22b, the present time will be displayed. In the recording video signal's time-code displaying area 22c, the time code of the video signal displayed in the recording video displaying area 21 will be displayed. This time code is a time code to be extracted from the vertical synchronizing period of the composite video signal V2 by the processor controller 11a in the first video processor 11.

In the reproducing video signal's time-code displaying area 22d, the time code of the video signal displayed in the reproducing video displaying area 23 will be displayed. This time code is a time code to be extracted from the vertical synchronizing period of the composite video signal V3 by the processor controller 12a in the second video processor 12.

The on-air displaying area 22e will be used to show whether to being on the air or not. If a tarry signal showing on the air is supplied from the external instrument, the color of the displaying area is changed to red. This tarry signal showing on the air is to be supplied while the composite video signal V3 supplied from the hybrid recorder 3 is putting on the air. Since the display color of the on-air displaying area 22e can be changed synchronizing with the on-air state, the operator can easily and visually grasp being on the air.

The mode button 22f will be used to switch between the picture mode shown in FIG. 3 and the time-line mode which will be described later. By clicking the mode button 22f by the mouse 2d, the switching of mode can be specified, thus the display mode can be switched between the picture mode and the time-line mode.

The preroll button 22g will be used to set a preroll mode. And the reproducing speed setting button (DMC) 22h will be used to set the reproducing speed of the selected event. The details of these two buttons will be described later.

Furthermore, a dubbing button 22i is a button used when video data is dubbed from the VTR in the hybrid recorder 3 to the hard-disk array or video data is dubbed from the hard-disk array in the hybrid recorder 3 to the VTR. If after this dubbing button 22i is clicked, a recording starting button 31a which will be described later is clicked, dubbing processing is executed.

The reproducing video displaying area 23 has a reproducing video screen 23a, shuttle button 23b, jog button 23c and reproducing state displaying area 23d.

The video signal to be displayed on the reproducing video screen 23a is a signal obtained from the composite video signal V3 reproduced by the hybrid recorder 3, and its image size has changed to 380×240 pixels by thinning-out process when the signal was supplied from the frame memory 12c to the VRAM 13b.

The shuttle button 23b is used if the operator wants to fast-forward (i.e., shuttle-forward) the video data reproduced from the hybrid recorder 3 and displayed on the reproducing video screen 23a. If the operator specifies the shuttle button 23b by operating the mouse 2d and drags toward the direction which he wants to fast-forward the video data, reproducing operation of the hybrid recorder 3 can be controlled by the dragging operation.

The jog button 23c is used if the operator wants to forward frame by frame the video data reproduced from the hybrid recorder 3 and displayed on the reproducing video screen 23a. In the case of wanting to forward frame by frame the video data displayed on the reproducing video screen 23a, the operator clicks a button showing the direction that he wants to forward frame by frame, of the jog button 23c, by the mouse 2d. Thereby, the reproducing video data can be forwarded frame by frame by according to click operation.

In the reproducing state displaying area 23d, the letters "PLAY" or "STILL" will be displayed according to the state of the video data displayed on the reproducing video screen 23a. More precisely, if the video data displayed on the reproducing video screen 23a is a dynamic image reproduced from the hybrid recorder 3, the letters "PLAY" are displayed, while if it is a still image, the letters "STILL" are displayed.

The recording video marking area 24 will be used to mark the clipped image data of an in point or an out point from the video data displayed on the recording video screen 21a. Here "marking" means specifying or setting the in point or the out point. And here "clipped image" shows "still image". The recording video marking area 24 is divided into the following areas: an in-clip displaying area 24a; in-point's time-code displaying area 24b; mark-in button 24c; out-clip displaying area 24d; out-point's time-code displaying area 24e; and mark-out button 24f.

The in-clip displaying area 24a will be used to display the clipped image data which has marked as the in point by the operator by clicking the mark-in button 24c. The clipped image data to be displayed in the in-clip displaying area 24a is image data obtained from the composite video signal V2 which is supplied from the hybrid recorder 3, and its image size has thinned out to 95×60 pixels.

In the time-code displaying area 24b, the time code of the clipped image data displayed in the in-clip displaying area 24a will be displayed. The time code is that has extracted from the composite video signal V2 by the processor controller 11a in the first video processor 11 when the operator marked the in point by clicking the mark-in button 24c.

The mark-in button 24c will be used to mark an in point. The operator clicks the mark-in button 24c while monitoring the video data displayed on the recording video screen 21a. If the mark-in button 24c is clicked, (95×60-pixel) clipped image data which corresponds to the video data displayed on the recording video screen 21a is generated and displayed to the in-clip displaying area 24a.

The out-clip displaying area 24d will be used to display the out-point clipped image data which has marked by the operator by clicking the mark-out button 24f. The clipped image data to be displayed in the out-clip displaying area 24d is image data obtained from the composite video signal V2 which is supplied from the hybrid recorder 3, and its image size has thinned out to 95×60 pixels.

In the time-code displaying area 24e, the time code of the clipped image data displayed in the out-clip displaying area 24d will be displayed. This time code is that has extracted from the composite video signal V2 by the processor controller 11a in the first video processor 11 when the operator marked the out point by clicking the mark-out button 24f.

The mark-out button 24f will be used to mark an out point. The operator clicks the mark-out button 24f while monitoring the video data displayed on the recording video screen 21a. If the mark button 24f is clicked, (95×60-pixel) clipped image data which corresponds to the video data displayed on the recording video screen 21a is generated and displayed to the out-clip displaying area 24d.

The reproducing speed setting area 25 will be used to set the reproducing speed of the selected event. The operator sets the reproducing speed while monitoring the data displayed therein. The details of the reproducing speed setting area 25 will be described later.

The recycle box 26 will be used to clear the generated clipped image data. If the clipped image data is specified by the mouse 2d and dragged to the recycle box 26, it is cleared. In the case of restoring thus cleared clipped image data, if the recycle box 26 is clicked, all of the clipped image data stored in the recycle box 26 is displayed. And if the clipped image data which is wanted to be restored is clicked among them, the specified clipped image data is restored.

The reproducing video marking area 27 will be used to mark an in-point clipped image data or an out-point clipped image data from the video data displayed on the reproducing video screen 23a. The reproducing video marking area 27 is divided into the following areas: an in-clip displaying area 27a; in-point's time-code displaying area 27b; mark-in button 27c; out-clip displaying area 27d; out-point's time-code displaying area 27e; and mark-out button 27f.

The in-clip displaying area 27a will be used to display the clipped image data which has marked as the in point by the operator by clicking the mark-in button 27c. The clipped image data to be displayed in the in-clip displaying area 27a is clipped image data obtained from the composite video signal V3 which is supplied from the hybrid recorder 3, and its image size has thinned out to 95×60 pixels.

In the time-code displaying area 27b, the time code of the clipped image data displayed in the in-clip displaying area 27a is displayed. The time code is that has extracted from the composite video signal V3 by the processor controller 12a in the second video processor 12 when the operator marked the in point by clicking the mark-in button 27c.

The mark-in button 27c will be used to mark an in point. The operator clicks the mark-in button 27c while monitoring the video data displayed on the reproducing video screen 23a. If the mark-in button 27c is clicked, (95×60-pixel) clipped image data which corresponds to the video data displayed on the reproducing video screen 23a is generated and displayed to the in-clip displaying area 27a.

The out-clip displaying area 27d will be used to display out-point clipped image data which has marked by the operator by clicking the mark-out button 27f. The clipped image data to be displayed in the out-clip displaying area 27d is image data obtained from the composite video signal V3 which is supplied from the hybrid recorder 3, and its image size has thinned out to 95×60 pixels.

In the time-code displaying area 27e, the time code of the clipped image data displayed in the out-clip displaying area 27d is displayed. This time code is that has extracted from the composite video signal V3 by the processor controller 12a in the second video processor 12 when the operator marked the out point by clicking the mark-out button 27f.

The mark-out button 27f will be used to mark an out point. The operator clicks the mark-out button 27f while monitoring the video data displayed on the reproducing video screen 23a. If the mark-out button 27f is clicked, (95×60-pixel) clipped image data which corresponds to the video data displayed on the reproducing video screen 23a is generated and displayed to the out-clip displaying area 27d.

The clip displaying area 28 will be used to display the clipped image data which has marked by clicking the mark-in button 24c or the mark-out button 24f provided in the recording video marking area 24, and also the clipped image data which has marked by clicking the mark-in button 27c or the mark-out button 27f provided in the reproducing video marking area 27. Note that, the clipped image data to be displayed in the clip displaying area 28 is clipped image data which has not used as the in point or the output of an event. The clipped image data used as the in point or the output point of an event is displayed to the event displaying area 29. The clip displaying area 28 has the following areas: a clipped-image-data displaying area 28a; time-code displaying area 28b; clip-type displaying area 28c; clip-number displaying area 28d; forwarding button 28e; and reverse button 28f.

The clipped-image-data displaying area 28a is the clipped image data moved from any one of the in-clip displaying area 24a, the out-clip displaying area 24d on the recording side, and the in-clip displaying area 27a, the out-clip displaying area 27d on the reproducing side, and having 95×60 pixels of the image size.

In the time-code displaying area 28b, the time code of the clipped image data displayed in the clipped-image-data displaying area 28a is displayed. If the clipped image data is moved from any one of the following areas: the in-clip displaying area 24a; out-clip displaying area 24d; in-clip displaying area 27a; and out-clip displaying area 27d, its time code is moved together with the clipped image data to the clipped-image-data displaying area 28a.

In the clip-type displaying area 28c, the data showing that is in-point clipped image data or out-point clipped image data being displayed in the clipped-image-data displaying area 28a. For instance, if the clipped image data displayed in the clipped-image-data displaying area 28a is the clipped image data obtained from the in-clip displaying area 24a, the red letters "IN" are displayed. While if it is the clipped image data from the out-clip displaying area 24d, the red letters "OUT" are displayed. Besides, if it is the clipped image data from the in-clip displaying area 27a, the blue letters "IN" are displayed. And if it is the clipped image data from the out-clip displaying area 27a, the blue letters "OUT" are displayed.

In the clip-number displaying area 28d, the clip number which has added to the clipped image data displayed in the clipped-image-data displaying area 28a will be displayed. This clip number will be automatically added to each clipped image data in the marking order.

The forwarding button 28e will be used to forward the display of the clipped image data in the clip displaying area 28, and the reverse button 28f will be used to reverse that. However, since the size of the clip displaying area is limited, if large number of clipped image data has generated, all of the clipped image data cannot be displayed at once. In such case, by operating the forwarding button 28e or the reverse button 28f to forward or reverse the clipped image data, all of the clipped image data can be displayed on the monitor.

The event displaying area 29 will be used to display the clipped image data of the event which has generated by sequentially clicking the mark-in button 24c and the mark-out button 24f provided in the recording video marking area 24, and also the clipped image data of the event which has generated by sequentially clicking the mark-in button 27c and the mark-out button 27f provided in the reproducing video marking area 27. Either of the in-point clipped image data or the out-point clipped image data will be displayed per event. The event displaying area 29 has the following units similarly to the clip displaying area 28: a clipped-image-data displaying area 29a; time-code displaying area 29b; clip-type displaying area 29c; event-number displaying area 29d; forwarding button 29e; and reverse button 29f, and more has an event-title displaying area 29g.

In the clip-type displaying area 29c, the data showing that is the clipped image data of the event displayed in the clipped-image-data displaying area 29a of an in point or an out point, will be displayed. If the clipped image data of the in point is displayed as the clipped image data of the event, the letters "IN" are displayed to the clip-type displaying area 29c. Here, in the case where the out-point clipped image data is wanted to be displayed instead of the in-point clipped image data, the operator may click this clip-type displaying area 29c, then the out-point clipped image data is displayed. Thereafter, the display will be switched between the in-point clipped image data and the out-point clipped image data for every click of the clip-type displaying area 29c.

In the event-number displaying area 29d, the event number added to each generated event will be displayed. This event number is automatically added to each event in the generation order and no relative to the clip number.

In the event-title displaying area 29g, the title added to the event will be displayed in letters. Note that, this title can be registered for every events by means of a title menu.

The program displaying area 30 will be used to produce a program by copying the event displayed in the event displaying area 29, and in which a copy of the clipped image data of the event displayed in the event displaying area 29 is displayed. In the case of producing the program by rearranging the event, the clipped image data of the event displayed in the event displaying area 29 is first dragged and copied to the program displaying area 30. Thereby, the program can be produced by freely rearranging the event displayed in the event displaying area 29. At this time, even if the clipped image data of the event displayed in the program displaying area 30 is dragged and moved again to the other position within the program display area 30 again, the event can be freely rearranged within the program displaying area 30. In this case, the event is not copied but moved.

This program displaying area 30 has the following units similarly to the event displaying area 29: a clipped-image-data displaying area 30a; time-code displaying area 30b; clip-type displaying area 30c; event-number displaying area 30d; forwarding button 30e; reverse button 30f; and event-title displaying area 30g. Note that, the description of these units is omitted since these are the same as the units in the event displaying area 29.

A VTR remote button 36 is a button for opening a panel for VTR control for operating the VTR provided in the hybrid recorder 3. If this VTR remote button 36 is clicked, the CPU 10 detects that the VTR remote button 36 has pushed, and displays the panel for VTR control at a predetermined position on the GUI displayed on the monitor 2b. Therefore, the operator can perform a desired operation to the VTR by clicking various command buttons displayed in this panel for VTR control.

A hard-disk remote button 37 is a button for opening a panel for hard-disk control for operating the hard-disk array provided in the hybrid recorder 3. If this hard-disk remote button 37 is clicked, the CPU 10 detects that the hard-disk remote button 37 has pushed, and displays the panel for hard-disk control at a predetermined position on the GUI displayed on the monitor 2b. Therefore, the operator can perform a desired operation to the hard-disk array by clicking various command buttons displayed in this panel for hard-disk control.

A dubbing setting button 38 is a button for opening a dialog (window) for dubbing setting for setting dubbing processing from the VTR in the hybrid recorder 3 to the hard-disk array or dubbing processing from the hard-disk array to the VTR. If this dubbing setting button 38 is clicked, the CPU 10 detects that the dubbing setting button 38 has pushed, and displays the dialog for dubbing setting such as shown in FIG. 4, at a predetermined position on the GUI displayed on the monitor 2b.

Figure 4:
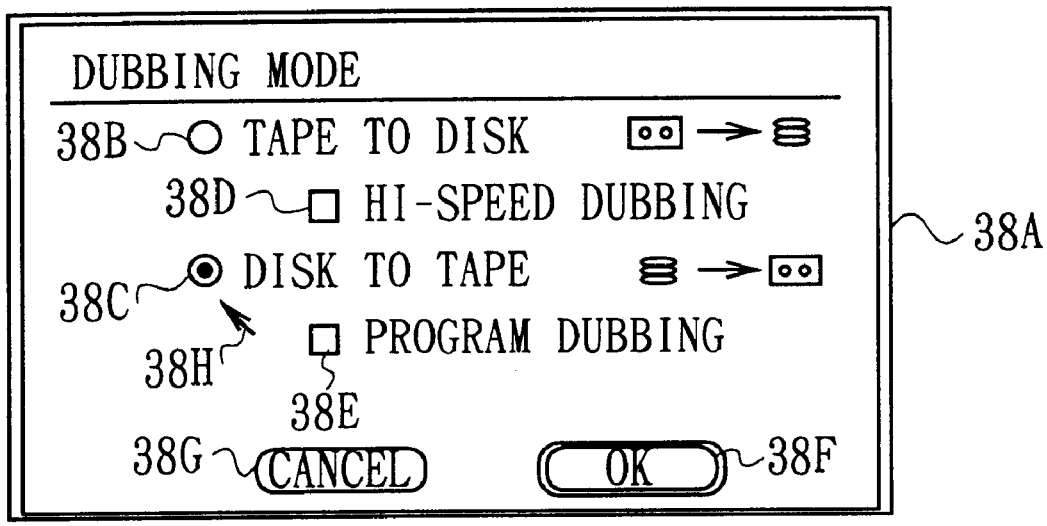
FIG. 4 is a schematic diagram showing a dubbing setting dialog displayed when a dubbing setting button is operated.

In the dubbing setting dialog 38A, as shown in FIG. 4, a tape-to-disk button 38B for setting an object to be dubbed from the VTR to the hard-disk array, a disk-to-tape button 38C for setting an object to be dubbed from the hard-disk array to the VTR, a high-speed dubbing button 38D for setting high-speed dubbing, a program dubbing button 38E for dubbing a produced program, a determination button 38F for determining the contents of setting, and a cancel button 38G for canceling the contents of setting, are displayed.

The tape-to-disk button 38B is a button used when a dubbing mode for reading video data out from a video tape loaded in the VTR and recording this to the hard-disk array. If the cursor 38H is moved on the tape-to-disk button 38B and clicking operation is performed, the CPU 10 detects that the above button 38B has pushed, and sets the VTR as a readout device of the video data and sets the hard-disk array as a recording device of the video data.

The high-speed dubbing button 38D is a button to be set when the dubbing processing from a video tape to the hard disk is performed by high-speed (e.g., 4-time speed) dubbing. In the case of setting this high-speed dubbing, if the cursor 38H is moved on the high-speed dubbing button 38D and clicking operation is performed, the high-speed dubbing is set. Note that, in the case of performing the high-speed dubbing, the video data recorded on the video tape is required to be compressively coded. That is, at the time of high-speed dubbing, high-speed ability is realized by recording the video data which is compressively coded at the time of high-speed dubbing to the hard-disk array as in the state of compressively coded. Therefore, if the video data recorded on the video tape is analog video data, high-speed dubbing cannot be performed, thus, only the tape-to-disk button 38B is naturally pushed.

The disk-to-tape button 38C is a button for setting the dubbing mode in which the video data recorded in the hard-disk array is read out and recorded to a video tape loaded in the VTR. If the cursor 38H is moved on the disk-to-tape button 38C and clicking operation is performed, the CPU 10 detects that the button 38C has pushed, sets the hard-disk array as the read-out device of the video data, and sets the VTR as the recording device of the video data.

The program dubbing button 38E is a button to be set when a program produced in the program displaying area 30 is dubbed. If after the disk-to-tape button 38C is clicked, this program dubbing button 38E is clicked, the CPU 10 sets the video data to be dubbed as a program produced in the program displaying area 30.

Note that, if these tape-to-disk button 38B, the disk-to-tape button 38C, the high-speed dubbing button 38D and the program dubbing button 38E are clicked once, these contents are set, and if clicked again, these contents are canceled.

The determination button 38F is a button to be operated when the contents of dubbing condition set by the tape-to-disk button 38B, the disk-to-tape button 38C, the high-speed dubbing button 38D and the program dubbing button 38E are determined. If this determination button 38F is clicked, the CPU 10 detects this, determines all of the setting contents, and closes this dubbing setting dialog 38A (that is, makes the display disappear).

The cancel button 38G is a button to be operated when all of the dubbing conditions set by the tape-to-disk button 38B, the disk-to-tape button 38C, the high-speed dubbing button 38D and the program dubbing button 38E are canceled. If this cancel button 38G is clicked, the CPU 10 detects this, cancels the all of the setting contents, and closes this dubbing setting dialog 38A.

A recording-start button 31a and a recording-stop button 31b will be used to supply the control commands of recording start and recording stop to the hybrid recorder 3. If the recording-start button 31a is clicked, the CPU 10 detects that the recording-start button 31a was pushed, and instructs to supply the recording-start command to the external interface 18. The external interface 18 receives this instruction and sends a recording-start command (REC START command) which has been defined by the RS-422 to the hybrid recorder 3. The hybrid recorder 3 starts recording operation responding to the recording-start command received.

Figure 5:
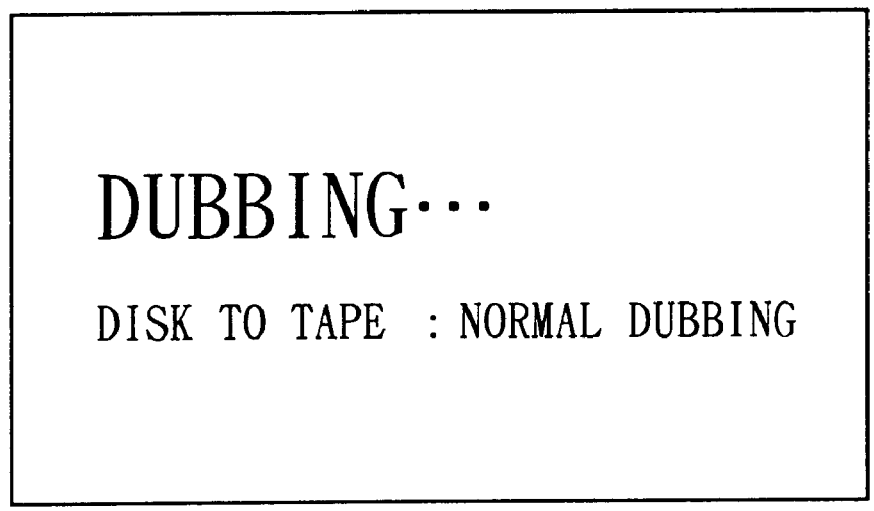
FIG. 5 is a schematic diagram showing graphic data displayed when in dubbing processing.

Note that, if this recording-start button 31a is clicked in the state where various setting contents of dubbing processing have registered and the dubbing button 22i has pushed, dubbing processing based on the dubbing setting contents is executed. In this connection, if the dubbing processing is executed, the video data to which the dubbing processing is being performed is displayed on the recording video screen 21a, and a graphical display showing under the dubbing processing is displayed on the reproducing video screen 23a as shown in FIG. 5. That is, as shown in FIG. 5, the characters, "DUBBING", and the characters showing the contents of the dubbing, "Disk to Tape" and "Normal Dubbing", are displayed.

On the contrary, if the recording-stop button 31b is clicked, the CPU 10 detects that the recording-stop button 31b was pushed, and instructs to supply the recording-stop command to the external interface 18. The external interface 18 receives this instruction and sends a recording-stop command (REC STOP command) which has been defined by the RS-422 to the hybrid recorder 3. The hybrid recorder 3 stops the recording operation responding to the recording-stop command received.

Note that, if this recording-stop button 31b is clicked under the dubbing processing from the VTR to the hard-disk array or from the hard-disk array to the VTR, the dubbing processing is stopped.

The preview button 32 will be used to preview the selected event and program, i.e., confirm the contents. If an event or a program is specified, the clipped image data of the specified event or program is displayed on the reproducing video screen 23a in a still image. At this time, if the preview button 32 is clicked, the CPU 10 detects that the preview button 32 was pushed, and instructs to supply a reproducing starting command to the external interface 18. The external interface 18 receives this instruction and sends a reproducing starting command (PLAY START command) which has been defined by the RS-422 to the hybrid recorder 3. The hybrid recorder 3 starts the reproduction of the specified event or the program in the composite video signal V3 from the hard-disk array (or the VTR) responding to the reproducing starting command received.

A new-event button 33 will be used to newly generate an event. In the case of registering the event whose in point and out point have changed from the event specified by the operator as another new event, the new-event button 33 is clicked.

A replace button 34 is used if the operator wants to change the in point and the out point of the selected event. In the case of replacing the event whose in point and out point have changed from the event specified by the operator as the very specified event not as another new event, the replace button 34 is clicked.

A delete button 35 will be used to clear the selected event and program. The cleared event and program are stored to the recycle box 26.

(3-2) Time-Line Mode

Figure 6:
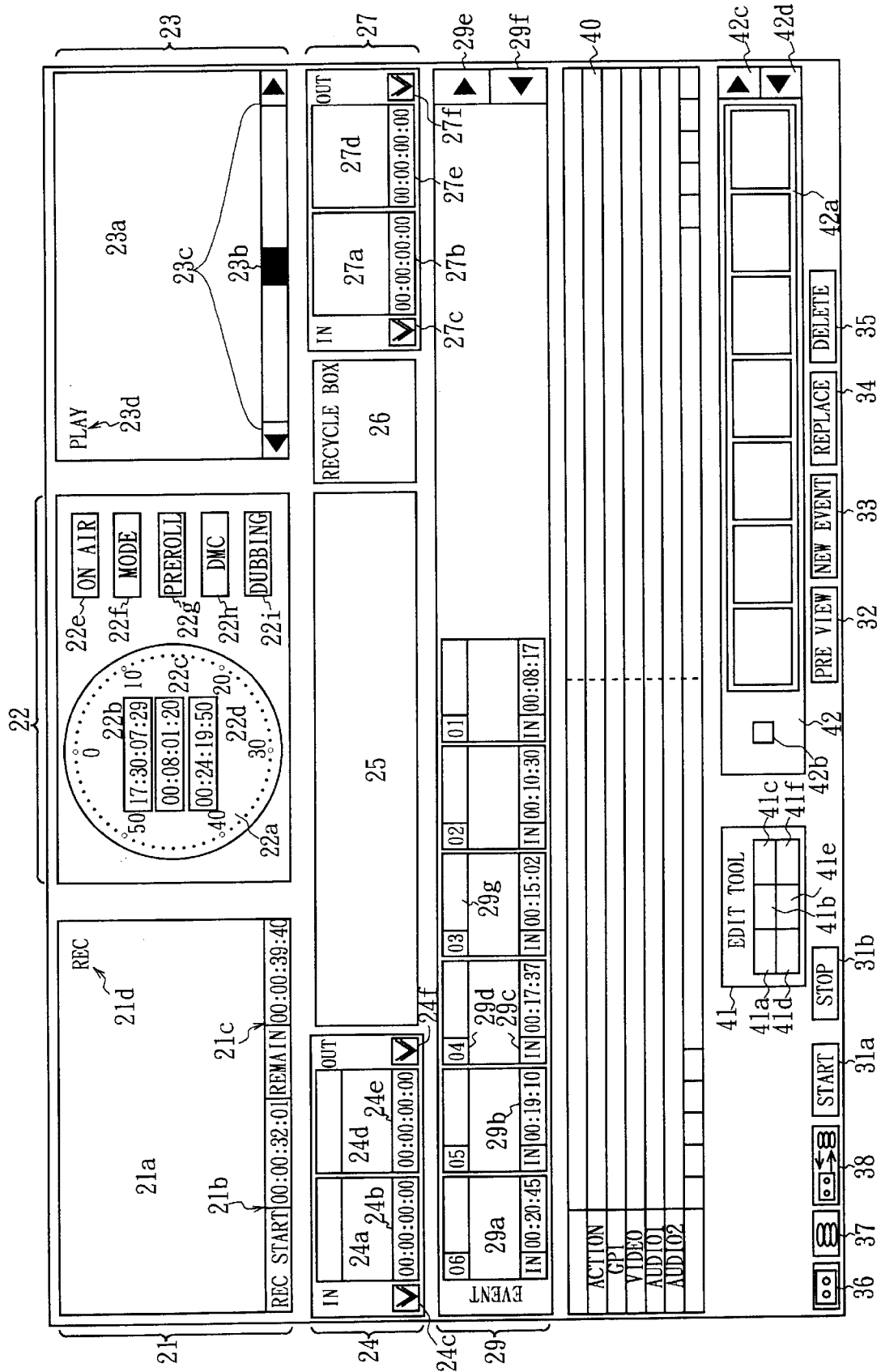
FIG. 6 is a schematic diagram showing a GUI in a time line mode.

Secondly in this chapter, a time-line mode will be described. In case of the time-line mode, a graphic display shown in FIG. 6 will be displayed on the monitor 2b. As shown in FIG. 6, the graphic display of time-line mode is divided into eleven areas: a recording video displaying area 21; timing displaying area 22; reproducing video displaying area 23; recording video marking area 24; reproducing speed setting area 25; recycle-box area 26; reproducing video marking area 27; event displaying area 29; time-line displaying area 40; edit-tool displaying area 41; and program-view area 42.

Note that, the recording video displaying area 21, timing displaying area 22, reproducing video displaying area 23, recording video marking area 24, reproducing speed setting area 25, recycle-box area 26, reproducing video marking area 27, event displaying area 29 and various control command buttons in the lower stage are the same as the areas in the picture mode shown in FIG. 3.

Figure 7:
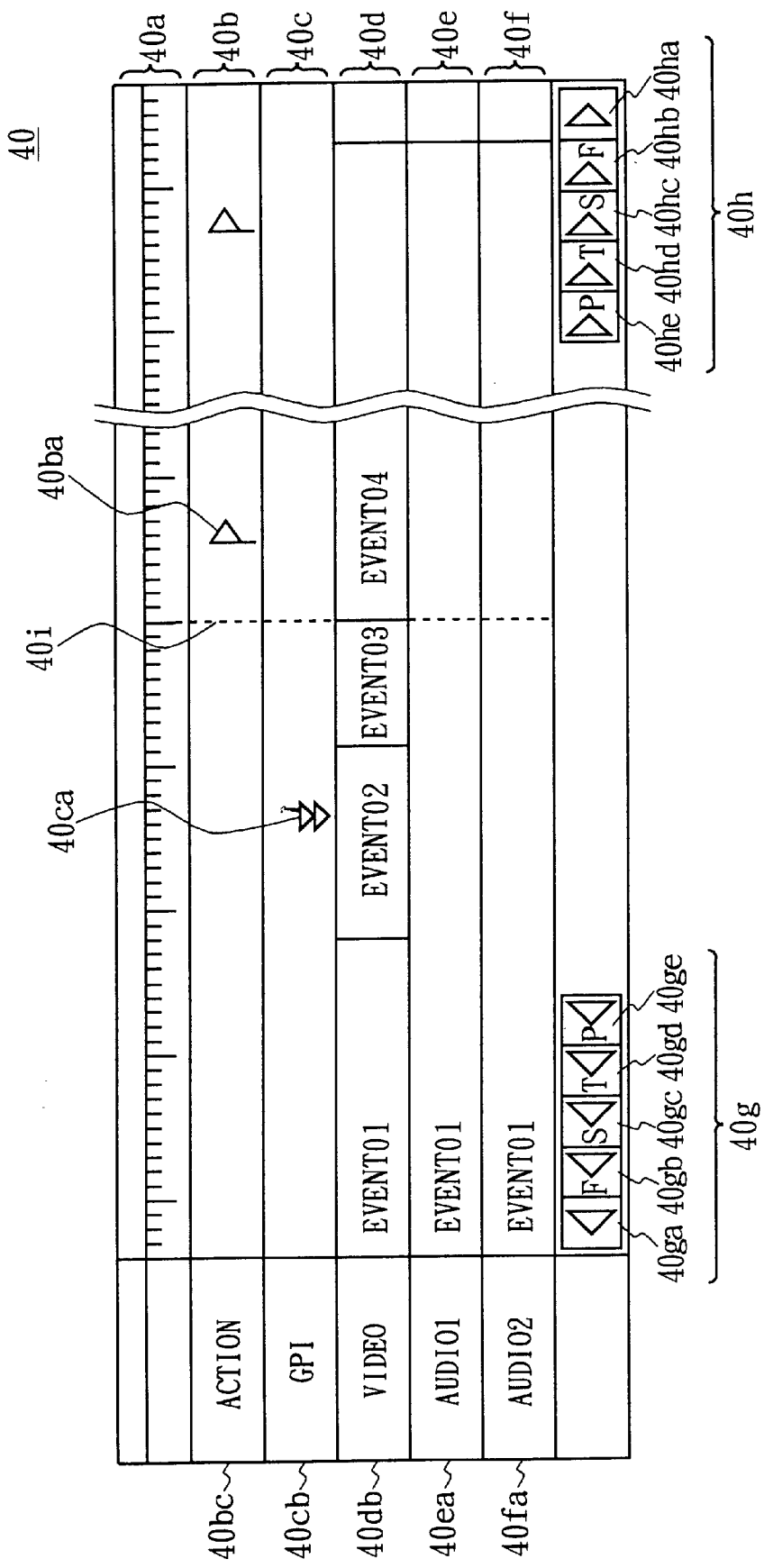
FIG. 7 is a schematic diagram showing arrangement in a time-line displaying area.

The time-line displaying area 40 can be used to edit a program while confirming the temporal length of each event. As shown in FIG. 7, the time-line displaying area has the following areas: a time-scale displaying area 40a; action displaying area 40b; GPI area 40c; video-edit area 40d, first and second audio-edit areas 40e and 40f; scroll buttons 40g and 40h; and edit bar 40i.

In the time-scale displaying area 40a, a time scale will be displayed. The temporal length of each event is to be shown based on the time scale. This time scale is shown in a frame unit and the minimum unit of the scale can be set to any number of frames by user's setting.

The action displaying area 40b will be used to specify the position stopping the operation when a program or event is previewed or sent out. The stop position can be set to an arbitrary position regardless of the in point and the out point. Furthermore, a stop flag 40ba will be displayed at the specified position as shown in FIG. 7, thus the operator can easily confirm his specified position. By specifying the stop position in the action displaying area 40b as described above, the program or event of an arbitrary period can be previewed or sent out. Note that, in the case of making the stop position specified by the action displaying area 40b be effective, the action button 40bcshould be clicked.

A GPI area 40c will be used to specify the output point of the control commands of a general purpose interface (GPI: a general purpose interface for controlling an external instrument by sending out control commands from an editing system). The GPI output point can be set to any position regardless of the in point and the out point. Also a mark 40ca will be displayed at the position of the GPI output point, and thus the operator can easily confirm the his specified position. Since the GPI output point is specified in the GPI area 40c as described above, the external instrument can be controlled by supplying the control command at the specified output point. Note that, in the case of making the GPI output point specified by the GPI area 40c be effective, the GPI button 40cb should be clicked.

The video-edit area 40d will be used to edit a program by rearranging the event dragged from the event displaying area 29, etc. The event to be displayed in the video-edit area 40d is an event dragged from the event displaying area 29 or called by a program calling button in the program-view area 42 which will be described later and displayed in the program displaying area 30 in the picture mode. In this video-edit area 40d, the clipped image data of the in point and the out point of the event will not be displayed as when in the picture mode, but the event number and the title added to the event will be displayed. However, it is so intended that the size of the display area of each event becomes different according to the length of the event, thereby the length of the event can be visually confirmed comparing with the time scale in the time-scale displaying area 40a. Moreover, since the length of each event can be visually confirmed, also the length of entire edited program can be visually confirmed. Consequently, whether the edited program is within the desired length or not can be easily confirmed.

Besides, in the video-edit area 40d, each event can be moved to an arbitrary position and any event can be cut into the other event, so that a program in the desired order can be produced by rearranging events to any order. In this connection, when the event is moved or cut into, the events are linked without generating a space.

The moving position or cutting-into position of an event will be specified by the edit bar 40i being the reference position mark. This edit bar 40i will be fixedly displayed at the almost center of the screen. In the case of specifying the moving position or cutting-into position, the proposed moving position or cutting-into position is adjusted to the edit bar 40i by scrolling the event display; and thus the position is specified as the moving position or cutting-into position.

Note that, in the case of operating the video-edit area 40d, by clicking the video button 40db, the video-edit area 40d becomes an operable state.

The first and the second audio-edit areas 40e and 40f will be used to edit the audio data of each event. In the case of fetching the audio data into the first and the second audio-edit areas 40e and 40f, by clicking audio buttons 40ea and 40fa and dragging the event from the event displaying area 29, the audio data of the event can be fetched.

Note that, as to the fetched audio data, the event number and the title added to the event is displayed.

Also in the first and second audio edit areas 40e and 40f, the audio data of each event can be moved to any position, and the audio data of an arbitrary event can be cut into the audio data of the other event, similarly to the video-edit area 40d. At this time the position can be specified by adjusting the proposed moving position or cutting-into position to the edit bar 40i by scrolling the audio data in similar manner.

The first audio-edit area 40e and the second audio-edit area 40f are different only in its stereo output, that is, the former has on the right side and the latter has on the left side.

Scroll buttons 40g and 40h will be used to operate in the case of scrolling the period from action displaying area 40b to second audio-edit area 40f as a whole rightward or leftward. If either of the scroll buttons 40g and 40h that is wanted to be forwarded is clicked, the display is scrolled toward the direction.

These scroll buttons 40g and 40h are divided into the following buttons: 40ga and 40ha used to execute the scroll in the scale unit of the time scale displayed in the time-scale displaying area 40a; 40gb and 40hb used to execute the scroll in a frame unit; 40gc and 40hc used to execute the scroll in a second unit; 40gd and 40hd used to execute the scroll in a time unit; and 40ge and 40he used to execute the scroll in an in-point unit.

Hereinafter, a description of the time-line mode is performed again referring to FIG. 6. The edit-tool displaying area 41 displayed at the lower of the time-line displaying area 40 is a command button to instruct a command used in program edition in the time-line displaying area 40. The edit-tool displaying area 41 is composed of the following buttons: an action tool button 41a; sole-event-moving tool button 41b; track tool button 41c; ripple-edition tool button 41d; over-lay tool button 41e; and clear tool button 41f.

The action-tool button 41a will be operated in the case of setting the stop flag 40ba to the action displaying area 40b in the time-line displaying area 40 described above. In the case of setting the stop flag 40ba, by scrolling the event by operating the scroll button 40g or 40h and adjusting the position where the stop flag 40ba is wanted to be set to the edit bar 40i and then clicking the action-tool button 41a, the stop flag 40ba is set to the edit bar 40i and the stop flag 40ba is displayed thereto.

The sole-event-moving-tool button 41b will be used to select and move one of the event in the video-edit area 40d and the audio data in the audio-edit areas 40e and 40f. For example, in the case of moving an event in the video-edit area 40d, the operator first clicks a video button 40db in the video-edit area 40d and scrolls the event, and adjusting the moving position to the edit bar 40i. Then the operator clicks the sole-event-moving tool button 41b and then clicks the event that he wants to move. Thereby, the clicked event is moved to the position of the edit bar 40i.

The track-tool button 41c will be used to select an event in the video-edit area 40d or audio data in the audio-edit areas 40e and 40f, and move all of the data after the selected data together. Also when moving an event using the track-tool button 41c, the operator clicks the video button 40db or the audio buttons 40ea and 40fa and adjusts the moving position to the edit bar 40i, thereafter, sequentially clicks the track-tool button 41c and the event to be moved basically.

The ripple-edit tool button 41d will be used to select one of events in the video-edit area 40d and audio data in the audio-edit areas 40e and 40f, and moves the selected one to the desired position in the other event by cutting into.

The over-lay tool button 41e will be used to select an event in the video-edit area 40d and audio data in the audio-edit areas 40e and 40f, and move the selected one to the other event and overwriting thereto.

Also these operational procedures are basically similar to the sole-event-moving tool button 41b etc.

The clear tool button 41f will be used to select an event in the video-edit area 40d or audio data in the audio-edit areas 40e and 40f and clearing, and also to release the setting of the stop flag 40ba etc. In the case of clearing or releasing the setting by the clear-tool button 41f, the operator clicks the clear tool button 41f and then clicks the object to be cleared or the object to be released the setting.

The program-view area 42 displayed at the lower of the time-line displaying area 40 is described hereinafter. In the time-line displaying area 40, the length of event displaying area will be basically changed according to the length of each event, so that the length of each event can be visually seen easily. However, since no clipped image data of each event have been displayed, it might become not easy to grasp what images each event has. Then, in the editing system 1, the program-view area 42 is provided as to be able to easily see what images each event has, even in the time-line mode.

The program-view area 42 has a view area 42a, program-call button 42b, forwarding button 42c and reverse button 42d.

The view area 42a will be used to display the in-point clipped image data or the out-point clipped image data of each event. The order of the clipped image data to be displayed in the view area 42a agrees with the order of events in the program produced by the time-line displaying area 40. Therefore the order of events in the program produced by the time-line displaying area 40 can be easily confirmed by the clipped image data, and have the images been placed in how order in the program can be confirmed easily. In this connection, each clipped image data to be displayed in the view area 42a is the image data generated by thinning out the clipped image data in the event displaying area 29, and its image size is almost the half the clipped image data displayed in the event displaying area 29.

The program call button 42b will be used to enter a program calling instruction to call an event displayed in the program displaying area 30 in the picture mode to the time-line displaying area 40 and view area 42a. If the program call button 42b is clicked, calling the program is instructed, so that the events displayed in the program displaying area 30 in the picture mode can be called to the time-line displaying area 40 as it is in order. Similarly, also in the view area 42a, the clipped image data having the same order as the program displaying area 30 is called and displayed. In this manner, calling the program can be instructed by providing the program-call button 42b, thereby the program produced in the other mode can be called easily to the time-line mode; and thus the time adjustment can be easily edited even as to the program produced in the other mode.

The forwarding button 42c and the reverse button 42d will be used to forward or reverse the display of the clipped image data in the view area 42a. In the case where the produced program is composed of a plurality of events, all of the clipped image data cannot be displayed in the view area 42a. In such case, this forwarding button 42c or reverse button 42d is operated to forward or reverse the clipped image data, and displaying thus all of the clipped image data.

(4) Clipped Image Data Managing Method

A method of storing clip data, event data and program data is described hereinafter. Here the "clip data" includes the data used to display the clipped image data to the clip displaying area 28 and the data used to store the clipped image data. This respect is similar as to the event data and program data.

First, the first management record data for clip data, event data and program data will be described referring to FIG. 8.

The first management record data will be provided one by one for clip data, event data and program data. That is, the first management record data for clip data is data used to manage all of the clipped image data displayed in the clip displaying area 28. The first management record data for event data is data used to manage all of the clipped image data displayed in the event displaying area 29. And the first management record data for program data is data used to manage all of the clipped image data displayed in the program display area 30. In this embodiment, the sole first management recorded is provided for clip data, event data and program data, respectively.

The first management record data has data regarding the following things: the pointer to the data linked before; pointer to the data linked after; horizontal size of display for one page; vertical size of display for one page; display position on the screen; head position of display; and total number of links.

The "pointer to the data linked before" is data showing the pointer of the management record data which is linked before the first management record data. If no management record data is linked before, the pointer of the first management record data is stored.

The "pointer to the data linked after" is data showing the pointer of the management record data which is linked after the first management record data. If no management record data is linked after, the pointer of the first management record data is stored.

The "horizontal size of the display for one page" is data showing the maximum displayable number in horizontal of the clipped image data in each display area of the clip displaying area 28, event displaying area 29 and program displaying area 30. In this embodiment, the clip displaying area 28, event displaying area 29 and program displaying area 30 can display eleven clipped image data respectively, therefore the data showing "eleven" has been stored to the respective first management record data as the horizontal size of the display for one page.

The "vertical size of display for one page" is data showing the maximum displayable number in vertical of the clipped image data in each display area, the clip displaying area 28, event displaying area 29 and program displaying area 30. In this embodiment, these areas all display the sole clipped image data respectively, so that the data showing "one" has been stored to the respective first management record data as the vertical size of display for one page.

The "display position on the screen" is data used to show which display area will display the clipped image data. In this embodiment, the clip displaying area 28 will be provided at the lower stage on the screen; the event displaying area 29 at the middle stage; and the program displaying area 30 at the upper stage. Then if it is the first management record data for clip data, the data showing the "lower stage" is stored as a display position on the screen; if being for event data, the "middle stage" is stored; and if being for program data, the "upper stage" is stored.

The "head position of display" is data showing will the clipped image data is to be displayed from which position in the clip displaying area 2B, event displaying area 29 and program displaying area 30 respectively. In this embodiment, eleven clipped image data will be displayed in the clip displaying area 28; eleven clipped image data will be displayed in the event displaying area 29; and eleven clipped image data will be displayed in the program displaying area 30, i.e., thirty-three clipped image data can be displayed. These thirty-three displayed positions will be managed by numbering them from the upper stage of the screen. For example, the following is predetermined: the display position in the program displaying area 30 is for "1"–"11"; the event displaying area 29 is for "12"–"22"; and the clip displaying area 28 is for "23"–"33". Accordingly, if it is the first management record data for clip data, the data showing "23" is stored as the head position of the display; if being for event data, "12" is stored; and if being for program data, "1" is stored.

The "total number of links" is data showing the total number of management record data linked after the first management record data.

Secondly, the second management record data for clip data is described referring to FIG. 9. The second management record data for clip data is data used to manage the clipped image data being displayed in the clip displaying area 28 for every clipped image data. Therefore, the same number of second management record data for clip data as the clipped image data being displayed to the clip displaying area 28 are found.

The second management record data for clip data has the pointer to the data linked before, pointer to the data linked after, property, clipped-image-data handle, clip type, time-code data and index number of the clipped image data.

The "pointer to the data linked before" is data showing the pointer of the management record data which is linked before the second management record data. Because the second management record data invariably has the first management record data or the second management record data its before, the pointer of the data linked before is necessarily stored.

The "pointer to the data linked after" is data showing the pointer of the management record data which is linked after the second management record data. If there is no management record data linked after, the pointer of the second management record data is stored.

The "property" is data showing is the second management record data for clip data, event data or program data.

The "clipped-image-data handle" is data showing an address to which the clipped image data has been stored. Thereby, referring to the clipped-image-data handle in the second management record data which corresponds to the desired clipped image data, the address in which the clipped image data has been stored can be obtained.

The "clip type" is data showing which clipped image data of an in point or an out point managed by the second management record data is.

The "time-code data" is data showing the time code of the clipped image data managed by the second management record data.

The "index number of the clipped image data" is an index number added to the clipped image data. This index number is a number added to all of the marked clipped image data regardless of the generation of an in point, out point and event. That is, the index number is the same number as the clip number displayed to the clip-number displaying area 28d. All of the clipped image data will be managed by the index number.

Thirdly, the second management record data for event data and program data will be described referring to FIG. 10. The second management record data for event data is data used to manage the clipped image data displayed in the event displaying area 29 for every clipped image data. Therefore, the same number of the second management record data for event data are found as the clipped image data being displayed in the event displaying area 29. Similarly, the second management record data for program data is data used to manage the clipped image data displayed in the program displaying area 30 for every clipped image data. Therefore, the same number of the second management record data for program data as the clipped image data being displayed in the program display area 30 will be found.

The second management record data for event data and program data have the following items: the pointer to the data linked before; pointer to the data linked after; property; event number; title; subtitle; in-point clipped-image-data handle; clip type of the in point; time-code data of the in point; index number of the in-point clipped image data; out-point clipped-image-data handle; clip type of the out point; time-code data of the out point; index number of the out-point clipped image data; slow type; symbol type; time-code data of the symbol.

Since the "pointer to the data linked before", "pointer to the data linked after" and "property" are similar to that of the second management record data for clip data, these descriptions are omitted here.

The "event number" is a number to be added to each event in generation order. The event number will be displayed to the event-number displaying area 29d.

The "title" and the "subtitle" are a title and a subtitle which have been previously added to the registered event, these have been stored in the actual characters. The title will be displayed to the title displaying area 29g.

The "in-point clipped-image-data handle" is data showing an address to which the in-point clipped image data has been stored. Thereby, referring to the in-point clipped-image-data handle in the second management record data which corresponds to the desired in-point clipped image data, the address to which the in-point clipped image data has been stored can be obtained.

The "clip type of the in point" is data showing which clipped data of an in point or an out point the in-point clipped image data managed by the second management record data is. Since all of them is the in-point clipped image data in this case, the data showing "in point" will be stored.

The "time-code data of in point" is data showing the time code of the in-point clipped image data managed by the second management record data.

The "index number of the in-point clipped image data" is an index number to be added to the in-point clipped image data. Similarly to the index number in the second management data for clip data described above, the index number of the in-point clipped image data will be added to all of the marked clipped image data regardless of the generation of an in point, out point and event.

The "out-point clipped-image-data handle" is data showing an address to which the out-point clipped image data has been stored. Therefore, referring to the out-point clipped-image-data handle in the second management record data which corresponds to the desired out-point clipped image data, the address to which the out-point clipped image data has been stored can be obtained.

The "clip type of the out point" is data showing which clipped image data the out-point clipped image data managed by the second management record data is, of an in point or an out point. Since all of them is the out-point clipped image data in this case, the data showing "out point" will be stored.

The "out-point time-code data" is the data showing the time code of the out-point clipped image data managed by the second management record data.

The "index number of the out-point clipped image data" is an index number to be added to the out-point clipped image data. Similarly to the index number in the second management record data for clip data described above, the index number of the out-point clipped image data is a number to be added to all of the marked clipped image data regardless of the generation of an in point, out point and event.

The "slow type" is data showing that optional-times reproducing speed different from normal reproducing speed is set or not to an event managed by the second management record data. If 1.0-time normal reproducing speed is set to the event, the data "00000000" is recorded, while if optional reproducing speed other than 1.0-time speed is set to the event, the data "00000001" is recorded as slow type.

The "symbol type" is data showing whether the clipped image data which has been defined as a symbol is found or not in the period between the in point and the out point of the event managed by the second management record data. Here, "symbol" means the typical clipped image data used to show the event.

The "time-code data of symbol" is the time code of the above clipped image data that has been set as a symbol.

How to manage the clipped image data using the first and the second management record data described above, is described hereinafter with a concrete example shown in FIG. 11 through FIGS. 13A to 13C.

The line of "marking" shown in FIG. 11 shows has it marked for an in point or an out point. This example means that marking has performed fifteen times in the following order from the left end: IN, IN, OUT, IN, OUT, IN, IN, IN, OUT, IN, OUT, IN, IN, IN and IN. In the line of "index number", the index number added to the in-point and the out-point clipped image data that has marked, will be shown. The index number is a number to be added to all of the marked clipped image data regardless of being of an in point or an out point. Therefore, as shown in FIG. 11, the index number "1"–"15" will be sequentially added to each clipped image data marked.

In the line of "clip number (clip NO.)", the clip number to be displayed to the clip-number displaying area 28d of the clip displaying area 28 has been shown. Note that, the clip number to be displayed in the clip-number displaying area 28d is the same number as the index number.

In the line of "event number (event NO.)", an event number to be displayed to the event-number displaying area 29d of the event displaying area 29 has been shown. This event number will be automatically added to each event in the generation order of the event regardless of its index number and clip number.

FIG. 12 is a diagram that shows what clipped image data displayed is, to the clip displaying area 28, the event displaying area 29 and the program display area 30 in the case of marking shown in FIG. 11.

In the clip displaying area 28, the clipped image data of the index number "1", "6", "7", "12", "13", and "14" will be sequentially displayed.

In the event displaying area 29, generated four events will be displayed. That is, the clipped image data of the index number "2" is displayed as the event of the event number "1", the clipped image data of the index number "4" is displayed as the event of the event number "2", and the clipped image data of the index number "10" is displayed as the event of the event number "4", respectively.

In the program displaying area 30, the clipped image data is not displayed if only specified its in point and out point. In this example it is assumed that the program such as shown in FIG. 12 has produced by rearranging the four events displayed in the event displaying area 29. The program is a program in which the event of event number "2", the event of event number "4", and the event of event number "1", are continuously aligned in this order. Therefore, in the program displaying area 30, the clipped image data of the index number "4" which has been registered as the event of the event number "2", the clipped image data of the index number "10" registered as the event number "4", and the clipped image data of the index number "2" registered as the event number "1", are displayed.

Figure 13A:
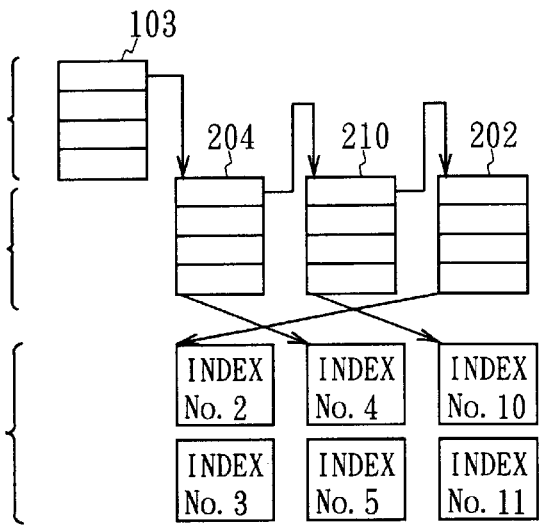
FIGS. 13A to 13C are schematic diagrams illustrating a managing method by the first and the second management record data.
Figure 13B:
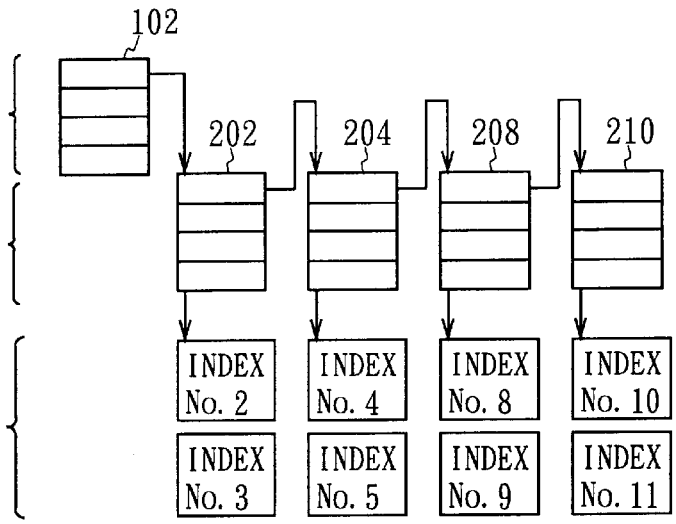
Figure 13C:
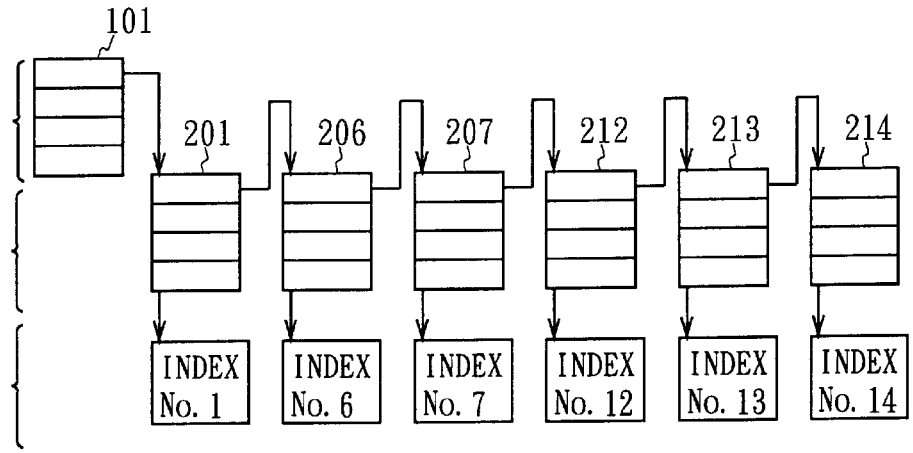

FIGS. 13A to 13C show how to mange the clipped image data by the first and the second management record data.

FIG. 13C shows the state of managing the clipped image data to be displayed to the clip displaying area 28. Management record data 101 is the first management record data for clip data. As shown in FIG. 8, this first management record data 101 for clip data has data used to manage whole clip displaying area 28 and the position of the clipped image data displayed to the clip displaying area 28.

Management record data 201 which is linked after the first management record data 101 is the second management record data for clip data. This second management record data 201 is data used to manage the clipped image data of the index number "1". As shown in FIG. 9, the second management record data 201 has the clipped-image-data handle showing an address to which the clipped image data of the index number "1" has been stored.

Management record data 206 linked after the second management record data 201 is the second management record data for clip data. This second management record data 206 is data used to manage the clipped image data of the index number "6", and has the clipped-image-data handle showing an address to which the clipped image data of the index number "6" has been stored.

Similarly, the second management record data 207 used to manage the clipped image data of the index number "7" is linked after the second management record data 206. The second management record data 212 used to manage the clipped image data of the index number "12" is linked after the second management record data 207. The second management record data 213 used to manage the clipped image data of the index number "13" is linked after the second management record data 212. And the second management record data 214 used to manage the clipped image data of the index number "14" is linked after the second management record data 213.

FIG. 13B shows the state of managing the clipped image data to be displayed to the event displaying area 29. Management record data 102 is the first management record data for event data. As shown in FIG. 8, this first management record data 102 has data used to manage whole event displaying area 29 and the position of the clipped image data to be displayed in the event displaying area 29.

Management record data 202 linked after the first management record data 102 is the second management record data for event data. As shown in FIG. 10, the second management record data 202 has data used to manage the in-point clipped image data shown by the index number "2", and the out-point clipped image data shown by the index number "3". More precisely, the second management record data 202 has the in-point clipped-image-data handle showing an address to which the in-point clipped image data shown by the index number "2" has been stored, and the out-point clipped-image-data handle showing an address to which the out-point clipped image data shown by the index number "3" has been stored.

Similarly, the second management record data 204 used to manage the in-point clipped image data of the index number "4" and the out-point clipped image data of the index number "5", is linked after the second management record data 202. The second management record data 208 used to manage the in-point clipped image data of the index number "8" and the out-point clipped image data of the index number "9", is linked after the second management record data 208. And the second management record data 210 used to manage the in-point clipped image data of the index number "10" and the out-point clipped image data of the index number "11", is linked after the second management record data 208.

FIG. 13A shows the state of managing the clipped image data to be displayed to the program display area 30. Management record data 103 is the first management record data for program data. As shown in FIG. 8, the first management record data 103 has data used to manage whole program displaying area 30 and the position of the clipped image data to be displayed to the program displaying area 30.

The second management record data 204 used to manage the sin-point clipped image data of the index number "4" and the out-point clipped image data of the index number "5", is linked after the first management record data 103 for program data. The second management record data 210 used to manage the in-point clipped image data of the index number "10" and the out-point clipped image data of the index number "11", is linked after the second management record data 204. And the second management record data 202 used to manage the in-point clipped image data of the index number "2" and the out-point clipped image data of the index number "3", is linked after the second management record data 210.

Here, comparing FIG. 13B showing the management of event data with FIG. 13A showing the management of program data, the order of storing the clipped image data of the index number "2", "4" and "10" is all the same between FIG. 13B and FIG. 13A. This means that the storing position of the clipped image data has not changed a bit. FIG. 13B is different from FIG. 13A in that the link order of the second management record data has changed. More specifically, in the editing system 1, if the display order of the event is changed, the storing position of the clipped image data that shows an event is not changed but the link order of the second management record data that is used to directly manage the clipped image data is changed. Thereby, in the editing system 1, special effects can be obtained such that the display order of the event can be changed with high speed.

Furthermore, it is not only limited to the change of the display order of the events but also the change of the display order of the clipped image data being displayed in the clip displaying area 28. For instance, even if the display order of the clipped image data has changed by erasing the clipped image data or newly supplementing clipped image data, the display order can be easily changed only by correcting the linked data of the second management record data (i.e., the part of the pointer to the data linked before/after) without actually moving the storing position of the clipped image data.

The marking operation from the first marking to the fifteenth marking is concretely described hereinafter, including the operation of each circuit block.

Before starting the marking, the first management record data 101 for clip data, the first management record data 102 for event data, and the first management record data 103 for program data have been generated at the head address in a memory area for work data that has been kept in the RAM 10b. However, since any first management record data has no second management record data linked thereto, the address of itself has been stored in the "pointer to the data linked after".

[First Marking (in point)]

After the first marking, 95×60-pixel clipped image data is formed by controlling the read from the frame memory 11c. The formed clipped image data is stored to a vacant area in the RAM 10b as clipped image data of the index number "1". As well as storing, the formed clipped image data is displayed to the in-clip displaying area 24a. At this time, the second management record data 201 managing this clipped image data has been temporarily stored in the register in the CPU 10 and has not been stored in the RAM 10b. The reason why the second management record data 201 is unknown to link to which management record data at this time.

[Second Marking (in point)]

Similarly, after the second marking, a clipped image data of the index number "2" is formed and stored to a vacant area in the RAM 10b. At this time, since an in point has successively marked twice, the clipped image data of the index number "1" being displayed in the in-clip displaying area 24a will have not used as an event. Then the clipped image data of the index number "1" being displayed in the in-clip displaying area 24a is moved to the clip displaying area 28. Also, by the second marking, the second management record data 201 managing the clipped image data of the index number "1" is determined to be linked to the first management record data 101 for clip data. Thus, as shown in FIG. 13C, the second management record data 201 which has been temporarily stored in the register in the CPU 10 is stored to the RAM 10b so as to link to the first management record data 101.

On the other hand, the clipped image data of the index number "2" generated by the second marking is newly displayed to the in-clip displaying area 24a instead of the clipped image data of the index number "1". Similarly to the first marking, the second management record data 202 managing the clipped image data of this index number "2" is newly and temporarily stored to the register in the CPU 10.

[Third Marking (out point)]

Similarly, after the third marking, clipped image data of the index number "3" is formed and stored to a vacant area in the RAM 10b. Since the third marking is an out point, an event in which the clipped image data of the index number "2" is set as the in point and the clipped image data of the index number "3" is set as the out point, is formed. Then the clipped image data of the index number "2" being displayed in the in-clip displaying area 24a is copied to the event displaying area 29 as being displayed in the in-clip displaying area 24a. By the third marking, the second management record data 202 managing the clipped image data of the index number "2" that has been stored in the register is determined to link to the first management record data 102 for clip data. Thus, as shown in FIG. 13B, the second management record data 202 which has been temporarily stored in the register in the CPU 10 is stored to the RAM 10b so as to link to the first management record data 102.

On the other hand, the clipped image data of the index number "3" which has been generated by the third marking is newly displayed to the out-clip displaying area 24d. Note that, since the second management record data 202 managing the clipped image data of the index number "3" has determined to link to the first management record data 102, it is not stored to the register in the CPU 10.

[Fourth Marking (in point)]

Similarly, after the fourth marking, clipped image data of the index number "4" is formed and stored to a vacant area in the RAM 10b. As well as storing, the formed clipped image data is displayed to the in-clip displaying area 24a. Furthermore, similarly to the first marking, the second management record data 204 managing the clipped image data of this index number "4" is temporarily stored to the register in the CPU 10. Note that, since the clipped image data of the index number "3" which has been displayed in the out-clip displaying area 24d has been stored already, it is cleared from the out-clip displaying area 24d.

[Fifth Marking (out point)]

Similarly, after the fifth marking, clipped image data of the index number "5" is formed and stored to a vacant area in the RAM 10b. Since the fifth marking is of an out point similarly to the third marking, an event in which the clipped image data of the index number "4" is set as the in point and the clipped image data of the index number "5" is set as the out point is formed. Then, the clipped image data of the index number "4" being displayed in the in-clip displaying area 24a is copied to the event displaying area 29 as being displayed in the in-clip displaying area 24a. By the fifth marking, the second management record data 204 managing the clipped image data of the index number "4" that has been stored in the register is determined to link to the second management record data 202 stored before. Thus, as shown in FIG. 13B, the second management record data 204 which has been temporarily stored in the register of the CPU 10 is stored to the RAM 10b so as to link to the second management record data 202.

On the other hand, the clipped image data of the index number "5" which has been generated by the fifth marking is newly displayed to the out-clip displaying area 24d. Note that, since the second management record data 204 managing the clipped image data of the index number "5" has determined to link to the second management record data 202, it is not stored to the register in the CPU 10.

[Sixth Marking (in point)]

Similarly, after the sixth marking, clipped image data of the index number "6" is formed and stored to a vacant area in the RAM 10b. As well as storing, the formed clipped image data of the index number "6" is displayed to the in-clip displaying area 24a. Furthermore, similarly to the fourth marking, the second management record data 206 managing the clipped image data of this index number "6" is temporarily stored to the register in the CPU 10. Note that, since the clipped image data of the index number "5" which has been displayed in the out-clip displaying area 24d has been stored already, it is cleared from the out-clip displaying area 24d.

[Seventh Marking (in point)]

Similarly, after the seventh marking, clipped image data of the index number "7" is formed and stored to a vacant area in the RAM 10b. In this case, since an in point has successively marked twice, the clipped image data of the index number "6" being displayed in the in-clip displaying area 24a is moved to the clip displaying area 28. By the seventh marking, the second management record data 206 which has been stored in the register in the CPU 10 is stored to the RAM 10b so as to link to the second management record data 201 as shown in FIG. 13C.

On the other hand, the clipped image data of the index number "7" is displayed to the in-clip displaying area 24a. Moreover, similarly to the sixth marking, the second management record data 207 for managing the clipped image data of this index number "7" is temporarily stored to the register in the CPU 10.

Here the description of the following ninth to the fifteenth marking is omitted because these are conducted similarly to the first to the seventh marking.

(5) Configuration of Hybrid Recorder

Figure 14:
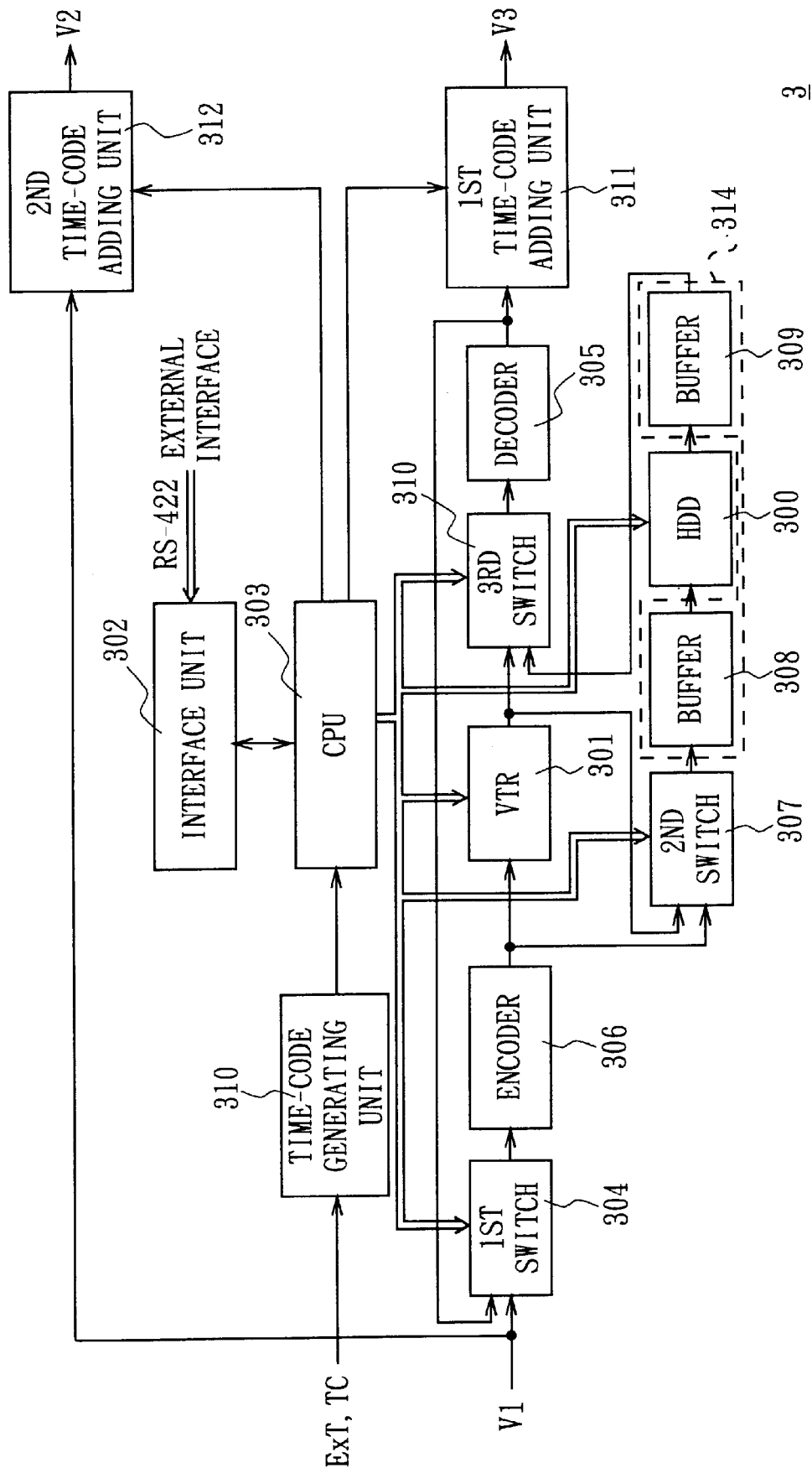
FIG. 14 is a block diagram showing the configuration of a hybrid recorder.

The hybrid recorder 3 will be described hereinafter, referring to FIG. 14. As shown in FIG. 14, the hybrid recorder 3 has a hard-disk drive (HDD) 300 capable of recording and reproducing video signal apparently at the same time, and a VTR 301 which is equipped with both a VTR of an analog mode and a VTR of a digital mode.

The structure of this hybrid recorder 3 is concretely described, hereinafter.

The hybrid recorder 3 provides an interface unit 302 according to the RS-422 communication protocol, and receives a control command such as recording start, recording stop, reproducing start, and reproducing stop which are sent from an external interface 18 of the computer 2 by the interface unit 302. This interface unit 302 supplies the received control command to the CPU 303.

The CPU 303 is a control means for controlling the entire operation of the hybrid recorder 3, and controls the operation of each unit responding to the control command received from the interface unit 302. Thereby, the hybrid recorder 3 performs recording operation and the reproducing operation.

First, the video signal V1 successively supplied from the external source such as a video camera is sent to the first switch 304: a video signal sent from a decoder 305 is also supplied to the first switch 304 other than that. The first switch 304 is a switch for selecting video signal to be supplied to the hard-disk drive 300 and the video tape recorder 301 based on the control signal from the CPU 303, and selects one of the video signal V1 to be inputted and the reproducing and supplies it to the encoder 306.

The encoder 306 converts an analog video signal supplied from the first switch 304 to a digital video signal, and compression-codes the digitalized video signal in a frame unit according to the moving picture coding experts group (MPEG) standard and supplies thus encoded video signal to the second switch 307 and the video tape recorder 301.

To the second switch 307, the reproducing video signal outputted from the VTR 301 is supplied other than the coded video signal outputted from the encoder 306. This second switch 306 is a switch for selecting video signal to be supplied to the hard-disk drive 300 based on the control signal from the CPU 303, and either of the coded video signal outputted from the encoder 306 and the reproducing video signal outputted from the VTR 301 is selected and outputted.

The video signal selected by the second switch 307 is supplied to a serial digital date interface (SDDI) interface unit 314. The SDDI interface unit 314 supplies this input video signal to an input buffer memory 308. At this time, the SDDI interface unit 314 converts the video signal supplied in the serial digital interface (SDI) format into the SDDI format against the recording to the hard-disk drive 300, and supplies the video signal converted into the SDDI format to the input buffer memory 308.

The input buffer memory 308 has the storage capacity capable of storing for example, 15 frames of video signal, and temporary stores the input video signal.

The hard-disk drive 300 is equipped with hard-disk array in which plural hard disks are connected in array, and having sufficient storage capacity for the recording of video signal. This hard-disk drive 300, if recording operation is instructed by control signal from the CPU 303, sequentially reads the video signal stored in the input buffer memory 308 out and stores it in the hard-disk array. Furthermore, the hard-disk drive 300, if reproducing operation is instructed by control signal from the CPU 303, reads the video signal at the part instructed by the CPU 303 out and reproduces it. The reproduced video signal is supplied to the output buffer memory 309 of the SDDI interface unit 314 having the storage capacity of for example, 15 frames, and temporary stored therein. This output buffer memory 309 sequentially reads the video signal temporary stored out and supplies it to the third switch 310. Note that, at the time of supplying the video signal stored in the output buffer memory 309, the SDDI interface unit 314 converts the video signal in the SDDI format into the SDI format, and supplies the video signal converted into the SDI format.

Here, the recording and reproducing operation of this hard-disk drive 300 will be described concretely hereinafter. In this hybrid recorder 3, the recording and reproducing operation of the hard-disk drive 300 is completely managed by the CPU 303.

The CPU 303 assigns a time code to each video frame of the video signal to be recorded based on the time code supplied from the time code generating unit 313, and at the same time, assigns a recording address to each video frame of the video signal. Then, the CPU 303 memorizes thus assigned time code and recording address in the form of correspondence table.

At the time of recording operation, the CPU 303 instructs the hard-disk drive 300 of a recording address and a recording command. Thereby, the hard-disk drive 300 records video signal to the instructed recording address. On the other hand, at the time of reproducing operation, if the video signal to be read out is instructed by the time code from the computer 2, the CPU 303 refers to the aforementioned correspondence table and determines that where the video frame of the instructed time code recorded is (that is, determines its recording address). Then, the CPU 303 instructs the hard-disk drive 300 of the determined recording address along with a reproducing command. Thus, the hard-disk drive 300 reproduces the video signal from the instructed address, so that the video signal required by the computer 2 is reproduced. As in the above, since the CPU 303 memorizes the correspondence relation between time code and recording address as a correspondence table, even if a reproducing position is instructed by its time code by the computer 2, the instructed reproducing position can be reproduced promptly.

Note that, if an external time code (EXT.TC) is supplied from the outside, the aforementioned time code generating unit 313 supplies the external time code to the CPU 303 as a time code, while if the external time code is not supplied, the time code generating unit 313 generates a time code for itself and supplies it to the CPU 303.

Next, the duties of the input buffer memory 308 and the output buffer memory 309 which are provided on the input side and the output side of the hard-disk drive 300 respectively are described. These two buffer memories 308 and 309 are buffers for making the recording operation and the reproducing operation of the hard-disk drive 300 to perform apparently in parallel. This hard-disk drive 300 can perform recording operation at a speed at least, more than twice the speed when the input buffer memory 308 fetches video signal, and can perform reproducing operation at a speed at least, more than twice the speed when the output buffer memory 309 reads video signal out. Thus, if these buffer memories 308 and 309 are provided on the input side and the output side respectively, the hard-disk drive 300 can store video signal in the output buffer memory 309 by performing reproducing operation while the input buffer memory 308 is fetching video signal, furthermore, the hard-disk drive 300 can perform recording operation by reading video signal out from the input buffer memory 308 while the output buffer memory 309 is reading video signal out. Therefore, if these buffer memories 308 and 309 are provided on the input side and the output side of the hard-disk drive 300 respectively, the recording operation and the reproducing operation of the hard-disk drive 300 can be simultaneously performed apparently.

Here, the description of each part is continued again returning to FIG. 14. As described above, the coded video signal supplied from the encoder 306 is also supplied to the VTR 301. The VTR 301 is a device for reproducing a video tape brought from the outside, recording the video data stored in the hard-disk drive 300, or recording the input video signal V1 as backup of the hard-disk drive 300, and performs its recording operation or reproducing operation based on the control signal from the CPU 303.

Note that, also the recording and reproducing operation of this VTR 301 is managed by the CPU 303 similarly to the hard-disk drive 300, however, in the case of a VTR, a position cannot be specified by an address as the hard-disk drive, so that the CPU 303 instructs the very time code in place of the address information. That is, at the time of recording, the VTR 301 adds and records the time code given from the CPU 303, but at the time of reproducing, the VTR 301 performs reproducing operation by determining a readout position based on the time code instructed by the CPU 303.

The video signal reproduced from the VTR 301 is supplied to the third switch 310 or the aforementioned second switch 307. The third switch 310 has two output terminals, and selects either of two reproducing video signal to be inputted and supplies it to either of the decoder 305 and the first switch 304.

The decoder 305 is a device for decoding the video signal compressively coded in a frame unit, and decodes the video signal supplied from the third switch 310 according to the MPEG standard. Furthermore, the decoder 305 converts the decoded digital video signal into analog video signal and supplies this to the first time code adding unit 311 and the first switch 304.

The first time code adding unit 311 adds a time code to the vertical synchronizing period of the video signal supplied from the decoder 305 based on the time code supplied from the CPU 303. Provided that in the case where the video signal supplied from the decoder 305 is the video signal reproduced by the video tape recorder 301, since the time code has already added thereto, the time code is not added. The time code is added only in the case of the video signal reproduced by the hard-disk drive 300. Note that, the time code to be added to the video signal is that coincides with the time code assigned in the recording.

The video signal to which the time code has added by this first time code adding unit 311 is supplied to the outside as reproducing video signal V3 as well as supplied to the computer 2.

Note that, from this hybrid recorder 3, the video signal V2 which is similar to the input video signal V1 is supplied other than the reproducing video signal V3. This video signal V2 is the video signal that the time code has added to the input video signal V1 by the second time code adding unit 312.

In this case, the second time code adding unit 312 adds a time code to the vertical synchronizing period of the input video signal V1 based on the time code supplied from the CPU 303, and supplies this as the video signal V2. At the time, the second time code adding unit 312 adds the time code to the video signal V1 so that the correspondence relation between time code and video frame to which the time code is added becomes identical to the video signal V3. This is that for example, in the first time code adding unit 311, if the time code "00:01:23:45" is added to a video frame, the same time code "00:01:23:45" is added to the video frame coinciding with that video frame in the video signal V1.

Here, the flow of video signal in this hybrid recorder 3 will be described for each operation mode. First, in the case where the video signal V1 supplied from the outside is recorded to the hard-disk drive 300 as editing material, the video signal V1 is selected by the first switch 304 and supplied to the encoder 306. Then, the video signal compressively coded by the encoder 306 is selected by the second switch 307 and supplied to the hard-disk drive 300 via the input buffer memory 308. According to this flow of video signal, the input video signal V1 can be supplied and recorded to the hard-disk drive 300.

On the other hand, the video signal V1 supplied from the outside is recorded to a video tape by the VTR 301, the video signal V1 is selected by the first switch 304 in the similar manner, and the video signal supplied from the encoder 306 is supplied to the VTR 301. Thus, the video signal V1 supplied from the outside can be recorded to the video tape in digital mode.

In the case where a video tape recorded in an analog mode brought from the outside is reproduced and the video signal is recorded to the hard-disk drive 300 as editing material, at first, the brought video tape is loaded in the VTR 301 and reproduced. The reproducing video signal is selected by the third switch 310 and sent to the first switch 304. The first switch 304 selects this reproducing video signal and sends this to the encoder 306. The video signal compressively coded by the encoder 306 is selected by the second switch 307 and supplied to the hard-disk drive 300 via the input buffer memory 307. According to this flow of video signal, the analog signal brought in the form of a video tape from the outside can be recorded to the hard-disk drive 300 as editing material.

In the case where a video tape recorded in a digital mode brought from the outside is reproduced and the video signal is recorded to the hard-disk 300 as editing material, at first, the brought video tape is loaded in the VTR 301 and reproduced. Then, the reproduced video signal still compressively coded is selected by the second switch 307 and supplied to the hard-disk drive 300 via the input buffer memory 308. According to this flow of video signal, the digital video signal brought in the form of a video tape from the outside can be recorded to the hard-disk drive 300 as editing material.

On the other hand, in the case where the video signal of the final video program produced as the result of edition is read out from the hard-disk drive 300 and recorded to a broadcasting video tape, the video signal reproduced by the hard-disk drive 300 is sent to the third switch 310 via the output buffer memory 309. The third switch 310 selects the reproduced video signal and supplies to the decoder 305. The decoder 305 decodes the compressively coded reproduced video signal and sends the decoded video signal to the first switch 304. The first 304 selects this reproduced video signal and supplies to the encoder 306. Then, the video signal encoded again by the encoder 306 is supplied to the VTR 310, so that the video signal of the final video program recorded in the hard-disk drive 300 can be dubbed to the broadcasting video tape.

(6) Setting of Reproducing Speed
(6-1) Reproducing Speed Setting Area

It is described about the setting of reproducing speed for event hereinafter. In the editing system 1, the reproducing speed of event can be set in a frame unit by using a reproducing speed setting area 25 in both modes of a picture mode and a time-line mode. Thus, for example, in a baseball broadcasting, slow-playback can be set for an event at the moment of hitting a home run. By slowly reproducing the event of the home run scene, an image in which the motion of batter and the motion of ball are represented more real can be presented to audience. Furthermore, since the reproducing speed can be set in a frame unit, for example, in the scene where a pitcher is throwing a ball, relatively fast slow-playback (e.g., 0.5-time speed) can be performed, and in the scene where a batter is hitting the ball, relatively slow slow-playback (e.g., 0.01-time speed) can be set; thereby, more powerful image can be presented to audience by setting various slow-playback in one event.

Figure 15:
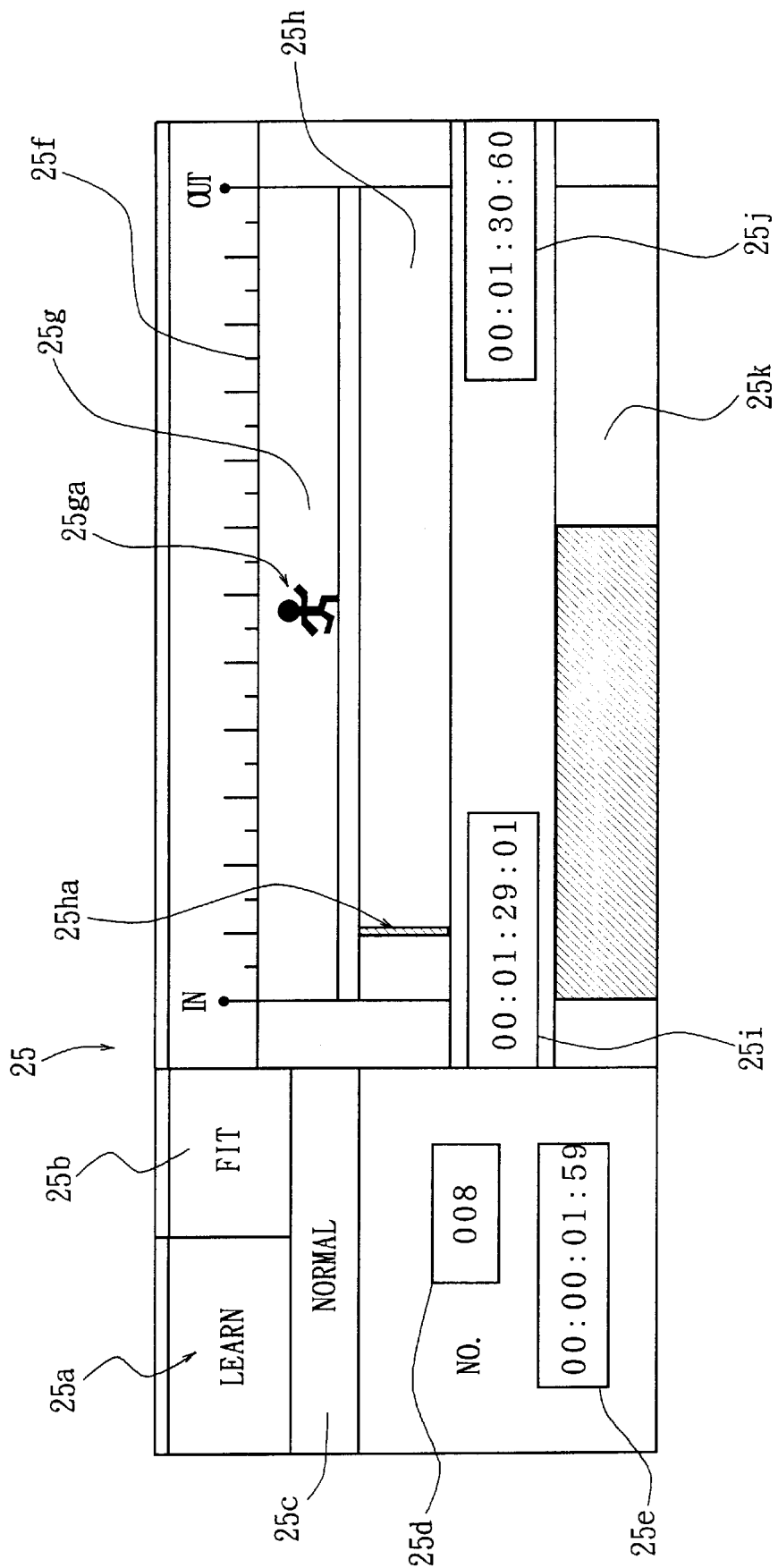
FIG. 15 is a schematic diagram showing arrangement in a reproducing speed setting area.

Here, this respect is concretely described with reference to FIG. 15. First, the reproducing speed setting area 25 which is shown in FIG. 15 becomes an operable state by clicking a reproducing speed setting button 22h in a timing displaying area 22. The reproducing speed setting area 25 has a learn button 25a, a speed fit button 25b, a normal reproducing speed setting button 25c, an event number display part 25d, an event duration displaying part 25e, a time-line-scale displaying part 25f, a time-runner displaying part 25g, a point displaying part 25h, an in-point time-code displaying part 25i, an out-point time-code displaying part 25j and a memory-residue indicator part 25k.

The learn button 25a is used when a reproducing speed is set using a dedicated controller 2e which will be described later. If after the learn button 25a is clicked the reproducing speed data is entered using the dedicated controller 2e, the speed data is stored and the reproducing speed of the event is set.

The speed fit button 25b is used when the reproducing speed is automatically set by entering the length from an in point to an out point (i.e., duration) with a numeral value from the keyboard 2c. If after the speed fit button 25b is clicked the duration value is entered from the keyboard 2c, an optimum reproducing speed is automatically set based on the duration value.

The normal reproducing speed setting button 25c is used when the setting of reproducing speed is canceled. If after an event in which the reproducing speed has been set is specified the normal reproducing speed setting button 25c is clicked, the set reproducing speed is canceled and a normal reproducing speed, i.e., one-time speed is set.

The event-number displaying part 25d is the area for displaying an event number of the specified event. The displayed event number coincides with the event number displayed in the event-number displaying part 29d of the event displaying area 29.

The event-duration displaying part 25e is the area for displaying the length from an in point to an out point of the specified event, i.e., the duration. In the event-duration displaying part 25e, the duration is displayed in a frame unit.

The time-line-scale displaying part 25f is the area for displaying a scale visually showing the duration of the specified event. In this time-line-scale displaying part 25f, the scale is displayed in a frame unit.

The time-runner displaying part 25g is the position displaying part for displaying that where position in the event is now set or reproduced when the reproducing speed is set with the dedicated controller 2e which will be described later, or when the event in which the reproducing has set is previewed. On the time-runner displaying part 25g, an icon 25ga having the form that a human being is running is displayed, and the position in the event now setting or reproducing can be exactly shown by the display position of the icon 25ga with reference to the scale of the time-line-scale displaying part 25f. Accordingly, the operator can easily grasp visually that the setting or reproducing of where position is now performed, by the position of the icon 25ga. Furthermore, in this case, the icon 25ga is sequentially moved from the in point toward the out point along the scale accompanying with the progress of setting or reproducing. However, at this time, the moving speed of the icon 25ga is changed depending on the set reproducing speed, so that the operator can easily confirm visually that the reproducing speed is fast at which part and slow at which part in the event.

The point displaying part 25h is the area showing whether the other in point or out point which has been set in editing operation is found or not between the in point and the out point of the specified event. In the point display area 25h, if such other in point or out point is found, a pointer 25ha is displayed on the position. By the presence of the pointer 25ha, the operator can easily grasp the presence of the other edit point.

The in-point time-code displaying part 25i and the out-point time-code displaying part 25j are the areas for displaying the time code of the in point and the out point of the selected event, respectively.

The memory-residual indicator part 25k is the area showing the residual of the maximum learn continue time when the learn button 25a is clicked, the reproducing speed was set using the dedicated controller 2e and the reproducing speed is stored to the RAM 10b of the CPU 10. The memory area allocated for setting of the reproducing speed of one event has been previously determined, therefore, by checking up the residual capacity of the memory area, the residual can be easily computed. By providing such memory-residual indicator 25k, memory residual can be confirmed visually; thereby, the setting of reproducing speed such that the maximum learn continue time is exceeded can be prevented.

(6-2) Dedicated Controller

Figure 16:
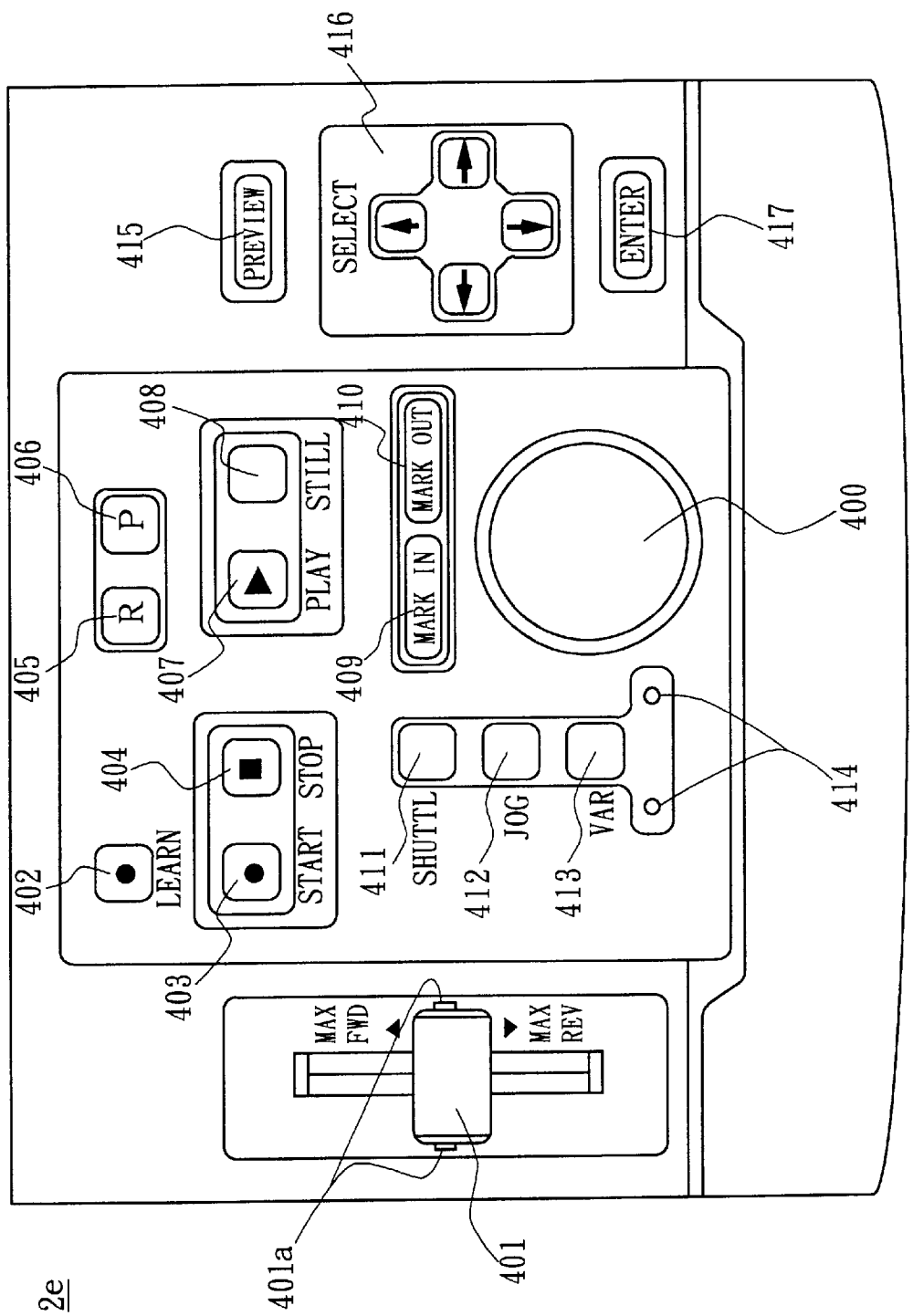
FIG. 16 is an exterior view of a dedicated controller.

It is described about the dedicated controller 2e which is used in the setting of reproducing speed hereinafter, referring to FIG. 16. As shown in FIG. 16, the dedicated controller 2e has a search dial 400 being a rotary encoder and a motion control lever 401 being a slide encoder other than a plurality of operation buttons. The reproducing speed can be freely entered by manual operation using these two operation means.

First, the arrangement of the operation buttons provided on the operation panel of the dedicated controller 2e is described. On the upper part of the operation panel, a learn button 402, a start button 403, a stop button 404, a recording-side select button 405, a reproducing-side select button 406, a play button 407, a still button 408, a mark-in button 409 and a mark-out button 410 are provided. At the lower of these operation buttons, the search dial 400 which has described above, a shuttle button 411, a jog button 412, a variable button 413 and a variable indicator 414 are provided.

On the right side of the operation panel, a preview button 415, a cursor button 413 and an enter button 417 are provided from the top. On the contrary, on the left side of the operation panel, the motion control lever 401 described above is provided so as to slide up and down for the operation panel.

Out of these operation buttons, the learn button 402 is used when the reproducing speed is set by the motion control lever 401 or the search dial 400 and stored. The storing of reproducing speed is performed while this learn button 402 was pushed, the motion control lever 401 or the search dial 400 was operated, and the mark-out button 410 is pushed. Note that, the learn button 402 has almost the same function as the learn button 25a displayed on the reproducing speed setting area 25.

The start button 403 is operated when a recording-start command is sent to the hybrid recorder 3 to record the video signal displayed on the recording video displaying area 21. And the stop button 404 is operated when a recording-stop command to the hybrid recorder 3 to stop the recording operation of the video signal displayed on the recording video displaying area 21. Note that, these buttons 403 and 404 have the same function as the recording-start button 31a and the recording stop button 31b displayed on the monitor 2b.

The recording-side select button 405 and the reproducing-side select button 406 are used when the object to be controlled by the dedicated controller 2e is selected. When the recording side is controlled by the dedicated controller 2e, the recording-side select button 405 is pushed, when the recording side is controlled, the reproducing-side select button 406 is pushed.

The play button 407 is used when the reproducing starting command is sent to the hybrid recorder 3 to display the video signal on the reproducing video displaying area 23. And the still button 408 is used when the reproducing stop command is sent to the hybrid recorder 3 to stop the reproducing operation of the video signal displayed on the reproducing video displaying area 23. If the still button 408 is pushed, a still image is displayed on the reproducing video screen 23a.

The mark-in button 409 and the mark-out button 410 are used when an in point and an out point are set respectively. Note that, if the recording-side select button 405 was pushed, these buttons 409 and 410 operate the same manner as the mark-in button 24c and the mark-out button 24f of the recording video marking area 24. On the contrary, if the reproducing-side select button 406 was pushed, these buttons 409 and 410 operate the same manner as the mark-in button 27c and the mark-out button 27f of the reproducing video marking area 27.

The shuttle button 411 is pushed when the search dial 400 is desired to operate in the shuttle mode, and the jog button 412 is pushed when the search dial 400 is desired to operate in the jog mode. The variable button 413 is pushed when the search dial 400 is desired to operate in a variable mode or the motion control lever 401 is desired to operate. Note that, when the variable button 413 is pushed once, the variable indicator 414 on the right side is turned on a light and the search dial 400 is set to the variable mode. If it is pushed once again, the variable indicator 414 on the left side is turned on a light and the motion control lever becomes a usable state. If it is pushed further once, the variable indicator 414 on the both side are turned off the light and the search dial 400 and the motion control lever 401 become an unusable state.

The preview button 415 is used when it is desired to preview the selected event or program. If the preview button 415 is pushed in the state where the event or program has been selected, a reproducing starting command of the event or program is supplied to the hybrid recorder 3 and the video signal of the event or program is displayed on the reproducing video screen 23a.

The cursor button 416 is composed of the following four buttons: an upward button, a downward button, a leftward button and a rightward button. The cursor button 416 is the button for moving the cursor when the clipped image data is selected in the clip displaying area 28, the event displaying area 29 or the program display area 30.

The enter button 417 is allocated two kinds of functions: one is the function for entering a registration instruction when from the area between the in point and the out point which has been set in the reproducing video marking area 27 is newly registered as an event (it is the same as the new-event button 33 displayed on the monitor 2b); the other is the function for entering a send-out instruction when the selected event or program is sent out.

The search dial 400 is a rotary encoder for entering the reproducing speed data corresponding to the turning operation by the operator. This search dial 400 operates in three modes of the shuttle mode, the jog mode or the variable mode by the shuttle button 411, the jog button 412 or the variable button 413 is pushed. First, in the shuttle mode, the reproducing speed data from −100 times-speed to +100 times-speed can be entered depending on the turned position of the search dial 400. Note that, in this mode, the search dial 400 becomes a click state at the position of a still image, +10 times-speed and −10 times-speed.

In the jog mode, the reproducing speed data from −1 times-speed to +1 times-speed can be entered depending on the turned position of the search dial 400.

And in the variable mode, the reproducing speed data from −1 times-speed to +3 times-speed can be entered depending on the turned position of the search dial 400. Note that, in this mode, the search dial 400 becomes a click state at the position of a still image and +1 times-speed.

In this manner, it can be selected among the jog mode, in which the reproducing speed can be set precisely by reducing the control range, the shuttle mode, in which the setting in wide range can be performed by rough setting of reproducing speed, and the variable mode, in which the setting range on the plus side is widened. Thereby, the operator can set the reproducing speed freely by switching the mode depending on the desired reproducing speed.

The motion control lever 401 is the slide encoder for entering the reproducing speed data responding to the slide operation by the operator. By the motion control lever 401 is slid up and down, the reproducing speed data from a still image to +1 times-speed can be entered. Note that, on the both sides of the motion control lever 401, a range widening button 401a is provided. If the range widening button 401a is pushed, the enterable reproducing speed data can be widened to the range from −1 times-speed to +3 times-speed.

In this manner, the reproducing speed data from the still image to +1 times-speed can be entered by the motion control lever 401, so that the operator can set the reproducing speed within the range freely.

Moreover, as the mechanism for entering the reproducing speed data, the search dial 400 having a rotating operating system and the motion control lever 401 having a slide operation system are provided, so that the operator can enter the reproducing speed data by selecting one of these, which is easy to use; thus the usability can be improved.

Note that, the instruction data entered from various operation buttons of the dedicated controller 2e described in this term, and the reproducing speed data entered from the search dial 400 and the motion control lever 401, are supplied to the CPU 10 via the pointing-device interface 17. Thereby, the CPU 10 makes operation control corresponding to the instruction data and reproduction control corresponding to the reproducing speed data to the specified event. If the learn button was pushed, the CPU 10 stores the reproducing speed data to the RAM 10b as the reproducing speed of the specified event.

Reproducing speed data set by the edit operator is stored in the RAM 10b in the data format shown in FIG. 17. To be concrete, reproducing speed data is stored for each video frame from the in point to the out point of the specified event. Note that, since this reproducing speed data is a control command according to the RS-422 communication protocol, the CPU 10 transmits this reproducing speed data itself to the hybrid recorder 3 through the RS-422 cable. Then the CPU 303 of the hybrid recorder 3 given the reproducing speed data performs the computation $v=10^{(N/32-2)}$ with assuming that the reproducing speed data is N and the reproducing speed of video data outputted from the hybrid recorder 3 is v. Accordingly, if the reproducing speed data N supplied from the hybrid recorder 3 is "64", 1.0-time speed video data is reproduced from the hybrid recorder 3, and if the speed data N supplied from the computer 2 is "32", 0.1-time speed video data is reproduced from the hybrid recorder 3.

(6-3) Setting Method of Reproducing Speed

The setting procedure when the reproducing speed is set using the reproducing speed setting area 25 is described hereinafter.

In the most typical setting method, at first a desired event to be set is specified from the event displaying area 29 by clicking. Then the reproducing speed setting button 22h is clicked in the timing displaying area 22. As a result, the number of the specified event and its duration are displayed in the reproducing speed setting area 25. Then the learn button 25 of the reproducing speed setting area 25 is clicked. Thereby, it is to be settable reproducing speed, and reproducing speed data is inputted by operating a motion control lever 401 or a search dial 400. Thus inputted reproducing speed is sequentially stored in the RAM 10b of the CPU 10. If setting of reproducing speed is to be stopped here, the mark-out button 27f in the reproducing video marking area 27 or a mark-out button 410 of the dedicated controller 2e is pushed at the position wanted to be stopped and stopping the setting of reproducing speed. If thus set reproducing speed is to be memorized, the new event button 33 or the replace button 34 may be clicked.

In the other setting method, a learn button 402 of the dedicated controller 2e is pushed at a desired position while monitoring the reproducing video screen 23a in the reproducing video displaying area 23. As a result, an in point is set and it is to be settable reproducing speed, then reproducing speed data may be inputted by operating the motion control lever 401 or the search dial 400 of the dedicated controller 2e in similar manner. Thus inputted reproducing speed is sequentially stored to the RAM 10b of the CPU 10. If setting of reproducing speed is stopped here, the mark-out button 27f in the reproducing video marking area 27 or the mark-out button 410 of the dedicated controller 2e is pushed at the position wanted to be stopped and stopping the setting of reproducing speed. If thus set reproducing speed is memorized, the new event button 33 or the replace button 34 may be clicked.

In a further method, a desired event to be set a reproducing speed is specified from the event displaying area 29 by clicking. The reproducing speed set button 22h in the timing displaying area 22 is clicked. Then the number of the specified event and its duration are displayed in the reproducing speed setting area 25. And the speed fitting button 25b in the reproducing speed setting area 25 is clicked. Thereby, reproducing speed data is to be able to be inputted from the keyboard. The operator inputs reproducing speed data. In this case, the operator inputs not reproducing speed data (speed data) itself but inputs a duration value. By this operation, the optimal reproducing speed corresponding to the duration value is automatically set to the event.

Note that, if the event is previewed then, the preview button 32 may be clicked. Or if thus set reproducing speed is memorized, the new event button 33 or the replace button 34 may be clicked.

(7) Preroll Mode

The preroll mode provided in the editing system 1 is described hereinafter. Normally, when an event is produced, the operator clicks the mark-in button 24c and the mark-out button 24f of the recording video marking area 24 to specify an in point and an out point while viewing the video data displayed on the recording video screen 21a. Thereby, in the editing system 1, the video data from the specified in point to out point is registered as an event. When confirming the registered event, after the operator clicks the event displayed in the event displaying area 29 to specify, clicks the preview button 32. Thereby, the reproducing operation of the event is started and the video data from the in point to the out point of the event is displayed on the reproducing video screen 23a.

By the way, when specifying the in point of the event, the operator operates the mark-in button 24c to specify the in point while viewing the video data displayed on the recording video screen 21a, so that sometimes specifies the in point after the scene desired to register as an event due to the delay of operation of the mark-in button 24c. For instance, in the case where in a baseball broadcasting the scene of hitting a home run is registered as an event, registering the scene from the pitcher threw the ball to the ball hit by the batter is entered the stand is generally desired. However, whether it is the home-run scene cannot be known until the ball hit by the batter is entered the stand, so that specifying the in point is delayed inevitably. Since such event in which the in point has been delayed does not include an important scene, the event must be corrected.

Then, in the editing system 1, the preroll mode in which the reproducing operation is automatically started for predetermined time before from the in-point position specified by the operator to easily correct the marking point is provided. It is concretely described about this preroll mode hereinafter.

Figure 18:
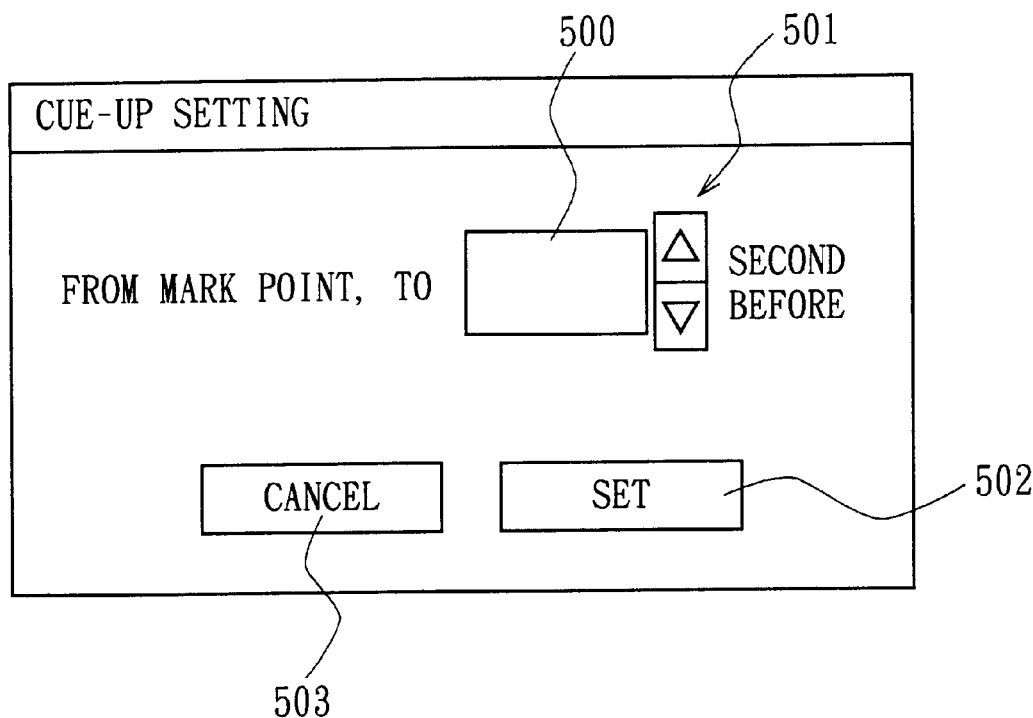
FIG. 18 is a schematic diagram showing a queue-up setting picture.
Figure 19:
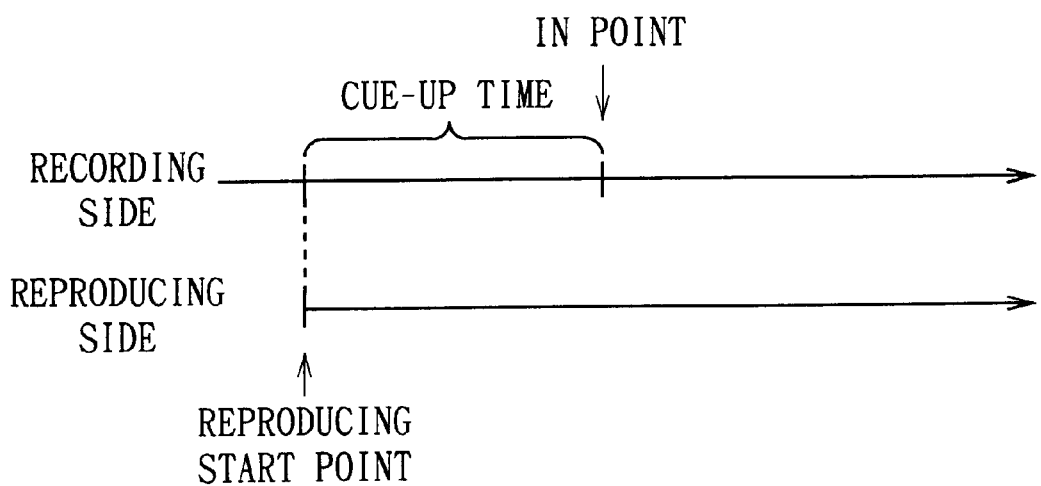
FIG. 19 is a schematic diagram illustrating a preroll mode.

First, the time used in the preroll mode, that is, the time for shifting the reproducing start point from the in point specified by the operator to before (hereinafter, it is referred as a queue-up time) can be set freely in the environment setting of the menu. When the queue-up time is set, the environment setting which has been prepared as a menu is called up and the item of queue-up is selected. By the selection of the queue-up item, the queue-up setting screen is displayed on the screen as shown in FIG. 18. In this queue-up setting screen, clicking a setting-time displaying part 500 and entering the time to be set as a queue-up time in a second unit, the time is displayed in the set-time display area 500 and temporarily set.

Note that, clicking the button of the desired direction of the jog button 501 which is adjacent to the set-time display area 500, the time is shifted toward the direction in a second unit. The queue-up time may be entered using the jog button 501.

After inputting the queue-up time in this manner, clicking a set button 502, the time displayed in the set-time display area 500 is formally registered as a queue-up time. More specifically, the entered queue-up time is stored to the memory area for environment setting data of the RAM 10b. Note that, clicking a cancel button 503, the time displayed in the set-time display area 500 is reset and it becomes a state where a queue-up time can be newly entered. In this connection, clicking the set button 502, the queue-up setting screen is automatically cleared from the screen.

In this manner, in the state where the queue-up time has been set, clicking a preroll button 22g of the timing displaying area 22, starting of the preroll mode is instructed, and then the preroll button 22g is turned on a light and starting the preroll mode. Note that, to cancel the preroll mode, clicking the preroll button 22g again, stop of preroll mode is instructed, and then the preroll button 22g is turned off the light and canceling the preroll mode.

If the operator clicks the mark-in button 24c of the recording video marking area 24 in the state where the preroll mode has been started, an in point is instructed and the clipped image data specified as the in point is displayed in the in-clip displaying area 24a. In addition, at the same time, the set queue-up time is read and the time code at the position shifted by the queue-up time from the time code of the position specified as the in point is computed. Then a reproducing command is sent to the hybrid recorder 3 so that the position of thus computed time code is set to the reproducing start point. Thereby, reproducing operation is automatically started from the reproducing start point in this editing system 1. Thus reproduced video signal V3 is displayed on the reproducing video screen 23a, so that the operator can easily correct the in point by clicking the mark-in button 27c of the reproducing video marking area 27 while viewing the reproducing video screen 23a. Note that, specifying an out point by clicking the mark-out button 27f and clicking the new-event button 33 thereafter, the video data in the period from the in point to the out point is registered as an event.

By previously starting the preroll mode in this manner, even in the case where for example, in baseball broadcasting, the in point is specified by clicking the mark-in button 24c at the point when the ball hit by the batter has entered the stand, the reproducing operation is automatically performed from the position for predetermined time before from the in point. So that the in point can be easily corrected only by specifying the in point by clicking the mark-in button 27c while viewing the reproducing screen. For example, if the in point is corrected to the time point where the pitcher threw the ball, the event including the desired scene, such as the moment the batter was hit the ball, can be easily produced in real time.

(8) Work Data Folder

In this chapter, a work data folder will be described. In the editing system 1, the work data regarding the event and program generated by edit operation will be generally stored in the RAM 10b. However, in the case of stopping the edit operation by closing the application program, the work data is loaded down to the hard-disk drive 15a provided in the computer 2, and stored to a hard disk in the hard-disk drive 15a. At this time, the work data is stored by hierarchic structure called folder.

Figure 20:
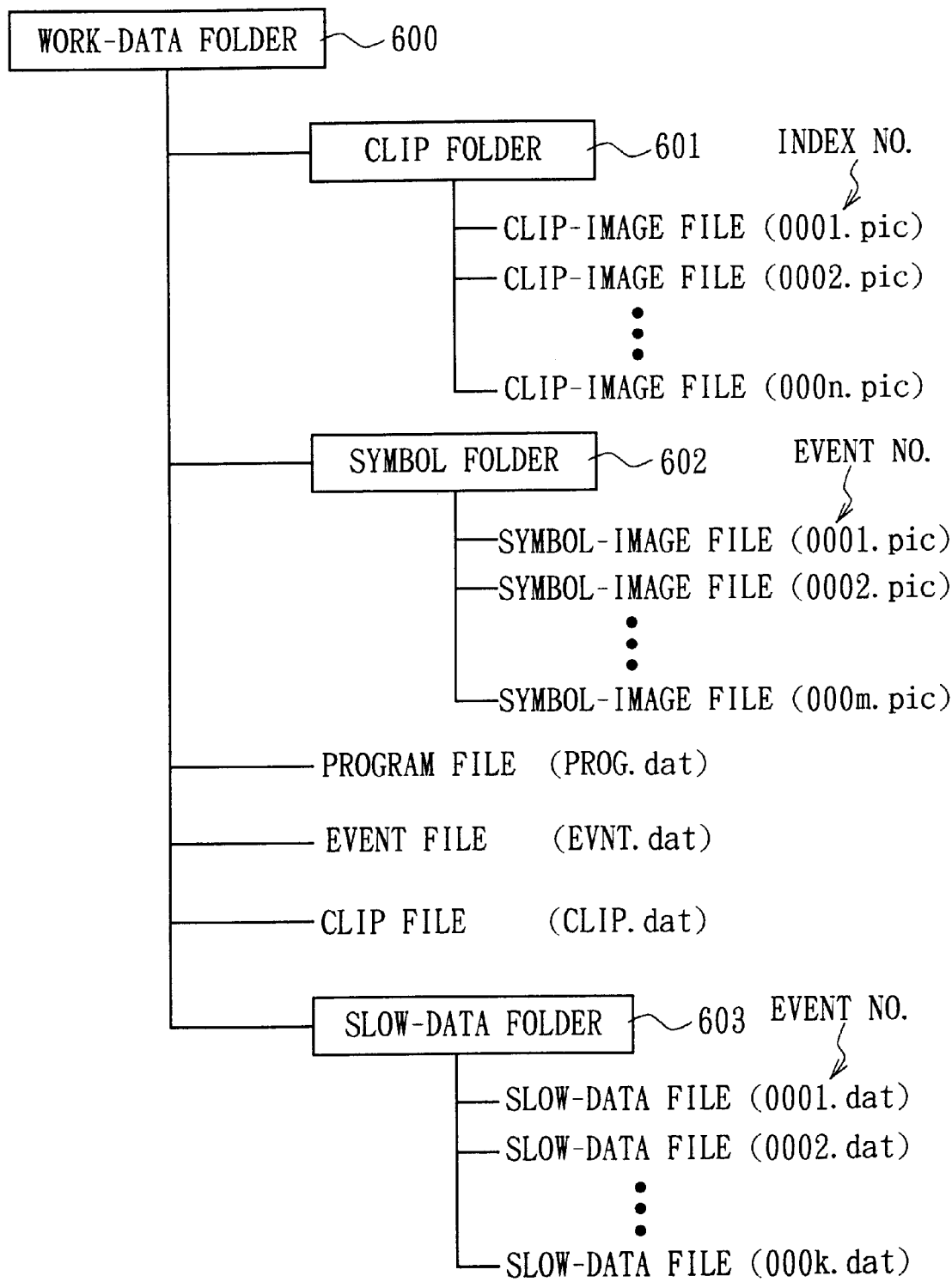
FIG. 20 is a schematic diagram illustrating a hierarchy structure for storing work data.

This respect is described concretely hereinafter, referring to FIG. 20. As shown in FIG. 20, the work data regarding the event and program will be stored in hierarchic structure called folder. The folder is the almost same as a directory in the MS-DOS or the like, in which a work data folder 600 is set as the uppermost hierarchy and folders 601–603 are formed as its lower hierarchy. Thus each data file is stored with management in hierarchic structure. Note that, the work data folder 600 is formed in the hard-disk drive 15a by the computer 2 when the editing system 1 is started.

First, the clipped image data to be displayed in the clip displaying area 28, event displaying area 29, and program displaying area 30, will be respectively stored to the lower hierarchy of the clip folder 601 formed in the lower hierarchy of the work data folder 600 for each clipped image data as a clip-image file. The contents of the clipped-image file is the very clipped image data and to which video data showing the clipped image will be written. As the file name of this clip-image file, a name in which the extended character ".pic" is added to the index number that has been added to each clipped image data, will be used.

Furthermore, symbol image data registered as the typical clipped image in the event, is respectively stored for each symbol image data as a symbol-image file at the lower hierarchy of a symbol-image folder 602 that is formed as the lower hierarchy of the work data folder 600. In the symbol image file, video data showing a symbol image will be written. As the file name of the symbol image file, a name in which the extended character ".pic" is added to the event number of the symbol image, will be used.

The work data regarding a program will be directly stored in the lower hierarchy of the work data folder 600 as a program file without forming its lower folders. In this program file, the event number of events composing the program is sequentially written, thus events forming the program can be seen referring to the program file. As the file name of the program file, a name in which the extended character ".dat" is added to "PROG" that shows being a program file, will be used.

Also the work data regarding an event is directly stored to the lower hierarchy of the work data folder 600 as an event file, without forming its lower folders. In this event file, the clip number of the in point and out point are sequentially written for each event number, thus the clip number of the in point and the out point forming each event can been seen referring to the event file. As the file name of this event file, a name in which the extended character ".dat" is added to "EVNT" that shows being an event file, will be used.

Also the work data regarding the clipped image data is directly stored to the lower hierarchy of the work data folder 600 as a clip file, without forming its lower folders. In this clip file, the index number and the time code of clipped image data are sequentially written for each clip number, thus the index number of the image data forming each clipped image data can be seen referring to the clip file. As the file name of this clip file, a name in which the extended character ".dat" is added to "CLIP" that shows being a clip file, will be used.

Furthermore, the speed data showing the reproducing speed of an event set using the reproducing speed setting area 25 (see FIG. 17) is respectively stored to the lower hierarchy of the slow data folder 603, that has formed in the lower hierarchy of the work data folder 600, for each event as a slow data file. In this slow data file, the speed data shown in FIG. 17 will be written for each frame, thus the reproducing speed that has been set to the event can be seen referring to the slow data file. As the file name of this slow data file, a name in which the extended character ".dat" is added to the respective event number added to each event, will be used.

In this manner, in the editing system 1, in the case of closing the application program, the work data which regards the event and program generated by edit operation is stored to the hard disk in the hard-disk drive 15a in hierarchic structure. Thereby, in the case of starting the application program again, the clipped image data same as the data that has been displayed before closed can be displayed to the program displaying area 30 and event displaying area 29 by reading out these work data stored in the hard disk, and returning to the state before the application program was closed. Moreover, by storing the work data in this manner, the work data can be read out later, and thus an edit list, such as an edit decision list (EDL), can be sent out.

(9) Description of Computer's Operation

In this chapter, the operation of the computer 2 in each processing will be described referring to flowcharts. Note that, the flowcharts used in the following description generally describe the operation of the CPU 10. Furthermore, in the description at the clauses (9-1) through (9-7), the recording operation or the reproducing operation of the hybrid recorder 3 means the recording operation or the reproducing operation of the hard-disk drive 300.

(9-1) Initial Operation

Figure 21:
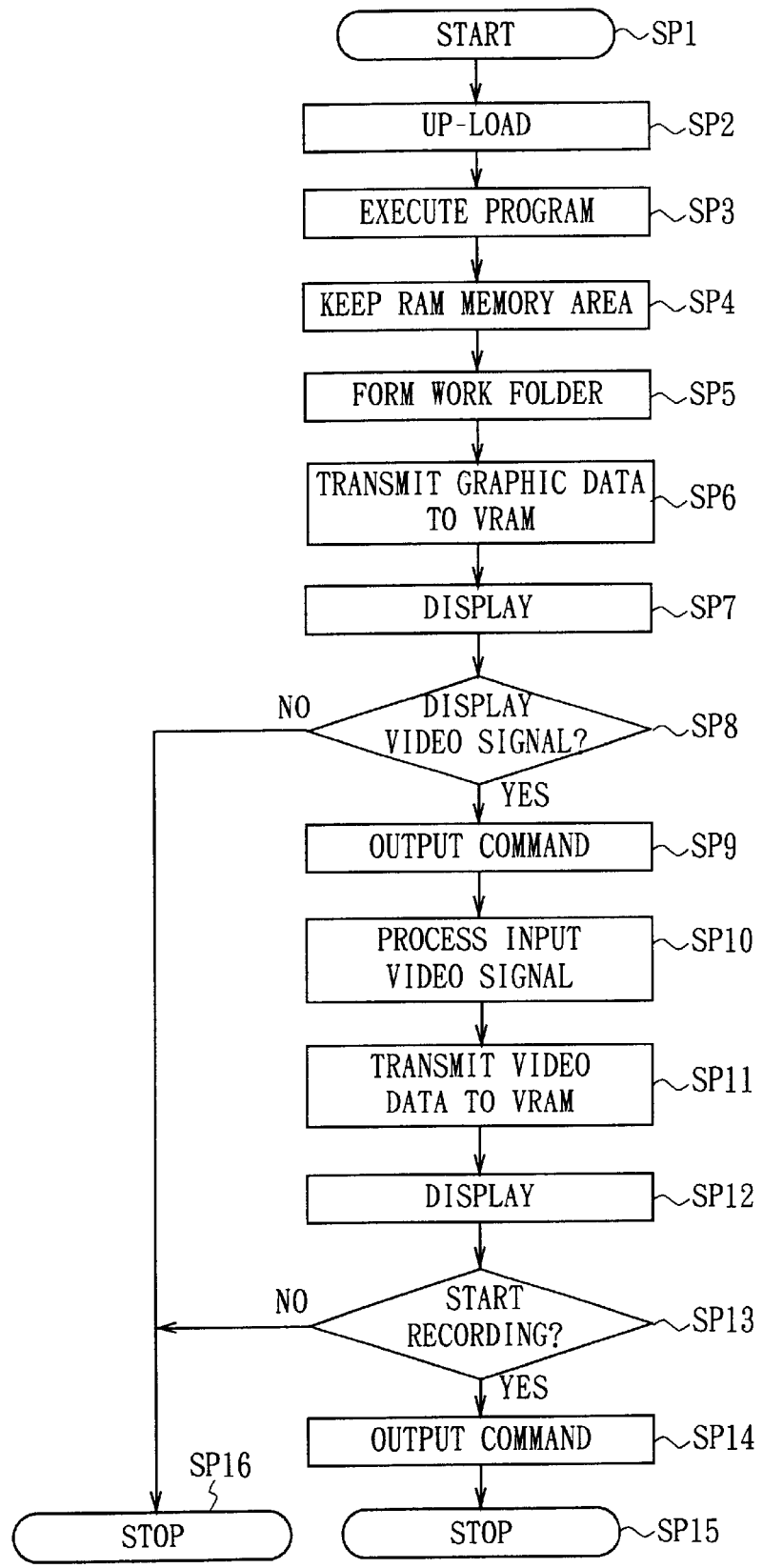
FIG. 21 is a flowchart illustrating the initial operation of a computer.

First, the initial operation of the computer 2 is described referring to FIG. 21. If the execution of an application program is specified by the operator in step SP1, the CPU 10 starts the operation. The application program has been stored on the hard disk in the hard-disk drive 15a. In the next step SP2, since the application program has been stored in the hard disk of the hard-disk drive 15a, the CPU 10 uploads the application program to the operational RAM 10b that has been provided in the CPU 10.

In the next step SP3, the CPU 10 executes the application program uploaded to the RAM 10b. In the next step SP4, the CPU 10 keeps a memory area to store a plurality of clipped image data, edit data that will be generated by edit operation performed in future, to the RAM 10b. At this time, the first management recorders for clip data, event data and program data, such as shown in FIGS. 13A to 13C, are generated in the RAM 10b.

In the next step SP5, the CPU 10 generates a work data folder to store work data of a program and event that will be generated by the edit work performed then on the hard disk in the hard-disk drive 15a.

In the next step SP6, to display a graphic display for GUI on the monitor 2b, the CPU 10 transmits graphic data to the VRAM 13b in real time synchronizing with the inner clock of the computer 2. Thereby, in the next step SP7, a graphic display same as the graphic data stored to the VRAM 13b is displayed on the monitor 2b.

In the next step SP8, the CPU 10 determines whether or not to display the source video signal V2 on the recording video screen 21*a*. This determination is conducted based on the video display specified by the operator. If no video display has specified, the CPU 10 determines that edit operation will not be performed, and goes to step SP16 to stop the processing. In the normal case, the video display has specified to perform edit operation, then the CPU 10 goes to step SP9 and enters display processing of the source video signal V2.

In step SP9, the CPU 10 supplies an RS-422 control command to the hybrid recorder 3 to instruct the hybrid recorder 3 send out of the source video signal V2 being editing material. The hybrid recorder 3 received this, adds a time code to the input source video signal V1 and generates the video signal V2, and supplies it to the computer 2.

In the next step SP10, the data converting unit 11*b* extracts a time code from the input composite video signal V2, and converts the composite video signal V2 into digital component video data. The converted video data is supplied to the frame memory 11*c* and temporarily stored in a frame unit. The extracted time code data is supplied to the processor controller 11*a* and sent out to the CPU 10 via the processor controller 11*a*.

In the next step SP 11, the video data stored in the frame memory 11*c* is transmitted to the VRAM 13*b*. In the video data to be transmitted, the number of samples read out from the frame memory 11*c* has reduced, i.e., the video data has reduced to 380×240 pixels. Note that, at this time adjustment of the image data bus 5*a* is conducted, thus image data for GUI is transmitted from the CPU 10 to the VRAM 13*b* other than the video data. Furthermore, the video data stored to the VRAM 13*b* is updated in real time, thereby the video data can be displayed in real time on the monitor 2*b*.

In the next step SP12, the image data and video data stored to the VRAM 13*b* are displayed on the monitor 2*b* in real time. In the next step SP13, the CPU 10 determines whether to record or not the video data displayed on the recording video screen 21*a* to the hybrid recorder 3. This determination is conducted based on click operation of the reproducing start button 31*a* by the operator. That is, if the reproducing start button 31*a* has clicked, recording of the video data is determined and the CPU 10 and goes to the next step SP14. If not, recording of video data is determined and the CPU 10 goes to step SP16 to stop the processing.

In step SP14, the CPU 10 sends out a recording-start command to the external interface 18. The external interface 18 received this command, converts the recording start command into the RS-422 communication format and sends out this to the hybrid recorder 3. Then the hybrid recorder 3 starts recording operation of the input source video signal V1.

Since the recording operation has been started in the hybrid recorder 3, in the next step SP15, the CPU 10 judges that all of initial setting has finished, and stops the procedure of initial operation as shown in this flowchart.

(9-2) Marking on Recording Side

Figure 22:
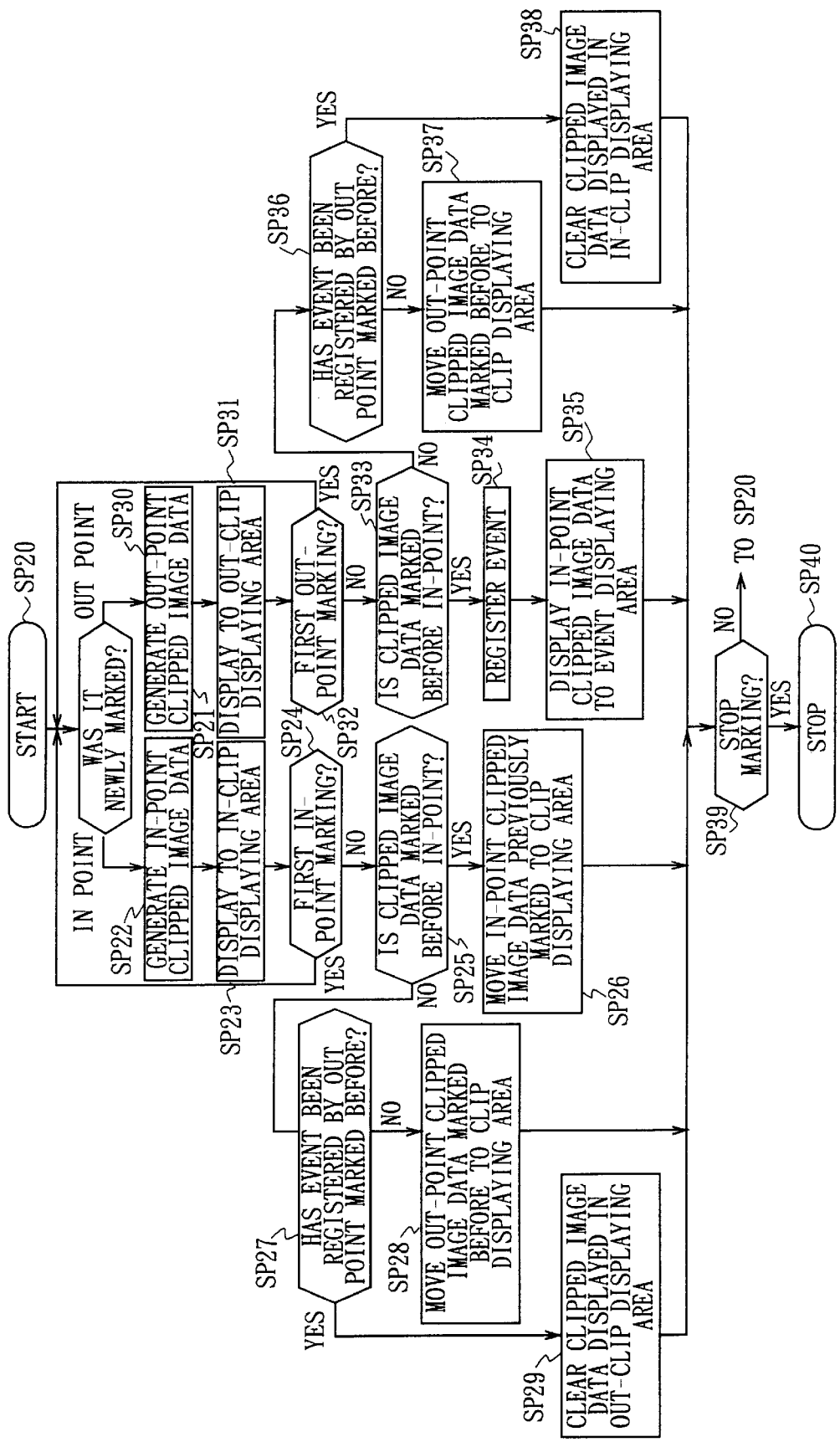
FIG. 22 is a flowchart illustrating a marking operation on the recording side.

Marking using the recording video marking area 24 is described referring to the flowchart of FIG. 22. This marking can be further easily understood by referring to the description of FIG. 11 through FIGS. 11A to 1C.

After the procedure of the initial operation shown in FIG. 21 is finished, it becomes into the state where this marking operation can be begun, and thus the processing is started in step SP20.

In step SP21, the CPU 10 judges whether marking has newly performed or not. The judgment of the presence of marking is performed based on whether the mouse 2*d* has clicked or not when the cursor was positioned within the area of mark-in button 24*c* or mark-out button 24*f* in the recording video marking area 24. Because at this time, an interrupt command was generated by clicking the mouse 2*d*, the CPU 10 conducts the judgment of marking based on generation of this interrupt command. As a result, if the mark-in button 24*c* has clicked, the CPU 10 judges that an in point has specified, and goes to step SP22. If the mark-out button 24*f* has clicked, the CPU 10 judges that an out point has specified, and goes to step SP30.

In step SP22, the clipped image data of an in point is generated. The in-point clipped image data is generated by reading the video data stored in the frame memory 11*c* to the VRAM 13*b*. At this time, since its data quantity has thinned out to ¹⁄₁₆ by reducing the number of samples to be read out, clipped image data of 95×60 pixels in image is generated.

In step SP23, the in-point clipped image data stored in the memory area for the in-clip displaying area of the VRAM 13*b* is read out and displayed to the in-clip displaying area 24*a*.

In step SP24, the CPU 10 judges whether the marking in step SP21 is the first in-point marking or not. As a result, if it is the first marking, the CPU 10 returns to step SP21, while if it is the second marking or more, the CPU 10 goes to step SP25.

In step SP25, the CPU 10 judges whether the clipped image data marked before is in-point clipped image data or not. As a result, if the clipped image data marked before is in-point clipped image data, the CPU 10 goes to step SP26, while if it is out-point clipped image data, the CPU 10 goes to step SP27.

In step SP26, the in-point clipped image data marked before is moved to the clip displaying area 28. That is, since the in point was successively marked twice, the clipped image data marked before will not be used as an event and moving to the clip displaying area 28. Note that, at this time the second management record data of the clipped image data moved to the clip displaying area 28 is generated as shown in FIG. 11 through FIGS. 13A to 13C.

On the other hand, in step SP27, the CPU 10 judges whether an event has generated or not by the out-point clipped image data marked before. As a result, if an event has generated by the late marking, the CPU 10 goes to step SP29, while if not generated, the CPU 10 goes to step SP28.

In step SP28, the out-point clipped image data which has been displayed in the out-clip displaying area 24*d* by the late marking is moved to the clip displaying area 28. The reason why the out-point clipped image data generated by the late marking has not used as an event, however, since it might be used later, it is remained as marking history.

On the contrary, in step SP29, the out-point clipped image data being displayed in the out-clip displaying area 24*d* is cleared. Because in this case, the clipped image data displayed in the out-clip displaying area 24*d* has used already as the out point of an event, there is no need to display any more.

On the other hand, if the CPU 10 goes to step SP30 because the out-point marking has detected by the determination in step SP21, out-point clipped image data is generated here. Also this out-point clipped image data is generated by reading out the video data stored in the frame memory 11*c* to the VRAM 13*b*. Furthermore, also in this case 95×60-pixel clipped image data is generated by thinning out the data quantity to ¹⁄₁₆.

In step SP31, the out-point clipped image data stored in the memory area for the out-clip displaying area of the VRAM 13*b* is read out and displayed to the out-clip displaying area 24*d*.

In the next step SP32, the CPU 10 judges whether the marking in step SP21 is the first marking of an out point or not. As a result, if it is the first marking, the CPU 10 returns to step SP21, while if it is the second marking or more, the CPU 10 goes to step SP33.

In step SP33, the CPU 10 judges whether the clipped image data marked before is an in-point clipped image data or not. As a result, if the clipped image data marked before is in-point clipped image data, the CPU 10 goes to step SP34, while if it is the out-point clipped image data, the CPU 10 goes to step SP36.

In step SP34, the CPU 10 registers the period from in point marked before to out point marked then as an event. In this manner, in the editing system 1, if an out point is marked after an in point, it is automatically registered as an event. Note that, at this time the second management record data regarding the event is generated as shown in FIG. 11 through FIGS. 13A to 13C.

In the next step SP35, the in-point clipped image data of the generated event is copied to the event displaying area 29 and the clipped image data is displayed to the event displaying area 29.

On the other hand, in step SP36, the CPU 10 judges whether an event has generated or not by the out-point clip image data marked before. As a result, if an event has generated by the late marking, the CPU 10 goes to step SP3B, while if no event has generated by the late marking, the CPU 10 goes to step SP37.

In step SP37, the out-point clipped image data generated by the late marking is moved to the clip displaying area 28. The reason why although the out-point clipped image data generated by the late marking has not used as an event, it might be used later, thus it is remained as marking history.

On the contrary, in step SP38, the in-point clipped image data being displayed in the in-clip displaying area 24*a* is cleared. The reason why since the event was generated by the clipped image data that is being displayed in the in-clip displaying area 24*a* and the out-point clipped image data marked before, the clipped image data being displayed in the in-clip displaying area 24*a* will not been used and there is no need to display any more.

After the processing of steps SP26, SP28, SP29, SP35, SP37 or SP38 is finished, the CPU 10 goes to step SP39 to determine whether to stop or not the marking operation. In the case of continuing the marking operation, the CPU 10 returns to step SP20 again and repeating the processing, while in the case of stopping the marking operation, the CPU 10 goes to step SP40 to stop the processing.

(9-3) Marking on Reproducing Side

Figure 23:
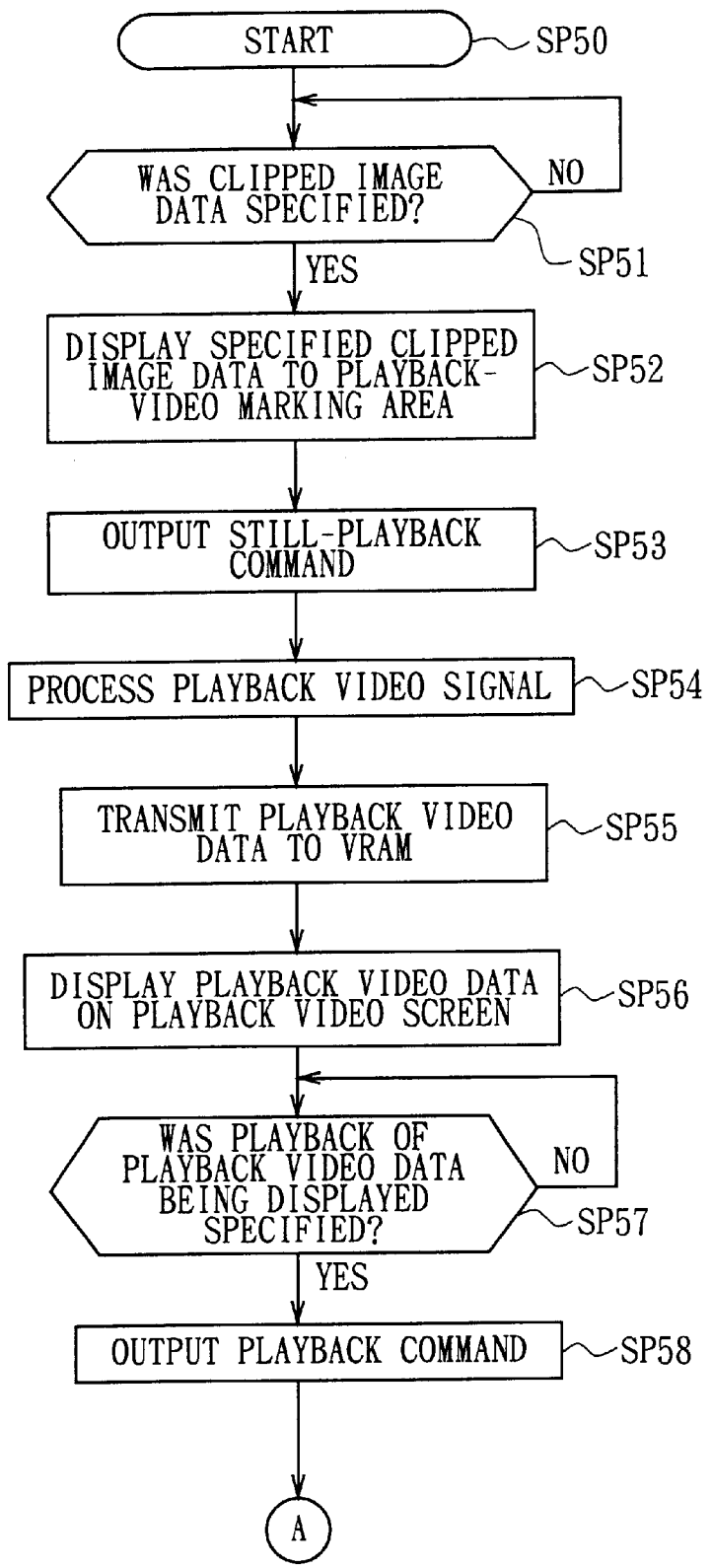
FIGS. 23 and 24 are flowcharts illustrating a marking operation on the reproducing side.
Figure 24:
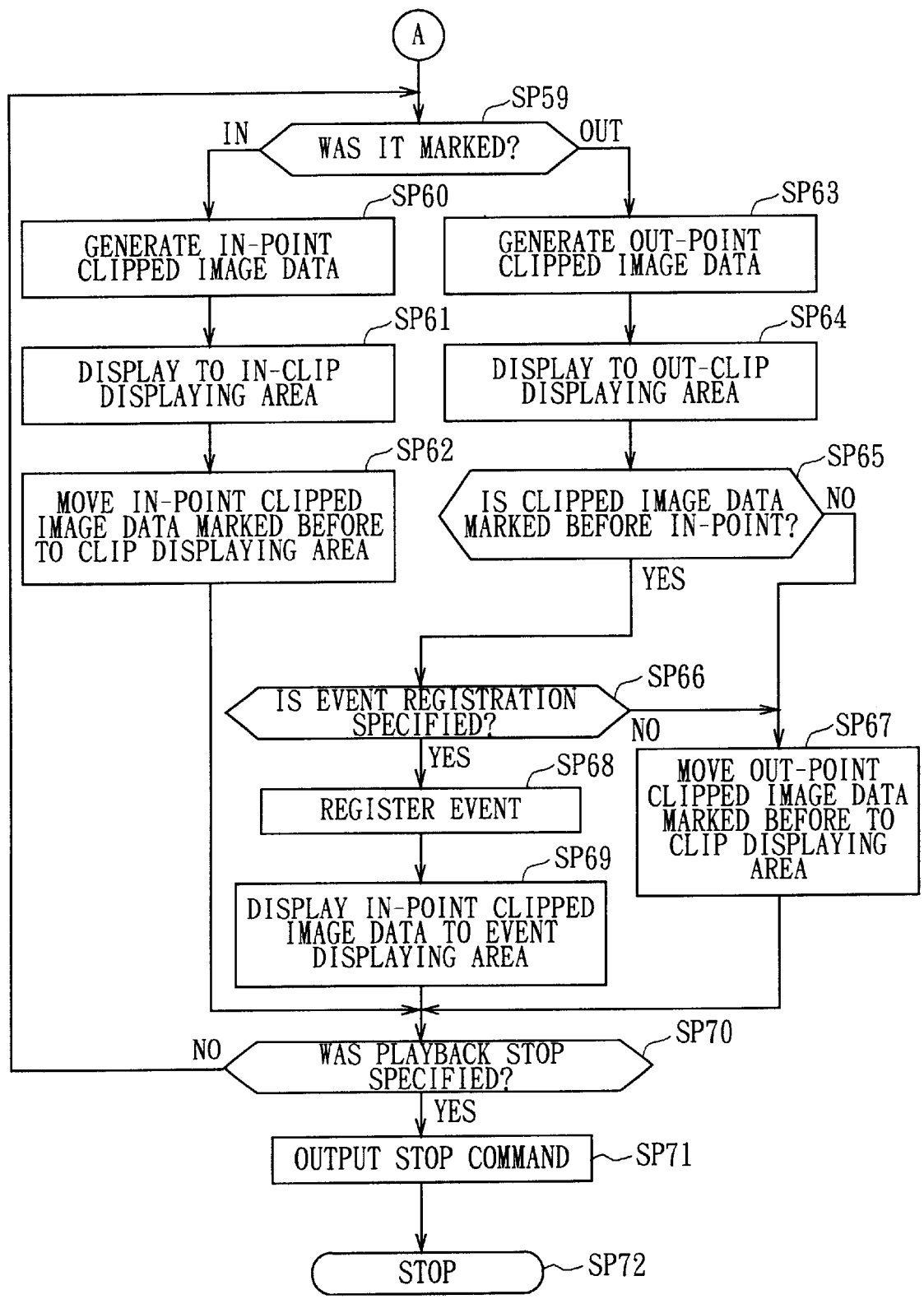

Hereinafter, it is described about the case of marking using the reproducing video marking area 27 while monitoring the video signal V3 reproduced from the hybrid recorder 3, referring to the flowcharts of FIGS. 23 and 24.

This marking is started in the state where the clipped image data has been stored already. In step SP51 following to the start step SP50, the CPU 10 judges whether the clipped image data in the clip displaying area 28 has specified or not. At this time, the CPU 10 judges that the clipped image data has specified when the mouse 2*d* has double-clicked (the operation successively clicking twice), when the cursor is positioned at the display position of the clipped image data (28*a*).

As a result, if the clipped image data has specified, in the next step SP52, the specified clipped image data is displayed to the reproducing video marking area 27. That is, if in-point clipped image data has specified, it is displayed to the in-clip displaying area 27*a*, while if out-point clipped image data has specified, it is displayed to the out-clip displaying area 27*d*.

In the next step SP53, the CPU 10 refers to the time code of the specified clipped image data and sends out a control command to reproduce the video data of the time code in a still image to the external interface 18. The external interface 18 received this command, converts the still-reproducing command into the RS-422 communication format and supplies to the hybrid recorder 3. The hybrid recorder 3 determines its recording address based on the supplied time code by referring to a correspondence table of time codes and recording addresses, and reads the video data from the position of the recording address to reproduce the specified video data. This video data is supplied to the second video processor 12 in the computer 2 as a video signal V3.

In the next step SP54, the time code is extracted from the video signal V3 at the second video processor 12, and image processing of converting the video signal V3 into digital component video data is conducted. Thus converted video data is temporarily stored to the frame memory 12*c* in the second video processor 12.

In the next step SP55, the still-reproducing video data which has been stored in the frame memory 12*c* is reduced to 380×240-pixel data and transmitted to the VRAM 13*b*.

In the next step SP56, the reproducing video data stored in the VRAM 13*b* is displayed on the reproducing video screen 23*a*.

In this case the hybrid recorder 3 does not supply real-time video data but supply only still-video data that corresponds to the specified clipped image data, and the still image is displayed on the reproducing video screen 23*a*.

In the next step SP57, the CPU 10 judges whether reproducing of the still video data displayed on the reproducing video screen 23*a* has instructed or not. The CPU 10 determines that the reproducing has instructed when the preview button 32 has clicked when the still video data was displayed on the reproducing video screen 23*a*.

As a result, if the reproducing has instructed, in the next step SP58 the CPU 10 supplies a reproducing start command to the external interface 18. The external interface 18 received this command, converts the reproducing command into the RS-422 communication format and supplies to the hybrid recorder 3. The hybrid recorder 3 sequentially reads out video data from the recording address corresponding to the video data being displayed on the reproducing video screen 23*a*, so that normal reproducing video data following to the video data being displayed on the reproducing video screen 23*a* is generated. This reproducing video data is supplied to the second video processor 12 in the computer 2 as a video signal V3.

In the next step SP59, the CPU 10 judges whether marking has performed or not. The presence of marking is judged based on whether the mouse 2*d* has clicked or not when the cursor was positioned within the area of the mark-in button 27*c* or mark-out button 27*f* in the reproducing video marking area 27. At this time since an interrupt command is generated by clicking the mouse 2*d*, the CPU 10 judges the presence of marking by generation of this interrupt command. As a result of, if the mark-in button 27*c* has clicked, the CPU 10 judges that an in point has specified, and goes to step SP60. If the mark-out button 27*f* has clicked, the CPU 10 judges that an out point has specified, and goes to step SP63.

In step SP60, the clipped image data of an in point is generated. The in-point clipped image data is generated by reading out the video data stored in the frame memory 12*c* to the VRAM 13*b*. At this time its data quantity has thinned out to 1/16 by reducing the number of samples to be read out, then the clipped image data of 95×60 pixels in image size is generated.

In the next step SP61, the in-point clipped image data stored in the memory area for the in-clip displaying area of the VRAM 13*b* is read out and displayed to the in-clip displaying area 27*a*.

In the next step SP62, the in-point clipped image data which has been marked before and displayed to the in-clip displaying area 27*a* is moved to the clip displaying area 28. Note that, if there has no marked data and the clipped image data has not been displayed in the in-clip displaying area 27*a*, this processing is not be performed. After finishing this step SP62, the CPU 10 goes to step SP70.

On the other hand, if the CPU 10 goes to step SP63 to mark an out point, out-point clipped image data is generated here. Also this out-point clipped image data is generated by reading out the video data stored in the frame memory 12*c* to the VRAM 13*b*. Furthermore, also in this case 95×60-pixel clipped image data is generated by thinning out the data quantity to 1/16 when it was read out.

In step SP64, the out-point clipped image data stored in the memory area for the out-clip displaying area of the VRAM 13*b* is read out and displayed to the out-clip displaying area 27*d*.

In step SP65, the CPU 10 judges whether the clipped image data marked before is in-point clipped image data or not. As a result, if the clipped image data marked before is in-point clipped image data, the CPU 10 goes to step SP66, while if it is out-point clipped image data, the CPU 10 goes to step SP67.

In step SP66, the CPU 10 determines to newly register or not the data as an event. This determination is performed based on click operation of the new-event button 33 by the operator. If the new-event button 33 has clicked to instruct the event registration, the CPU 10 goes to step SP68, while if the new-event button 33 has not clicked and the event registration has not instructed, the CPU 10 goes to step SP67.

In step SP68, the CPU 10 registers the period from in point to out point as an event. In this manner, in the editing system 1, if an out point is marked after an in point, the period from the in point to the out point is registered as a new event. Note that, at this time the second management record data regarding the event is generated as shown in FIG. 11 through FIGS. 13A to 13C.

In the next step SP69, the in-point clipped image data of thus generated event is copied to the event displaying area 29, and the clipped image data is displayed to the event displaying area 29. After finishing this processing, the CPU 10 goes to the next step SP70.

On the other hand, if the clipped image data generated by the late marking is out-point clipped image data, and the CPU 10 goes to step SP67, the out-point clipped image data generated by the late marking is moved to the clip displaying area 28. While, if marking has not been performed and no clipped image data is displayed in the out-clip displaying area 27*d*, this processing is not performed. When this processing is finished, the CPU 10 goes to step SP70.

In step SP70, the CPU 10 judges whether reproducing stop of the video data being displayed on the reproducing video screen 23*a* has instructed or not. This judgment is performed based on whether the still button 408 of the dedicated controller 2*e* has pushed or not. If reproducing stop has not instructed, the CPU 10 returns to step SP59 and repeats the processing. While if instructed, the CPU 10 goes to the next step SP71.

In step SP71, the CPU 10 sends out a reproducing stop command to the external interface 18. The external interface 18 received it, converts the reproducing stop command into the RS-422 communication format and sends out to the hybrid recorder 3. Then the hybrid recorder 3 stops the read-out operation of the video data. After the processing of step SP71 is finished, the CPU 10 goes to step SP72 and to stop the marking processing.

(9-4) Trimming of Event

Figure 25:
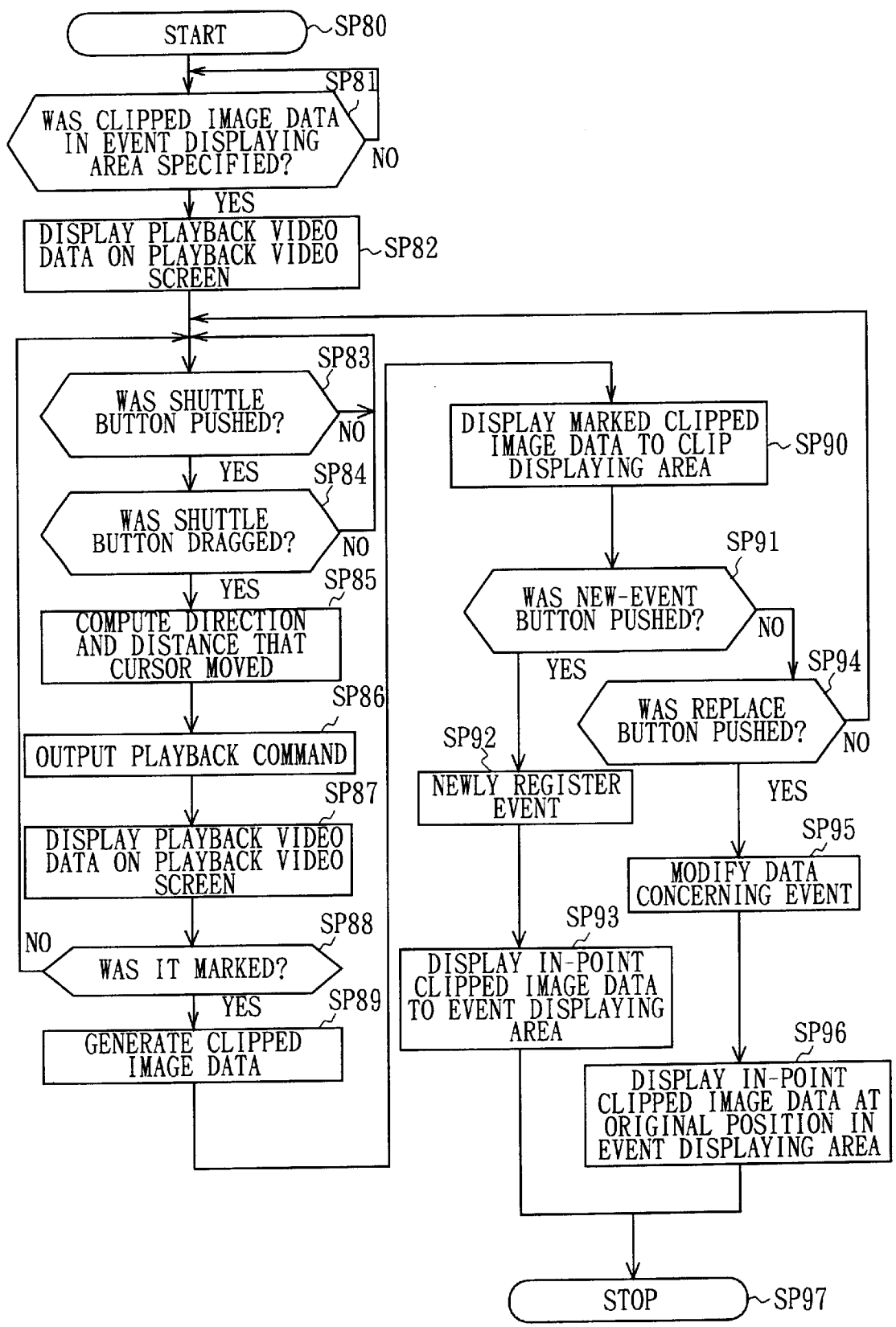
FIG. 25 is a flowchart for explaining an event trimming operation.

Hereinafter, it is described about the processing of specifying the generated event and changing its in point or out point, i.e., trimming, referring to the flowchart shown in FIG. 25. Note that, it is assumed that this flowchart is started from the state where events have been generated already.

First, in step SP81 following to the start step SP80, the CPU 10 first judges whether clipped image data in the event displaying area 29 has specified or not. At this time, if the mouse 2*d* has double-clicked (the operation successively clicking twice) when the cursor was positioned at the display position of the clipped image data (29*a*), the CPU 10 judges that the clipped image data has specified.

As a result, if the clipped image data has specified, in the next step SP82, the CPU 10 refers to the time code of the specified clipped image data and supplies a reproducing command to reproduce the video data of the time code in a still image, to the hybrid recorder 3 via the external interface 18. Then the hybrid recorder 3 reproduces the specified video data responding to the reproducing command and generates reproducing video data; and thus the reproducing video data corresponding to the specified clipped image data is displayed on the reproducing video screen 23*a*.

In the next step SP83, the CPU 10 judges whether the shuttle button 23*b* of the reproducing video displaying area 23 has pushed or not. This judgment has performed based on whether the mouse 2*d* has clicked or not when the cursor was displayed on the shuttle button 23*b*.

As a result, if the shuttle button 23*b* has pushed, the CPU 10 goes to the next step SP84 to judge whether the shuttle button 23*b* has dragged or not. This judgment is performed based on whether the shuttle button 23*b* has moved or not by moving the cursor in the state where the shuttle button 23*b* has clicked.

As a result, if the shuttle button 23*b* has dragged, the CPU 10 goes to the next step SP85 to compute the moving direction and distance of the cursor. Then the CPU 10 computes the time code of the specified video data based on thus obtained direction, distance, and the time code of the video data displayed on the reproducing video screen 23*a*. More precisely, if it in the right direction, the time code of the specified video data is computed by adding the time code of the moving distance of the cursor to the time code of the video data being displayed, while if it is in the left direction, the time code of the specified video data is computed by subtracting the time code of the moving distance of the cursor from the time code of the video data being displayed.

In the next step SP86, the CPU 10 supplies a reproducing command to reproduce the video data having the obtained time code to the hybrid recorder 3 via the external interface 18.

In the next step SP87, the hybrid recorder 3 reproduces the video data having the specified time code responding to the reproducing command, thereby the reproducing video data of the specified time code is displayed on the reproducing video screen 23*a*.

In the next step SP88, the CPU 10 judges whether marking has performed or not. The judgment of the presence of marking is performed based on whether the mouse 2d has clicked or not when the cursor was positioned in the area of the mark-in button 27c or the mark-out button 27f in the reproducing video marking area 27. As a result, if either of the mark-in button 27c or the mark-out button 27f has clicked, the CPU 10 goes to step SP89, while if neither has clicked, the CPU 10 returns to step SP83 to repeat the processing.

In step SP89, the marked clipped image data is generated. This clipped image data is generated by reading out the video data stored in the frame memory 12c to the VRAM 13b. At the time, its data quantity is thinned out to 1/16 by reducing the number of samples to be read, then the clipped image data of 95×60 pixels in image size is generated.

In the next step SP90, the clipped image data stored in the VRAM 13b is read and displayed to the in-clip displaying area 27a or the out-clip displaying area 27d in the reproducing video marking area 27. More precisely, if it has marked as an in point, the clipped image data is displayed to the in-clip displaying area 27a, while if it has marked as an out point, the clipped image data is displayed to the out-clip displaying area 27d.

In the next step SP91, the CPU 10 judges whether the new-event button 33 has pushed or not. This judgment is performed based on whether the mouse 2d has clicked or not when the cursor was displayed on the new-event button 33. As a result, if the new-event button 33 has pushed, the CPU 10 goes to step SP92, while if it has not pushed, the CPU 10 goes to step SP94.

In step SP92, the in point or out point is replaced to the clipped image data marked in step SP88 and registered as a new event. For example, if the in point has marked in step SP88, the period from the new in point to the out point that has been already registered is registered as a new event, while if the out point has marked in step SP88, the period from the in point already registered to the new out point is registered as a new event. Note that, at this time the second management record data regarding the event is newly generated as shown in FIGS. 11 through FIGS. 13A to 13C.

In the next step SP93, the in-point clipped image data of the new event is displayed to the event displaying area 29. After finishing this processing, the CPU 10 goes to step SP97 and stopping the trimming processing.

On the contrary, if the new-event button 33 has not pushed and the CPU 10 goes to step SP94, the CPU 10 judges whether the replace button 34 has pushed or not. This judgment is performed based on whether the mouse 2d has clicked or not when the cursor was been displayed on the replace button 34. As a result, if the replace button 34 has pushed, the CPU 10 goes to step SP95, while if the replace button 34 has not pushed, the CPU 10 returns to step SP83 and repeating the processing.

In step SP95, the CPU 10 replaces the in point or out point to the clipped image data marked in step SP88. That is, in this case, the contents of the second management record data regarding event is simply replaced to the clipped image data of the marked in point or out point, i.e., the contents of the original event is simply updated without newly registering an event.

In the next step SP96, the in-point clipped image data of the updated event is displayed at the position of the original event in the event displaying area 29. After finishing this processing, the CPU 10 goes to the next step SP97 and stopping the trimming processing.

(9-5) Trimming of Event with Preroll Function

Trimming of event with a preroll function in which reproducing is started from a position where is fixed time before the specified marking point will be described referring to the flowchart shown in FIGS. 26 and 27. Note that, it is assumed that this flowchart starts from a state where the hybrid recorder 3 is recording the video signal V1, and the video signal V2 has been displayed on the recording video screen 21a.

It is started from step SP120 and in step SP121, the CPU 10 judges whether starting preroll mode has been set or not. This judgment is based on whether the preroll button 22g in the timing displaying area 22 has clicked already or not to specify starting preroll mode.

The next step SP122, the CPU 10 judges whether the above-mentioned queue-up time has been set as preroll time in environmental setting. This judgment is based on whether queue-up time has been stored or not in an environmental setting data memory area in the RAM 10b. As a result of the judgment, if starting preroll mode has been specified and preroll time has been set, the CPU 10 goes to the next step SP123.

In step SP123, the CPU 10 judges if the mark-in button 24c in the recording video marking area 24 has clicked to mark an in point. As a result, if in-point marking has conducted, it goes to the next step SP124 to generate clipped image data of the in point. This clipped image data is generated by reading out video data stored in the frame memory 11c to the VRAM 13b. In this process, the data quantity is thinned out to 1/16 by reducing the number of readout samples so that clipped image data in 95×60-pixel picture size is generated.

In the next step SP125, clipped image data stored in the VRAM 13b is read out and displayed on the in-clip displaying area 24a in the recording video marking area 24.

In the next step SP126, the CPU 10 calculates a time code for queue up. More specifically, the CPU 10 refers to the time code of the specified in-point clipped image data as well as the set queue-up time, and calculates a position shifted from the specified in point to queue-up time before (i.e., reproducing starting point).

In the next step 127, the CPU 10 outputs a reproducing command to reproduce video data from thus calculated time code position in real time to the external interface 18. Receiving it, the external interface 18 converts the reproducing command into the RS-422 standard communication format and outputs to the hybrid recorder 3. By sequentially reading out video data from a recording address corresponding to the specified time code, the hybrid recorder 3 generates reproducing video data which begins from the specified time code position. This video data is outputted to the second video processor 12 in the computer 2 as a video signal V3.

In the next step SP128, in the second video processor 12, time code is extracted from the video signal V3 and image processing for converting the video signal V3 into digital component video data. Thus converted video data is temporary stored in the frame memory 12c in the second video processor 12.

In the next step SP129, reproducing video data stored in the frame memory 12c is transmitted to the VRAM 13b after reducing to 380×240 pixels.

The next step SP130, reproducing video data stored in the VRAM 13b is displayed on the reproducing video screen 23a. In this manner, real-time video data which begins from a position queue-up time before the in point specified by the operator is displayed on the reproducing video screen 23a.

In the next step SP131, the CPU 10 judges whether marking is performed or not. Judgment of marking is based on whether the mouse 2d was clicked or not when the cursor was in the area of the mark-in button 27c or the mark-out button 27*f* in the reproducing video marking area 27. As a result, if the mark-in button 27*c* was clicked, the CPU 10 judges that an in point was specified and goes to step SP132, while if the mark-out button 27*f* was clicked, judges that an out point was specified and goes to step SP135.

In step SP132, in-point clipped image data is generated by reading out video data stored in the frame memory 12*c* to the VRAM 13*b*. In the process, the data quantity is thinned out to 1/16 by reducing the number of readout samples so that clipped image data in 95×60-pixel size is generated.

In the next step SP133, in-point clipped image data stored in the VRAM 13*b* is read out and displayed on the in-clip displaying area 27*a*.

In the next step SP134, the in-point clipped image data being displayed on the in-clip displaying area 27*a* is moved to the clip displaying area 28. If marking has not been and clipped image data is not displayed in the in-clip displaying area 27*a*, this processing is not be performed. When the processing of this step SP134, the CPU 10 goes to step SP142.

On the other hand, if the CPU 10 went to SP135 to mark an out point, out-point clipped image data is generated here. Also this out-point clipped image data is generated by reading out video data stored in the frame memory 12*c* to the VRAM 13*b*. Also in this case, 95×60-pixel clipped image data is generated by thinning out the data quantity to 1/16.

In step SP136, out-point clipped image data stored in the VRAM 13*b* and displayed on the out-clip displaying area 27*d*.

In the next step SP137, the CPU 10 judges whether the marked clipped image data is an in-point clipped image data or not. As a result, if it is an in-point clipped image data, the CPU 10 goes to step SP138, while if it is an out-point clipped image data, goes to step SP139.

In step SP138, the CPU 10 determines whether newly register or not it as an event. This determination is based on clicking operation of the new-event button 33 by the operator. If the new-event button 33 was clicked and registering as an event was specified, the CPU 10 goes to step SP140, but if the new-event button 33 was not clicked and event registration was not specified, the CPU 10 goes to step SP139.

In step SP140, the CPU 10 registers the period from the in point to the out point as an event. In this case, the second management record data of the event is generated as shown in FIG. 11 through FIGS. 13A to 13C.

In the next step SP141, the in-point clipped image data of thus generated event is copied to the event displaying area 29 to be displayed in the event displaying area 29. When this processing is completed, the CPU 10 goes to the next step SP142.

On the other hand, if the clipped image data generated by the late marking is an out-point clipped image data and going to step SP139, the out-point clipped image data generated by the late marking is moved to the clip displaying area 28. While if marking was not be performed and no clipped image data is displayed in the out-clip displaying area 27*d*, the CPU 10 goes to step SP142.

In step SP142, the CPU judges whether stopping reproducing the video data displayed on the reproducing video screen 23*a* was specified or not. As a result, if reproducing stop was not specified, the CPU 10 returns to step SP131 to repeat the processing, while if specified, the CPU 10 goes to the next step SP143.

In step SP143, the CPU 10 outputs a reproducing stop command to the hybrid recorder 3 through the external interface 18. Then the hybrid recorder 3 stops readout operation of video data to stop reproducing operation. When the processing of this step SP143 is completed, the CPU 10 goes to step SP144 and stops trimming processing by using a preroll function.

(9-6) Setting Operation of Reproducing Speed

Figure 28:
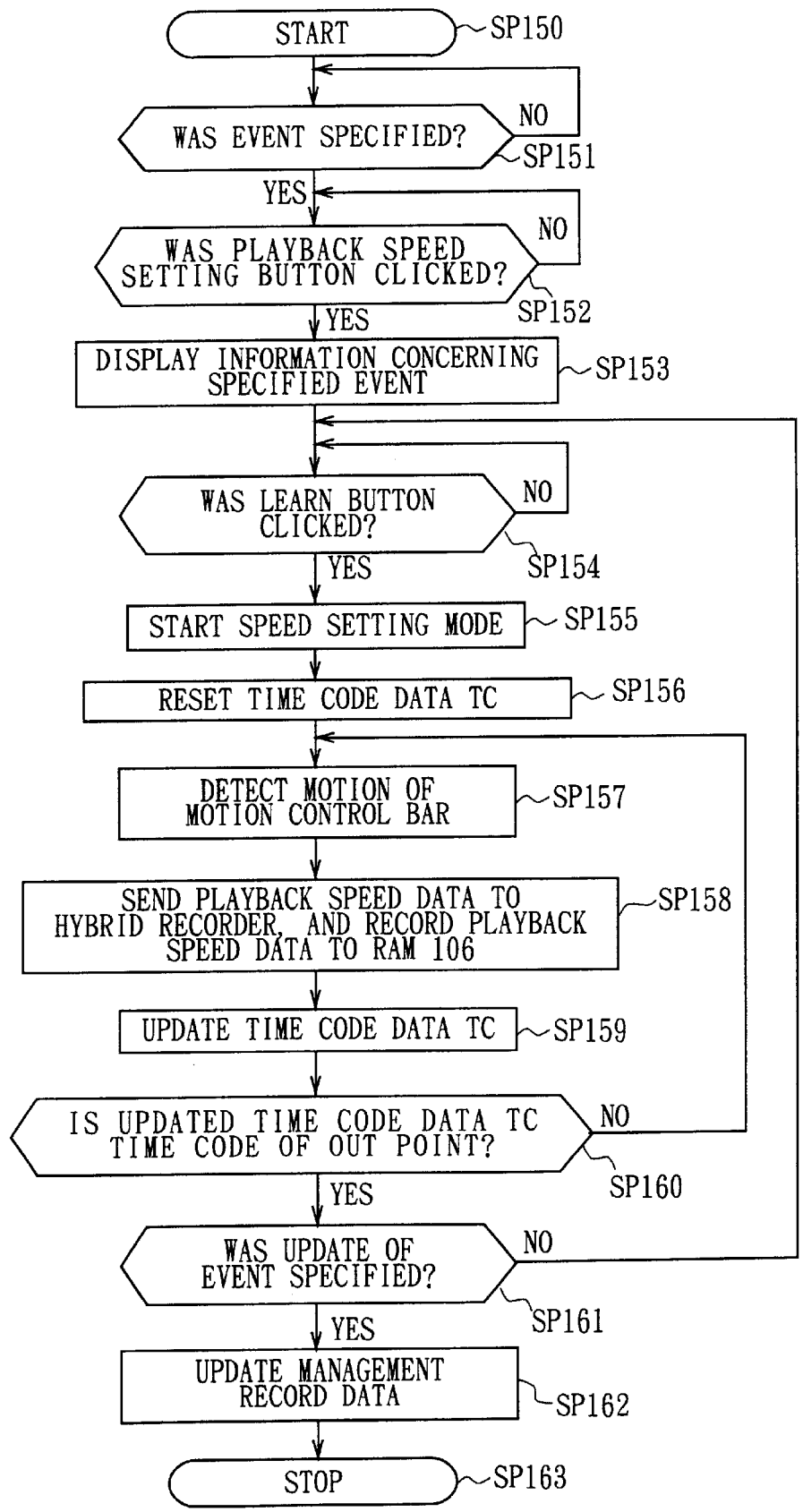
FIG. 28 is a flowchart for explaining the operation when arbitrary reproducing speed is set to an event.
Figure 29:
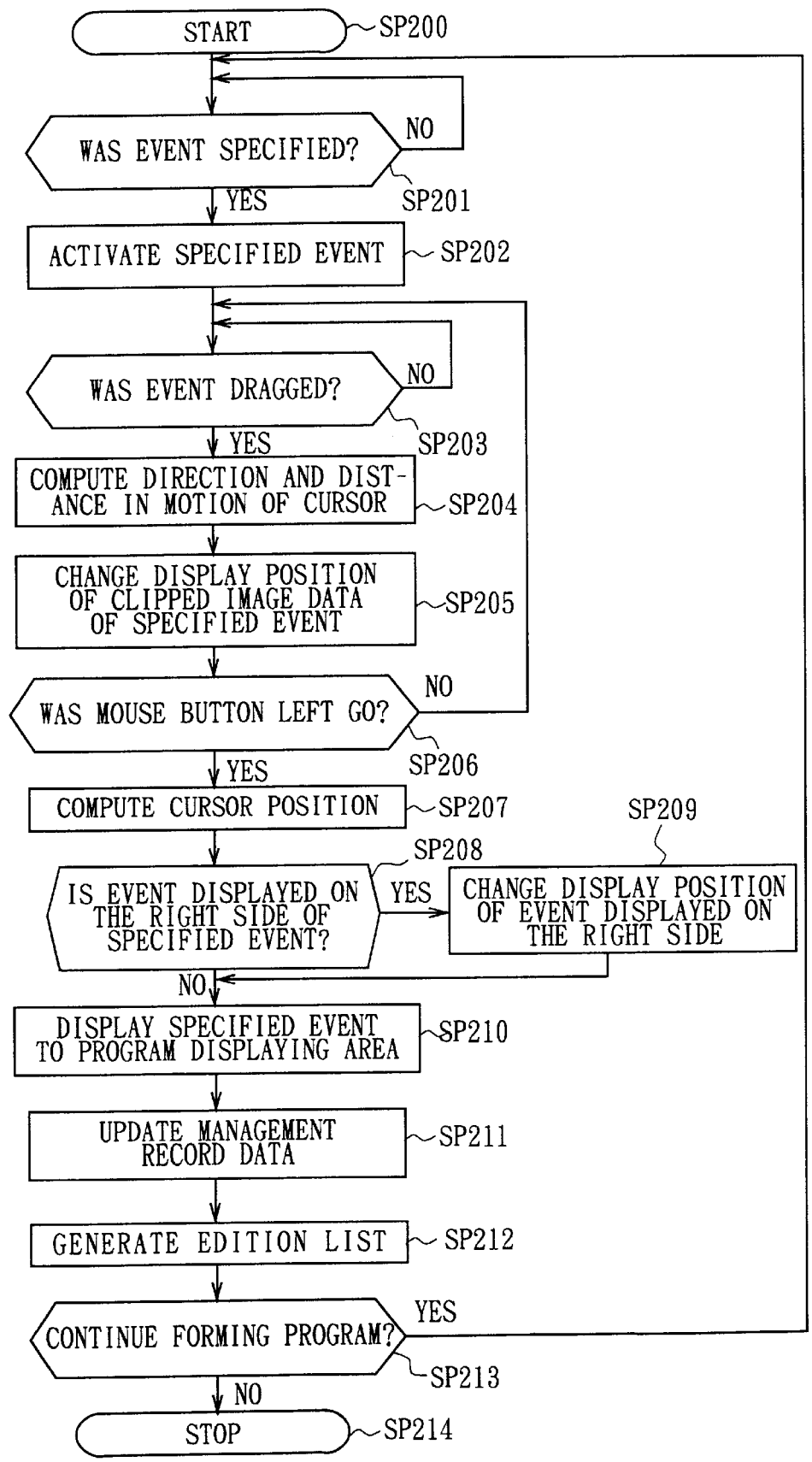
FIG. 29 is a flowchart for explaining the operation when a video program is produced.

The typical operation when optional reproducing speed is set to a desired event using the reproducing speed setting area 25 is described with reference to the flowchart of FIG. 28.

In step SP151, the CPU 10 judges whether a desired event is specified or not by the edit operator. For example, if the edit operator specified a desired clipped image data from clipped image data showing plural events displayed in the event displaying area 29 by operating a pointing device such as the mouse, the CPU 10 judges that the event was specified.

In step SP152, the CPU 10 judges whether the reproducing speed setting button 22*h* was clicked or not by the edit operator in the timing displaying area 22. If it was clicked, the CPU 10 refers to data stored in the second management record to manage specified events, and automatically displays the number of the specified event and its duration in the reproducing speed setting area 25.

In step SP154, the CPU 10 judges whether the learn button 25*a* in the reproducing speed setting area 25 was clicked or not by the edit operator. By clicking this learn button 25*a*, speed setting operation is practically started to set optional reproducing speed to the specified event.

Hereafter, the speed setting operation will be described in order.

Firstly, in step SP156, the value of a time code data TC is reset so that the time code data TC is to be an in-point time code data of the specified event.

In step SP157, the CPU 10 detects the state of sliding the motion control lever 401 of the dedicated controller 2*e* at a timing when video data of the time code data is displayed in the reproducing video displaying area 23.

In step SP158, the CPU 10 supplies reproducing speed data corresponding to the slide state of the motion control lever 401 to the hybrid recorder 3 as a reproducing command, and stores it in the RAM 10*b* in relation with the time code data TC. For example, if at the time of when speed setting operation is started by that the learn button 25*a* in the reproducing speed setting area 25 was clicked, the motion control lever 401 has not been operated yet by the edit operator, this reproducing speed data will be the data "64" which shows normal 1.0-time speed reproduction.

In step SP159, the time code data TC is updated as time code data of the following frame.

In step SP160, the CPU 10 judges whether the updated time code data TC is out-point time code data or not. If the time code TC updated in step SP159 is still not identical with the out-point time code data, the CPU 10 determines that the video data of this event is reproducing and returns to step SP157.

For example, if the edit operator slid the motion control lever 401 to the position of 0.1-time speed with monitoring reproducing video image displayed in the reproducing video displaying area 23 at his desired timing, in step SP157, the CPU 10 detects the motion of the motion control lever 401. Then in step SP158, the CPU 10 follows immediately the motion of the motion control lever 401 and transmits the reproducing speed data "32" showing 0.1-time speed to the hybrid recorder 3 as a reproducing control command to make the reproducing speed of the hybrid recorder 3 0.1-time speed. At the same time, the CPU 10 stores the time code data of the reproducing video data which was displayed in the reproducing video displaying area when the motion control lever 401 was slid to the position of 0.1-time speed by the edit operator, and the reproducing speed data "32" showing 0.1-time speed connectedly as a slow data file.

As being understandable from the loop from step SP157 to step SP160, the CPU 10 continues to detect the operated state of the motion control lever 401 during the video data from the in point to the out point of the specified event is reproduced, and store the detected state in the RAM 10b as reproducing speed data.

Accordingly, the CPU 10 is always detecting the operation state of the motion control lever 401 and controlling the reproducing speed of the hybrid recorder 3 so as to be a reproducing speed corresponding to the slid state of the motion control lever 401 during video data of the specified event is reproduced from the hybrid recorder 3, furthermore, the CPU 10 repeats the control such that stores speed data showing the reproducing speed corresponding to the slid state of the motion control lever 401 connectedly with time code of the reproducing video data displayed in the reproducing video displaying area 23 to the RAM 10b as a slow data file, for each frame unit. Thereby, an optional reproducing speed set to the specified event is stored in a slow data file connectedly with the time code.

In the next step SP161, the CPU 10 judges whether an event was updated or not. If the edit operator favors the slow data file formed in the loop from step SP156 to step SP160 and operates the replace button 34 or the new-event button 33, the CPU 10 judges that the reproducing speed of this event has newly set. However, if the edit operator does not favor the formed slow data file, the CPU 10 returns to step SP154 to form a slow data file again.

Since the above-mentioned speed setting operation is repeated until the edit operator is satisfied that the most optimal reproducing speed could be set, his/her desiring effective reproducing speed can be set to the specified event.

Note that, in the speed setting steps from step SP156 to step SP160, during the motion control lever 401 is operated by the edit operator with his/her hand to set an optional reproducing speed to an event, the video data reproduced at a reproducing speed corresponding to the motion of the motion control lever 401 is never put on the air. Because the most optimal and effective reproducing speed can not always be set by once speed setting by the edit operator. Then, the editing system 1 according to the present invention is programmed so that this speed setting operation can be repeated any time until the edit operator can be satisfied that the most effective and optimal speed can be set to an event.

In step SP162, the CPU 10 rewrites 2-byte slow type data of the second management record data for managing the event in which the speed information was newly set from the data "00000000" showing a normal 1.0-time speed reproducing speed to the data "00000001" showing that an optional reproducing speed is being set.

Here the operation when reproducing speed is set is completed.

Then the operation when only the event in which an optional speed has set in the above manner is outputted to the hybrid recorder to put on the air will be described hereafter.

If the edit operator specifies the reproducing of the event in which an optional reproducing speed has set by clicking the preview button 32 or the like, the CPU 10 refers to the slow type data of the second management record data for managing thus specified event to judge whether slow information has set or not to its event. If slow data has set, the CPU 10 reads out the slow data file connected with the specified event from the RAM 10b.

The CPU 10 controls the reproducing speed of the hybrid recorder 3 for every frames using the speed data connected with the time code data which has been recorded in this slow data file.

By automatically controlling the reproduction of the hybrid recorder 3 using a slow data file formed by speed setting operation, the motion of the motion control lever 401 showing the reproducing speed which was decided by the edit operator to be the best to the event in the speed setting operation can be automatically reproduced.

(9-7) Forming Processing of Video Program

Figure 26:
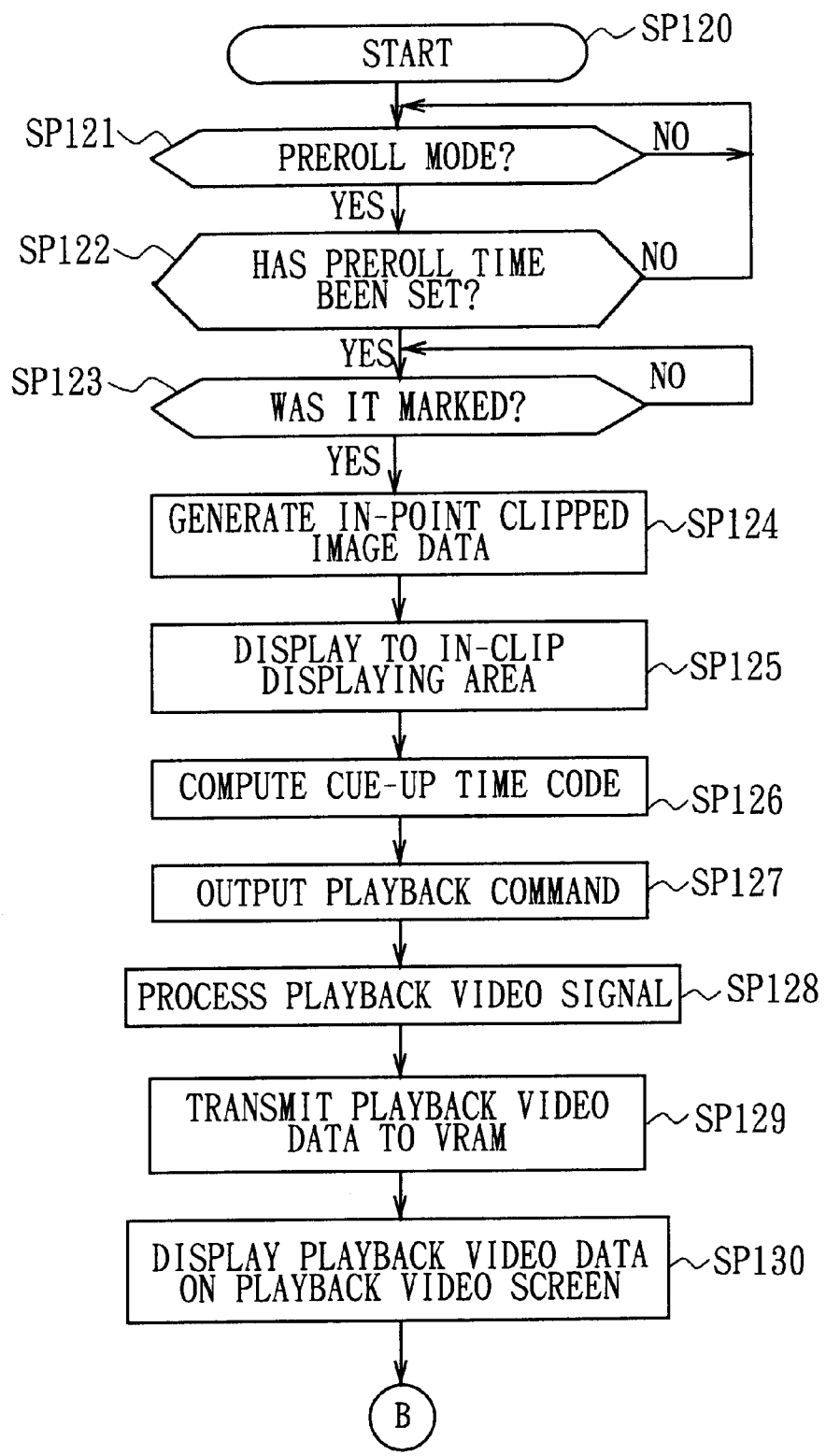
FIGS. 26 and 27 are flowcharts for explaining the event trimming operation with a preroll function.
Figure 27:
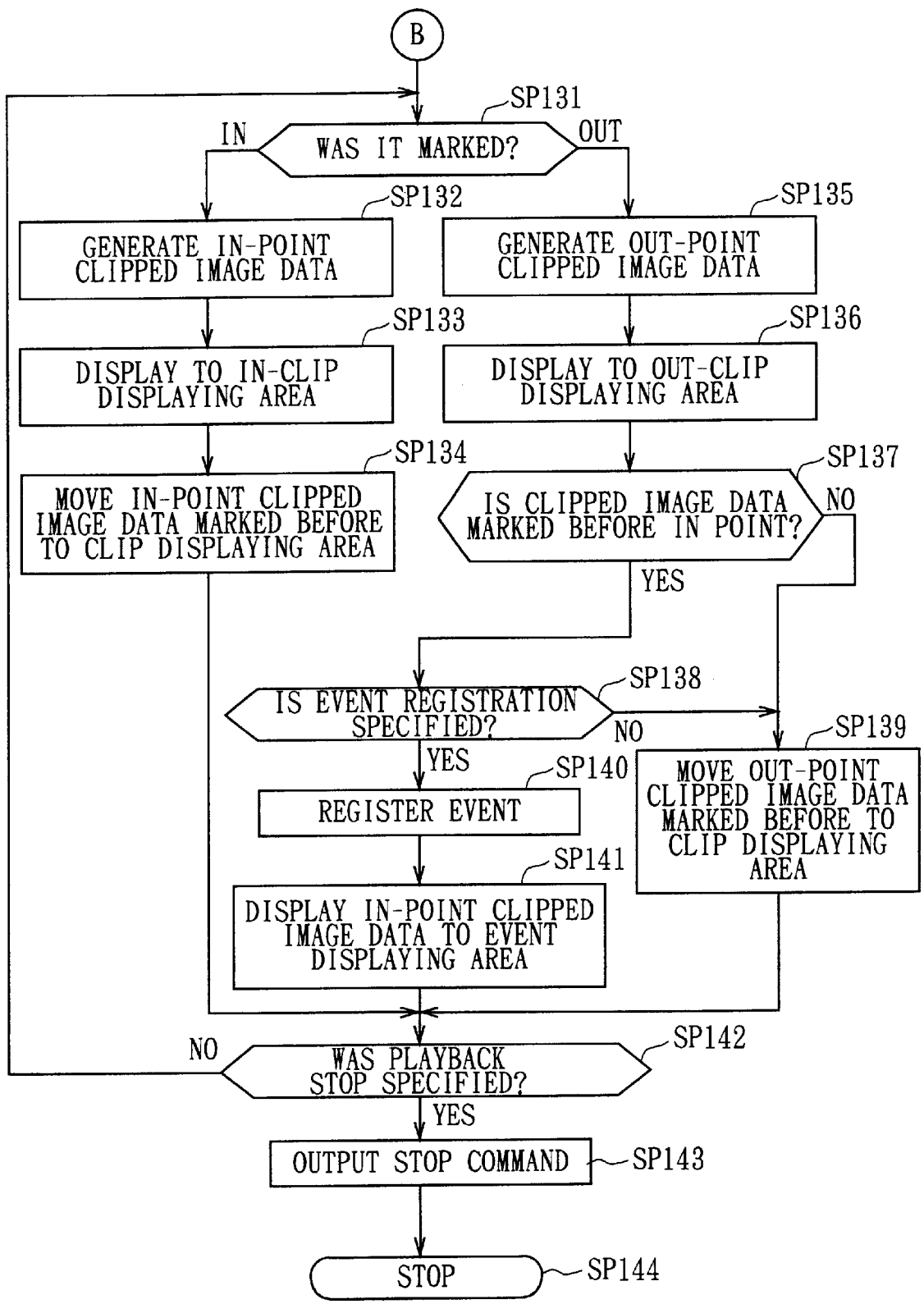

The processing of producing a video program using generated event is described referring to the flowchart of FIG. 26. Note that, it is defined that this flowchart is started from the state where events have been generated already.

After the processing is started at step SP200, in the step SP201, the CPU 10 judges whether an event has specified or not. At this time, determines that an event has specified when the mouse 2d has double-clicked (the operation successively clicking twice) in the state where the cursor was positioned at the display position of the clipped image data in the event displaying area (29a).

As a result, if an event has specified, in the next step SP202, the CPU 10 controls the specified event into an active state, i.e., movable state.

In the next step SP203, the CPU 10 judges whether the cursor has moved or not as clicking the mouse 2d, i.e., dragged or not. As a result, if dragged, in the next step SP204, the direction and the distance that the cursor moved are computed. In the next step SP205, the CPU 10 changes the display position of the clipped image data of the specified event based on thus computed direction and distance. Note that, since the processing from step SP203 to step SP205 will be executed promptly, on the screen of monitor 2b, it is seemed that clipped image data of an event is moving together with the cursor.

In the next step SP206, the CPU 10 judges whether the click button of the mouse 2d has left hold of or not in the program displaying area 30, i.e., the clicking has released or not. As a result of the judgment, if the clicking has not been released, the CPU 10 returns to step SP203 to repeat the processing, while if released, the CPU 10 goes to the next step SP207 to compute the cursor position when the clicking was released.

In the next step SP208, the CPU 10 judges whether the other event is being displayed or not on the right side than the display position of the event specified by the cursor position in the program displaying area 30 based on the computed cursor position. As a result, if the other event is being displayed on the right side, the CPU 10 goes to step SP209, while if no event is being displayed on the right side, the CPU 10 goes to step SP210.

In step SP209, the CPU 10 further moves the display position of the other event displayed on the right side toward the right to insert the specified event. After that the CPU 10 goes to step SP210.

In step SP210, the CPU 10 displays the clipped image data of the specified event at the position specified by the cursor in the program displaying area 30.

In the next step SP2 11, the CPU 10 updates the data contents of the second management record data regarding program according to the insertion of event at step SP210. More precisely, the CPU 10 corrects a part of the pointer to the data linked before or after in the second management record data for program data shown in FIG. 10. Note that, since the event newly inserted has no second management record data, this is newly generated.

In step SP212, an edition list showing the final video program is generated in the order of plural clipped image data shown in the program displaying area. To put it concretely, this edition list consists of in-point and out-point time code data of second management record data being connected with the clipped image data being displayed in this program displaying area, and speed data of the slow data file which has been set to the event shown by the clipped image data. For example, if the first event having no slow data file and the second event having slow data file are displayed at the first and the second in this program displaying area, in the edition list, listed data for reproducing throughout at 1-time speed the first event video data from the time code data of the in point to the time code data of the out point of the first invent is registered, and next listed data for reproducing video data based on the reproducing speed data recorded in the slow data file set to the second event is registered.

If reproducing this video program has instructed by the edit operator, the CPU 10 only may control reproduction by the hybrid recorder according to thus formed edition list.

When this processing is completed, the CPU 10 goes to step SP213 to determine whether to continue or not the program forming processing. If continuing it, the CPU 10 returns to step SP201 to repeat the processing, while if stopping the program forming processing, the CPU 10 goes to step SP214 and stopping the processing.

(9-8) Dubbing Processing in Hybrid Recorder

The hybrid recorder 3 can perform mainly two types of dubbing processing. One of them is the dubbing processing for recording the video data of a video tape to the hard-disk drive 300 to use the video data recorded in the video tape brought from the outside as editing material. Another of them is the dubbing processing for recording the video data of the final video program which is generated as the result of edition in this editing system 1 to a broadcasting video tape from the hard-disk drive 300.

In the case of executing these dubbing processing, at first, the dubbing setting button 38 is clicked among various command buttons displayed on the GUI of the monitor 2b to display the dubbing setting dialog 38A on the GUI. In the case where the dubbing processing from a video tape to the hard-disk drive 300 is performed as the dubbing processing, the dubbing processing from video tape to hard disk is selected by clicking the tape-to-disk button 38B in the dubbing setting dialog 38A. Provided that since if the video data recorded in the video tape is compressively coded digital video data, high-speed dubbing can be performed, in this case, the high-speed dubbing button 38D is further clicked to select a high-speed dubbing mode.

On the other hand, in the case where the dubbing processing from the hard-disk drive 300 to a video tape is performed, the dubbing processing from hard disk to video tape is selected by clicking the disk-to-tape button 38C in the dubbing setting dialog 38A. Provided that in the case where an event or the like recorded in the hard-disk drive 300 is not simply dubbed but the video data of the final video program recorded in the hard-disk drive 300 is dubbed, the program dubbing button 38E is further clicked to select a program dubbing mode.

After entering the various setting of the dubbing processing is completed, the determination button 38F is clicked to determine these setting contents and the dubbing setting dialog 38A is closed.

In the case where the dubbing processing is actually executed consequently, at first, the dubbing button 22i is clicked to start up the dubbing processing mode, and then the recording start button 31a is clicked to send a recording starting command out to the hybrid recorder 3. Thus, the dubbing processing according to the set contents of dubbing processing is executed in the hybrid recorder 3. Note that, if the dubbing processing is stopped in the middle of execution of the dubbing processing, the recording stop button 31b is clicked to send a recording stopping command out to the hybrid recorder 3, so that the hybrid recorder 3 stops the dubbing processing.

Here, the procedure of the CPU 10 in the dubbing processing will be described hereinafter referring to a flowchart.

(9-8-1) Setting of Dubbing Contents

Figure 30:
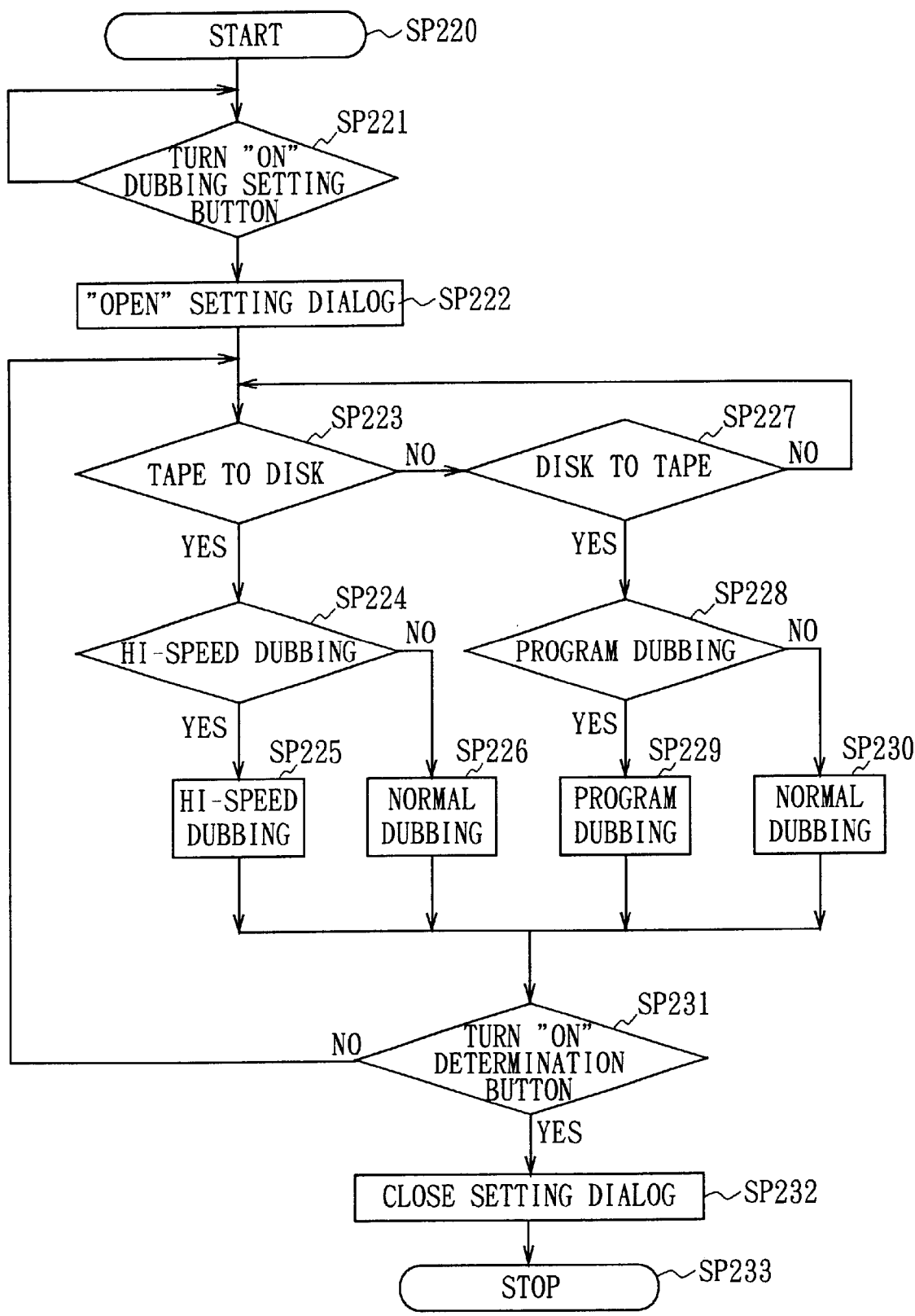
FIG. 30 is a flowchart for explaining the operation when the contents of dubbing processing is set.

As shown in FIG. 30, the procedure starts from the step SP220, and at step SP221, the CPU 10 judges whether or not the dubbing setting button 38 has pushed. In this case, if the mouse 2d is clicked in the state where the cursor is on the dubbing setting button 38, the CPU 10 judges that the dubbing setting button 38 has pushed. Note that, also judgement whether or not to have pushed about the other buttons described below is similar to that.

If the dubbing setting button 38 is pushed, the CPU 10 generates graphical data of the dubbing setting dialog 38A and transmits this to the VRAM 13b of the display controller 13 at the next step SP222, so that the dubbing setting dialog 38A is displayed on the GUI.

Thereafter, the CPU 10 judges whether or not what button has pushed among the buttons in the dubbing setting dialog 38A in the processing of the following step SP223, step SP224, step SP227 and step SP228. Specifically, at step SP223, the CPU 10 judges whether or not the tape-to-disk button 38B has pushed, and if the button 38B has pushed, it goes to step SP224, while if not, it goes to step SP227.

At step SP227, the CPU 10 judges whether or not the disk-to-tape button 38C has pushed, and if the button 38C has pushed, it goes to step SP228, while if not, it returns to step SP223 and repeating the judgement whether or not the tape-to-disk button 38B has pushed.

If going to step SP224 since the tape-to-disk button 38B has pushed, the CPU 10 judges whether or not the high-speed dubbing button 38D has pushed, and if the button 38D has pushed, it goes to step SP225, while if not, it goes to step SP226. At step SP225, the CPU 10 determines that the operator desires high-speed dubbing from video tape to hard disk. On the other hand, at step SP226, the CPU 10 determines that the operator desires normal dubbing processing from video tape to hard disk as the dubbing processing.

If going to step SP228 since the disk-to-tape button 38C has pushed, the CPU 10 judges whether or not the program dubbing button 38E, and if the button 38E has pushed, it goes to step SP229, while if not, it goes to step SP230. At step SP229, the CPU 10 determines that the operator desires program dubbing processing from hard disk to video tape (i.e., dubbing of the final video program) as the dubbing processing. On the other hand, at step SP230, the CPU 10 determines that the operator desires normal dubbing processing from hard disk to video tape (i.e., dubbing of desired video data such as an event) as the dubbing processing.

At the next step SP231, the CPU 10 judges whether or not the determination button 38F has pushed, and if the determination button 38F has pushed, it stores the set contents judged in step SP225, step SP226, step SP229 or step SP230 in the dubbing contents storing area of the RAM 10b and goes to step SP232, while if the determination button 38F has not pushed, it returns to step SP223 and repeating the judgement whether or not to be pushed about each button.

At step SP232, the CPU 10 closes the dubbing setting dialog 38A by determining that the setting of dubbing contents has completed and proceeds to the next step SP233 to stop the processing.

(9-8-2) Execution of Dubbing Processing

In this clause, the procedure in executing the dubbing contents set by the processing shown in FIG. 30 will be described.

Figure 31:
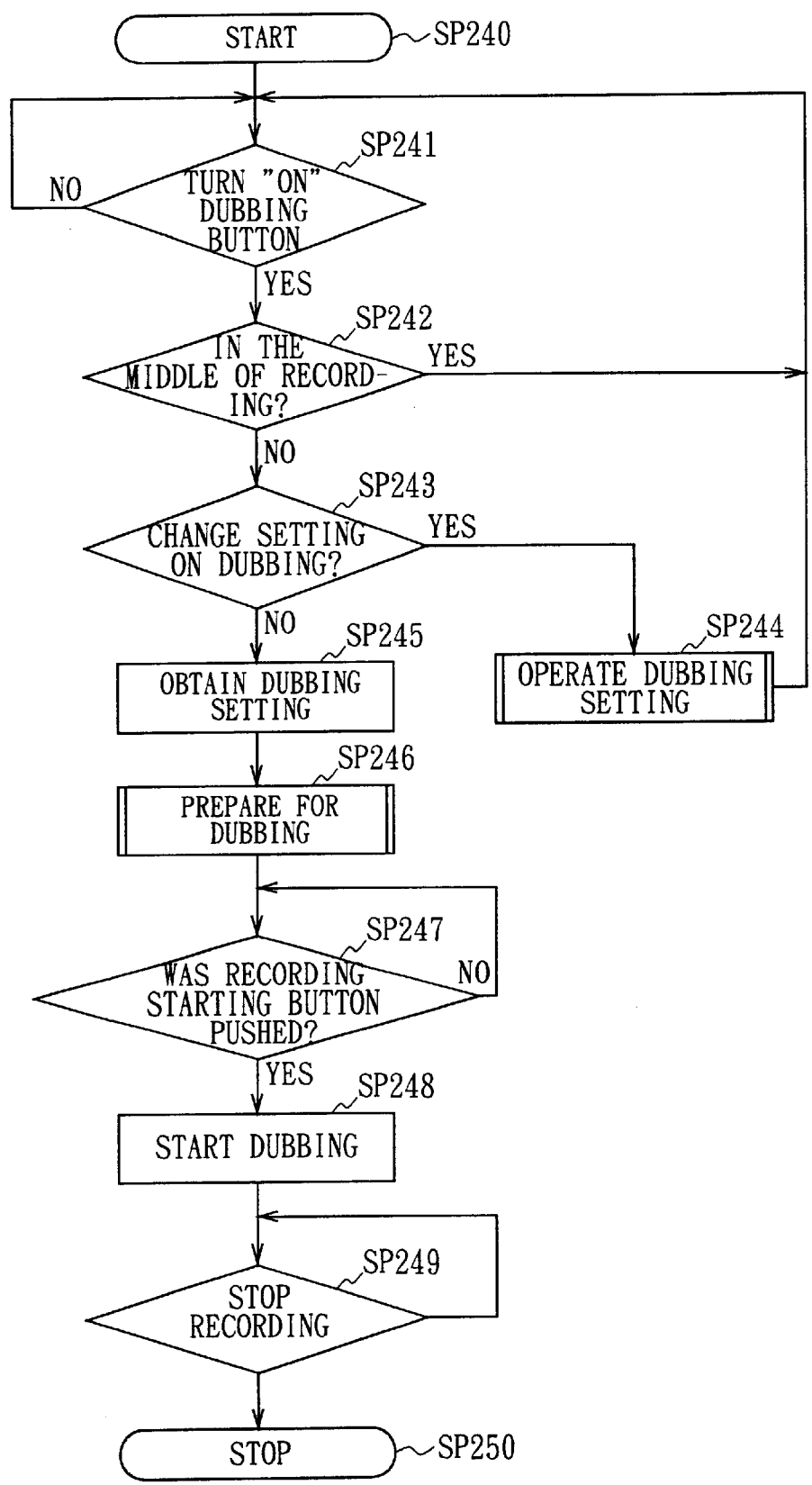
FIG. 31 is a flowchart for explaining the operation when the dubbing processing is executed.

As shown in FIG. 31, the processing is started from step SP240, and at step SP241, at first, the CPU 10 judges whether or not the dubbing button 22*i* has pushed, and if the dubbing button 22*i* has pushed, it goes to the next step SP242. At the next step SP242, the CPU 10 judges whether or not the hard-disk drive 300 and the VTR 301 are in the middle of recording operation, and if these are in the middle of recording operation, it returns to step SP241 since the dubbing processing cannot be performed, while if not, it goes to the next step SP243.

At step SP243, the CPU 10 judges whether or not the dubbing setting button 38 has pushed, and if it has pushed, the CPU 10 goes to step SP244 by determining that the dubbing contents is changed and executes the processing of the setting of dubbing contents shown in FIG. 30, while if not, it goes to step SP245 by determining that-the contents of dubbing does not change.

At step SP245, the CPU 10 obtains the dubbing contents set by the processing shown in FIG. 30 in the area following to the dubbing contents storing area of the RAM 10*b*, and goes to the next step SP246 to perform preparation for dubbing processing.

Figure 32:
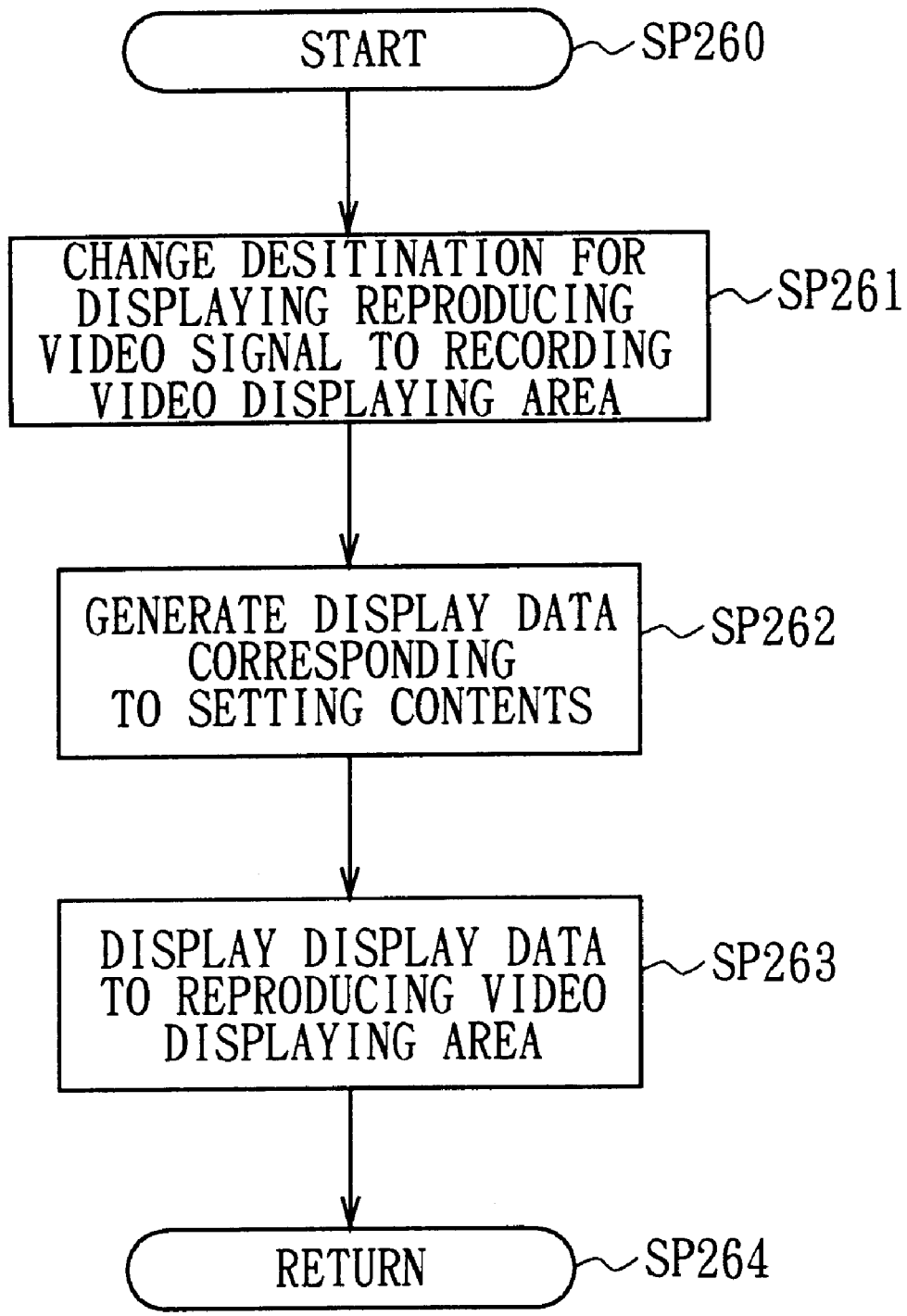
FIG. 32 is a flowchart for explaining a dubbing preparation performed in executing the dubbing processing.

FIG. 32 shows the preparation for dubbing processing at step SP246 concretely. The processing starts from step SP260, and at step SP261, the CPU 10 supplies the control command to change the display position of the reproducing video signal V3 which is reproduced and supplied by the hard-disk drive 300 or the VTR 301, from the reproducing video displaying area 23 to the recording video displaying area 21 on the GUI, in order to display the video signal to be recorded on the recording video screen 21*a* of the recording video displaying area 21, to the display controller 13, so that the display position of the reproducing video signal V3 is changed.

At the next step SP262, the CPU 10 generates graphic display data showing the state of dubbing as shown in FIG. 5 based on the contents of dubbing obtained in the last step SP245. At the next step SP263, the CPU 10 displays the graphic display data generated in step SP262 on the reproducing video screen 23*a* of the reproducing video displaying area 23. In this case, since the graphic display data showing the state of dubbing includes information showing the contents of setting such as "Disk to Tape" and "Normal Dubbing", the operator can easily confirm the set contents of dubbing processing without specially opening the dubbing setting dialog 38A. After this processing of step SP263 is completed, the CPU 10 goes to the next step SP264 to return to the last processing shown in FIG. 31.

If the processing of dubbing preparation is completed, the CPU 10 goes to step SP247. At this step SP247, the CPU 10 judges whether or not the recording start button 31*a* has pushed, and if the recording start button has pushed, it goes to the next step SP248.

At step SP248, the CPU 10 notifies a control command showing recording start and a control command showing the contents of dubbing to the CPU 303 of the hybrid recorder 3 via the external interface 18. Note that, in this case, the control command showing the contents of dubbing is information about the direction of dubbing (i.e., it shows from video tape to hard disk or from hard disk to video tape) and dubbing speed or the like.

In the hybrid recorder 3 in which these control commands are received, the CPU 303 controls the first to the third switches in accordance with the contents of dubbing as well as controlling the operation modes of the hard-disk drive 300 and the VTR 301, and executes the dubbing processing. For example, in the case where normal dubbing from a video tape loaded in the VTR 301 to the hard-disk drive 300 is executed, the VTR 301 is set into a reproducing operation mode and the hard-disk drive 300 is set into a recording operation mode, furthermore, the first to the third switches are controlled so that the analog video signal reproduced by the VTR 301 is supplied to the hard-disk drive 300 sequentially through the third switch 310, the first switch 304, the encoder 306 and the second switch 307, and the normal dubbing processing from video tape to hard disk is executed according to that control.

On the other hand, in the case where high-speed dubbing from a video tape loaded in the VTR 301 to the hard-disk drive 300 is executed, the VTR 301 is set into a reproducing operation mode and the hard-disk drive 300 is set into a recording operation mode, furthermore, the second switch 307 is controlled so that the compressively coded video signal reproduced by the VTR 301 is supplied to the hard-disk drive 300 via the second switch 307, and the high-speed dubbing from video tape to hard disk is executed according to that control.

In the case where normal dubbing or program dubbing from the hard-disk drive 300 to a video tape is executed, the VTR 301 is set into the recording operation mode and the hard-disk drive 300 is set into the reproducing operation mode, furthermore, the first and the third switches 304 and 310 are controlled so that the video signal reproduced from the hard-disk drive 300 is supplied to the VTR 301 sequentially through the third switch 310, the decoder 305, the first switch 304 and the encoder 306, and the dubbing processing from hard disk to video tape is executed according to that control.

As in the above manner, the CPU 10 of the computer 2 executes the dubbing processing based on the contents of setting by controlling the hybrid recorder 3 via the external interface 18.

Note that, when this dubbing processing is being executed, the reproduced video signal V3 reproduced and supplied from the VTR 301 or the hard-disk drive 300 is displayed in the recording video displaying area 21 as described above. Thus, the operator can easily confirm the contents of the video signal being actually dubbed.

After executing the dubbing processing, the CPU 10 judges whether or not the recording stop button 31*b* or transmission of the specified video signal is completed at the next step SP249. As a result, if the CPU 10 determines that the dubbing processing has completed, it goes to the next step SP250 to stop the processing of dubbing processing.

(10) Operation and Effects of the Embodiment

According to the above structure, in the case of this editing system 1, the GUI for editing operation is displayed on the monitor 2*b* so that editing work can be performed by operating the various command buttons displayed on the GUI. Moreover, the source video signal V1 supplied from the outside as live image is recorded to the hard-disk drive 300 of the hybrid recorder 3 as editing material, and at the same time, thus recorded video signal is displayed in the recording video displaying area 21, furthermore, desired video signal is read out as occasion demands from the hard-disk drive 300 in the middle of recording operation and displayed in the reproducing video displaying area 23.

Thereby, in this editing system 1, editing work can be easily performed by selecting a command button on the screen while monitoring the GUI and the video data displayed on the monitor 2b of the computer 2, thus, editing work can be performed efficiently by reducing troublesome in edition comparing with the conventional editing work performed in restricted environment while operating various devices.

Furthermore, in the case of this editing system 1, also in the case where a video tape brought from the outside is used as editing material, video data recorded in the video tape can be easily dubbed to the hard-disk drive 300 as editing material. To put it concrete, after the video tape is loaded in the VTR 301 of the hybrid recorder 3, a dubbing mode is instructed by operating the dubbing setting button 38 on the GUI, and the dubbing button 22i and the recording start button 31a are operated also on the GUI, so that the video data recorded in the video tape can be reproduced and the reproduced video data is recorded to the hard-disk drive 300. Thus, dubbing from the video tape can be easily performed with simple operation only by selecting the command buttons displayed on the screen and the troublesome of the operator at time of dubbing can be reduced comparing with the case where devices on a reproducing side and a recording side are separately operated to perform dubbing as the conventional case.

Also in the case where the video data of the final video program generated as the result of editing processing is dubbed to a video tape for broadcasting, after the dubbing mode is instructed by operating the dubbing setting button 38 displayed on the GUI, the dubbing button 22i and the recording start button 31a are operated, so that the final video program can be dubbed to the video tape for broadcasting; therefore, the dubbing processing can be performed with simple operation comparing with the case where each device is separately operated as the conventional case.

According to the above structure, since the hard-disk drive 300 and the VTR 301 in the hybrid recorder 3 can be operated with command buttons displayed on the GUI, when video data recorded in a video tape is recorded to the hard-disk drive 300 as editing material or the video data of the final video program generated as the result of edition is recorded to a video tape for broadcasting, dubbing processing can be performed with simple operation; thus, the dubbing operation can be performed efficiently by reducing the troublesome of the operator at the time of dubbing comparing with the conventional case.

Note that, the aforementioned embodiment has dealt with the case where the hard-disk drive 300 in which a magnetic disk is used as random-access recording/reproducing means is applied. However, the present invention is not only limited to this but random-access recording/reproducing means in which other recording medium such as a magneto-optical disk (MO), a semiconductor memory, etc., is used is applicable.

The aforementioned embodiments have dealt with the case where the hybrid recorder 3 is constituted of the hard-disk drive 300 and the VTR 301. However, the present invention is not only limited to this but other structure is allowed as the constitution of a recording/reproducing device. The same effects as the aforementioned case can be obtained provided that the recording/reproducing device is constituted of, at least, first random-access recorrecording/reproducing means and second recording/reproducing means capable of performing recording and reproducing operation to a predetermined recording medium.

The aforementioned embodiments have dealt with the case where the first to the third switches 304, 307 and 310 are provided, and video signal reproduced from the VTR 301 is supplied to the hard-disk drive 300, and at the same time, video signal reproduced from the hard-disk drive 300 is supplied to the VTR 301. However, the present invention is not only limited to this but the same effects as the aforementioned cases can be obtained by providing selecting means for supplying video data reproduced by one recording/reproducing means to another recording/reproducing means in the first and the second recording/reproducing means.

Furthermore, the embodiments described above have dealt with the case of entering various instructions and data to the editing system 1 by using the keyboard 2c, mouse 2d or dedicated controller 2e. The present invention, however, is not only limited to this but also the various instructions and data may be entered using the other input devices, provided that user interface means for entering the various instructions and data from the operator to the editing system 1 is provided.

Industrial Capability

The present invention can be used when source video data being material is dubbed or the video data of the final video program generated as the result of edition is dubbed to a video tape for broadcasting at a broadcasting station or the like.

What is claimed is:

1. An editing system for editing source video data, comprising:

a recording/reproducing device for recording said source video data on a random-access recording medium and reproducing the source video data recorded on said recording medium; and a computer for performing editing operation to produce the final video program by editing said source video data by controlling said recording/reproducing device;

wherein said recording/reproducing device comprises:

first recording/reproducing means having a hard disk drive unit for recording video data on a first recording medium and for reproducing the video data recorded on the first recording medium, said first recording/reproducing means including means having an input buffer memory arranged on an input side of said hard disk drive unit and an output buffer memory arranged on an output side of said hard disk drive unit for enabling recording and reproducing of video data to occur at substantially the same time such that video data is stored in said output buffer memory while video data is provided to said input buffer memory and such that video data is read out of said input buffer memory while video data is read out of said output buffer memory;

second recording/reproducing means for recording video data on a predetermined second recording medium and for reproducing the video data recorded on the second recording medium;

selecting means for supplying the video data reproduced by one of said first and second recording/reproducing means to another of those; and first control means for controlling the recording and reproducing operation of said first and second recording/reproducing means and controlling the selecting operation of said selecting means at the same time; and wherein said computer comprises:

user interface means for entering instructive information to record said video data reproduced by one of said first and second recording/reproducing means by another of those; and second control means for making said recording/reproducing device execute reproducing and recording operation according to the instructive information by notifying said first control means of said recording/reproducing device, control information corresponding to said instructive information fed via said user interface means.

2. The editing system according to claim 1, wherein; said recording/reproducing device records said video data recorded on said second recording medium of said second recording/reproducing means on said first recording medium of said first recording/reproducing means according to said control information from said computer as said source video data.

3. The editing system according to claim 1, wherein; said recording/reproducing device records the video data of said final video program recorded on said first recording medium of said first recording/reproducing means on said second recording medium of said second recording/reproducing means according to said control information from said computer.

4. The editing system according to claim 3, wherein; said second recording medium is a recording medium used when said final video program is put on the air.

5. The editing system according to claim 1, wherein, said selecting means comprises:

first selecting means for supplying either of said source video data which is supplied from outside and said video data reproduced by said first or second recording/reproducing means to said first and second recording/reproducing means;

second selecting means for supplying either of the output of said first selecting means and said video data reproduced by said second recording/reproducing means to said first recording/reproducing means; and third selecting means for supplying one of said video data reproduced by said first and second recording/reproducing means to said first selecting means.

6. The editing system according to claim 1, wherein; said recording/reproducing device has encoding means for encoding video data, and when recording analog video data reproduced by said second recording/reproducing means to said first recording/reproducing means, encodes said analog video data reproduced by said second recording/reproducing means by said encoding means and then records the coded video data to said first recording/reproducing means.

7. The editing system according to claim 1, wherein; said recording/reproducing device has decoding means for decoding coded video data, and decodes said coded source video data reproduced by said first recording/reproducing means by the decoding means and then transmits the decoded video data.

8. The editing system according to claim 1, wherein; said recording/reproducing device includes:

encoding means for encoding video data; and
decoding means for decoding the coded video data; and said recording/reproducing device encodes said video data to be recorded to said first and second recording/reproducing means by said encoding means and records the coded data, and decodes said coded video data reproduced from said first and second recording/reproducing means by said decoding means.

9. The editing system according to claim 1, wherein; said user interface means is formed of a graphical user interface using a monitor belonging to said computer.

10. The editing system according to claim 9, wherein, said graphical user interface has at least, a control command button for said editing operation, and a control command button for dubbing to enter instructive information to record said video data reproduced from one of said recording/reproducing means to another of those.

11. The editing system according to claim 10, wherein; said control command button for dubbing is composed of a dubbing setting button to set the contents of dubbing, a dubbing button for starting up a dubbing processing mode, and a recording start button to execute the dubbing processing.

12. The editing system according to claim 11, wherein; if said dubbing setting button is operated, a window to set the contents of dubbing is displayed on said graphical user interface.

13. The editing system according to claim 12, wherein; said window includes a command button to instruct the dubbing from said first recording/reproducing means to said second recording/reproducing means, and a command button to instruct the dubbing from said second recording/reproducing means to said first recording/reproducing means.

14. The editing system according to claim 13, wherein; if said window is closed after one of said command buttons is operated, the contents of dubbing corresponding to the operated command button is set.

15. An editing system for editing source video data, comprising:

a recording/reproducing device for recording said source video data on a random-access recording medium and reproducing the source video data recorded on said recording medium at the same time; and a computer for performing editing operation to produce the final video program by editing said source video data by controlling said recording/reproducing device;

wherein said recording/reproducing device comprises:

first recording/reproducing means for recording video data on a random-access recording medium and for reproducing video data recorded on the first recording medium at the same time;

second recording/reproducing means for recording video data on a predetermined second recording medium and for reproducing the video data recorded on the second recording medium;

selecting means for supplying the video data reproduced by one of said first and second recording/reproducing means to another of those; and first control means for controlling the recording and reproducing operation of said first and second recording/reproducing means and controlling the selecting operation of said selecting means at the same time; and wherein said computer comprises:

user interface means for entering instructive information to record said video data reproduced by one of said first and second recording/reproducing means by another of those; and second control means for making said recording/reproducing device execute reproducing and recording operation according to the instructive information by notifying said first control means of said recording/reproducing device, control information corresponding to said instructive information fed via said user interface means, wherein said user interface means is formed of a graphical user interface using a monitor belonging to said computer, wherein said graphical user interface has at least, a control command button for said editing operation, and a control command button for dubbing to enter instructive information to record said video data reproduced from one of said recording/reproducing means to another of those, wherein said control command button for dubbing is composed of a dubbing setting button to set the contents of dubbing, a dubbing button for starting up a dubbing processing mode, and a recording start button to execute the dubbing processing, wherein if said dubbing setting button is operated, a window to set the contents of dubbing is displayed on said graphical user interface, wherein said window includes a command button to instruct the dubbing from said first recording/reproducing means to said second recording/reproducing means, and a command button to instruct the dubbing from said second recording/reproducing means to said first recording/reproducing means, wherein if said window is closed after one of said command buttons is operated, the contents of dubbing corresponding to the operated command button is set, and wherein said second control means of said computer memorizes said dubbing contents in the predetermined memory when said window is closed.

16. The editing system according to claim 15, wherein;

if said dubbing button and said recording start button are operated by operating said dubbing setting button after the dubbing contents is set, said second control means of said computer generates said control information based on said dubbing contents memorized in said memory and transmits the control information to said first control means of said recording/reproducing device to execute the instructed dubbing processing.

17. The editing system according to claim 16, wherein;

graphic display showing being under dubbing and the contents of dubbing is displayed on said graphical user interface under executing said dubbing processing.

18. An editing method for producing the final video program for on the air by editing source video data using an editing system including a recording/reproducing device, and a computer for controlling the recording and reproducing operation of said recording/reproducing device, wherein:

said recording/reproducing device includes first recording/reproducing means having a hard disk drive unit for recording video data on a first recording medium and for reproducing the video data recorded on the first recording medium in which said first recording/reproducing means includes means having an input buffer memory arranged on an input side of said hard disk drive unit and an output buffer memory arranged on an output side of said hard disk drive unit for enabling recording and reproducing of video data to occur at substantially the same time such that video data is stored in said output buffer memory while video data is provided to said input buffer memory and such that video data is read out of said input buffer memory while video data is read out of said output buffer memory, and second recording/reproducing means for recording video data on a predetermined second recording medium and reproducing the video data recorded on the second recording medium;

said computer is equipped with user interface means for entering dubbing instruction to record the video data recorded on one of said first and second recording media to another of those; and if dubbing instruction from said first recording medium to said second recording medium is fed via said user interface means, the video data of said final video program is reproduced from said first recording medium and the reproduced video data is recorded on said second recording medium by controlling said recording/reproducing device from said computer.

19. The editing system according to claim 18, wherein;

said second recording medium is a recording medium used when said final video program is put on the air.

20. The editing system according to claim 18, wherein;

if dubbing instruction from said second recording medium to said first recording medium is fed via said user interface means, said source video data recorded on said second recording medium is reproduced and the reproduced video data is recorded on said first recording medium by controlling said recording/reproducing device from said computer.

21. The editing system according to claim 18, wherein;

said user interface means is formed of a graphical user interface, and displays graphic display for the graphical user interface on a monitor belonging to said computer.

22. The editing system according to claim 21, wherein;

when said dubbing instruction is fed and dubbing processing corresponding to the dubbing instruction is being executed, graphic display showing the contents of dubbing processing is displayed on the monitor of said computer.

* * * * *